US012677293B2

(12) United States Patent
Zewail et al.

(10) Patent No.: US 12,677,293 B2
(45) Date of Patent: Jul. 7, 2026

(54) PDCCH AND PDSCH MULTIPLEXING WITH RANK ADAPTATION

(71) Applicant: QUALCOMM Incorporated, San Diego, CA (US)

(72) Inventors: Ahmed Abdelaziz Ibrahim Abdelaziz Zewail, San Diego, CA (US); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 466 days.

(21) Appl. No.: 18/482,797

(22) Filed: Oct. 6, 2023

(65) Prior Publication Data

US 2025/0119925 A1 Apr. 10, 2025

(51) Int. Cl.
*H04L 5/00* (2006.01)
*H04W 72/232* (2023.01)

(52) U.S. Cl.
CPC ......... *H04W 72/232* (2023.01); *H04L 5/0051* (2013.01)

(58) Field of Classification Search
CPC ............... H04W 72/232; H04W 72/51; H04W 72/1273; H04L 5/0023; H04L 5/0051; H04L 5/0094
See application file for complete search history.

(56) References Cited

U.S. PATENT DOCUMENTS

| | | | | |
|---|---|---|---|---|
| 2020/0077432 A1* | 3/2020 | Xiong | ................... | H04L 5/0007 |
| 2020/0235874 A1* | 7/2020 | Yeo | ...................... | H04W 72/23 |
| 2020/0412492 A1* | 12/2020 | Oh | .......................... | H04L 1/189 |
| 2021/0029647 A1* | 1/2021 | Matsumura | ........... | H04W 52/18 |
| 2021/0168012 A1* | 6/2021 | Matsumura | ........... | H04L 5/0053 |
| 2022/0078767 A1* | 3/2022 | Xiong | ................... | H04L 5/0053 |
| 2023/0189147 A1* | 6/2023 | Bala | .................. | H04W 52/0229 |
| | | | | 370/311 |
| 2023/0371039 A1* | 11/2023 | Tsai | .................... | H04W 72/232 |
| 2023/0422271 A1* | 12/2023 | Tang | .................. | H04W 72/232 |
| 2024/0031916 A1* | 1/2024 | Hong | ................... | H04L 5/0051 |
| 2025/0047440 A1 | 2/2025 | Zewail et al. | | |

* cited by examiner

*Primary Examiner* — Andrew Lee
(74) *Attorney, Agent, or Firm* — Procopio, Cory, Hargreaves & Savitch LLP

(57) ABSTRACT

PDCCH/PDSCH multiplexing with rank adaptation is described. An apparatus is configured to receive a PDSCH transmission multiplexed with a PDCCH transmission that includes information to schedule the PDSCH. The PDCCH has a first rank, the PDSCH has a second rank, and both share a DMRS(s). The apparatus is configured to decode the PDSCH using a channel estimation for the PDSCH and the second rank of the PDSCH that is based on the shared DMRS indication. Another apparatus is configured to encode a PDSCH transmission multiplexed with a PDCCH transmission that includes information to schedule the PDSCH. The PDCCH has a first rank, the PDSCH has a second rank, and both share a DMRS(s). The apparatus is configured to provide, for a UE, the PDSCH transmission multiplexed with the PDCCH transmission that schedules the PDSCH and a shared DMRS indication indicative of the shared DMRS(s).

30 Claims, 14 Drawing Sheets

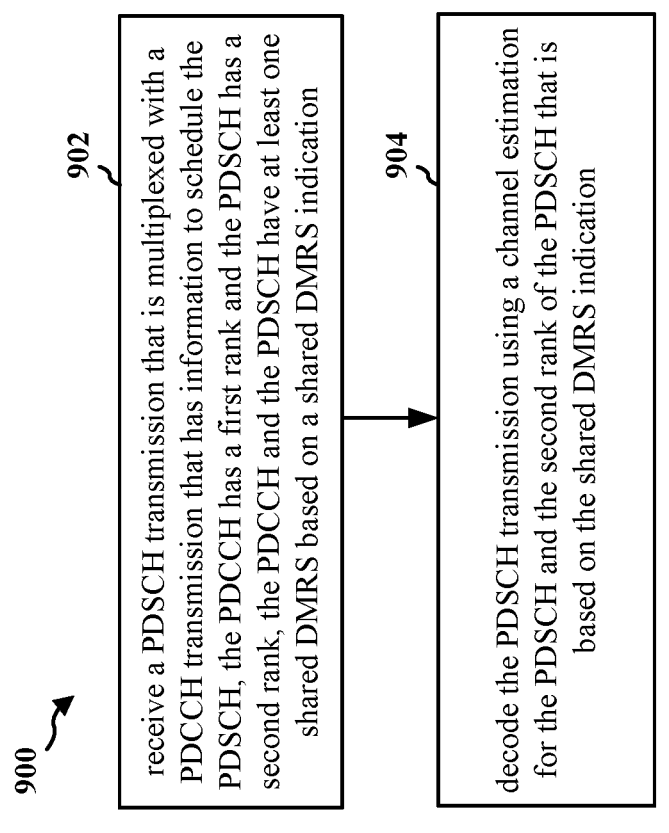

900

902 receive a PDSCH transmission that is multiplexed with a PDCCH transmission that has information to schedule the PDSCH, the PDCCH has a first rank and the PDSCH has a second rank, the PDCCH and the PDSCH have at least one shared DMRS based on a shared DMRS indication

904 decode the PDSCH transmission using a channel estimation for the PDSCH and the second rank of the PDSCH that is based on the shared DMRS indication

FIG. 9

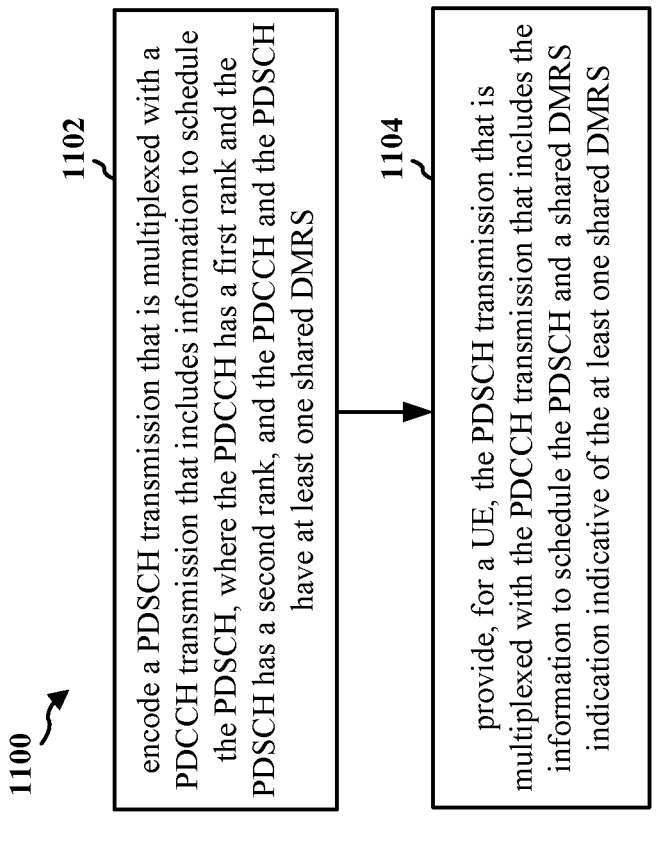

1100

1102 encode a PDSCH transmission that is multiplexed with a PDCCH transmission that includes information to schedule the PDSCH, where the PDCCH has a first rank and the PDSCH has a second rank, and the PDCCH and the PDSCH have at least one shared DMRS

1104 provide, for a UE, the PDSCH transmission that is multiplexed with the PDCCH transmission that includes the information to schedule the PDSCH and a shared DMRS indication indicative of the at least one shared DMRS

FIG. 11

PDCCH AND PDSCH MULTIPLEXING WITH RANK ADAPTATION

TECHNICAL FIELD

The present disclosure relates generally to communication systems, and more particularly, to wireless communications utilizing a control and shared channel multiplexing.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

Frequency ranges in wireless communications, such as frequency range 2 (FR2), may have analog beam restrictions, as well as frequency and time considerations, from which problems may arise. Aspects herein for physical downlink shared channel (PDSCH)/physical downlink control channel (PDCCH) multiplexing with rank adaptation provide solutions for such problems. For instance, examples herein provide for integration, e.g., multiplexing, of PDCCH/PDSCH transmissions sharing a demodulation reference signal (DMRS), as well as shared resources, which enable performance of channel estimations based on rank information for PDSCHs and identification of the rank information.

In an aspect of the disclosure, a method, a computer-readable medium, and an apparatus are provided. The apparatus may comprise a user equipment (UE), and the method may be performed at/by a UE. The apparatus is configured to receive a PDSCH transmission that is multiplexed with a PDCCH transmission that includes information to schedule the PDSCH, where the PDCCH has a first rank and the PDSCH has a second rank, and the PDCCH and the PDSCH have at least one shared DMRS based on a shared DMRS indication. The apparatus is also configured to decode the PDSCH using a channel estimation for the PDSCH and the second rank of the PDSCH that is based on the shared DMRS indication.

In the aspect, the method includes receiving a PDSCH that is multiplexed with a PDCCH that schedules the PDSCH, where the PDCCH has a first rank and the PDSCH has a second rank, and the PDCCH and the PDSCH have at least one shared DMRS based on a shared DMRS indication. The method also includes decoding the PDSCH using a channel estimation for the PDSCH and the second rank of the PDSCH that is based on the shared DMRS indication.

In another aspect of the disclosure, a method, a computer-readable medium, and an apparatus are provided. The apparatus is configured to encode a PDSCH that is multiplexed with a PDCCH that schedules the PDSCH, where the PDCCH has a first rank and the PDSCH has a second rank, and the PDCCH and the PDSCH have at least one shared DMRS. The apparatus is also configured to provide, for a UE, the PDSCH that is multiplexed with the PDCCH that schedules the PDSCH and a shared DMRS indication indicative of the at least one shared DMRS.

In the aspect, the method includes encoding a PDSCH that is multiplexed with a PDCCH that schedules the PDSCH, where the PDCCH has a first rank and the PDSCH has a second rank, and the PDCCH and the PDSCH have at least one shared DMRS. The method also includes providing, for a UE, the PDSCH that is multiplexed with the PDCCH that schedules the PDSCH and a shared DMRS indication indicative of the at least one shared DMRS.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 9 is a flowchart of a method of wireless communication, in accordance with various aspects of the present disclosure.

FIG. 11 is a flowchart of a method of wireless communication, in accordance with various aspects of the present disclosure.

DETAILED DESCRIPTION

Figure 1:
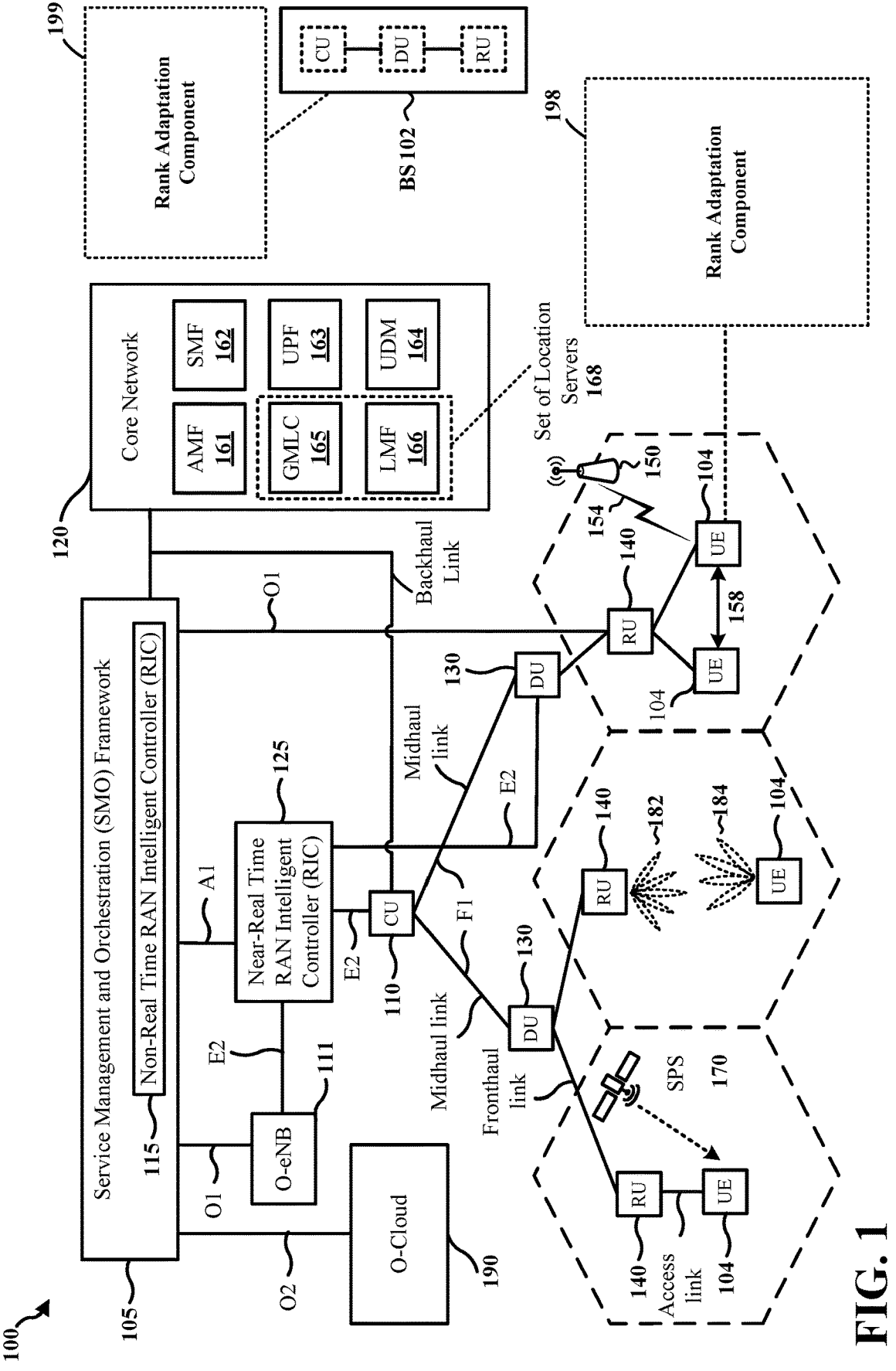
FIG. 1 is a diagram illustrating an example of a wireless communications system and an access network.

Wireless communication networks, such as a 5G NR network, among other examples of wireless communication networks, may be designed to support communications between network nodes (e.g., base stations, gNBs, etc.) and UEs. In such communications, the PDCCH may be optimized for one frequency range, and communication may be supported in one or more additional frequency ranges. A control resource set (CORESET) is a collection of resources that may be shared by multiple PDCCHs targeting multiple UEs, and the CORESET may be configured to maximize control capacity and flexibility for frequency range 1 (FR1), for example. In some aspects, to be able to send downlink control information (DCI) to multiple UEs with different geometry, different aggregation levels may be warranted. Additionally, different UEs may have different channel realization, thus the demodulation reference signal (DMRS) may be self-contained within each PDCCH to allow precoding to be separately selected for each DCI.

However, a different frequency range, such as frequency range 2 (FR2), may have analog beam restrictions. For different UEs to be served (e.g., with wireless communication traffic), the chance may be low for different UEs to be in the same analog beam, and thus service for the UEs may not support frequency division multiplexing (FDM) fashion with a single array for the different UEs, and time division multiplexing (TDM) may be used instead, or spatial division multiplexing (SDM) if there are multiple panels. Further, the subcarrier spacing (SCS) for FR2 (or higher) is larger, and the symbol/slot duration is shorter. As a result, TDM service of different UEs with smaller time units may enable communication with an acceptable delay.

Various aspects relate generally to control and shared channel multiplexing. Some aspects more specifically relate to PDCCH/PDSCH multiplexing with rank adaptation. In some examples, PDCCH/PDSCH multiplexing is optimized for a frequency range (such as FR2 and above (e.g., millimeter wave (mm Wave or mmW) and sub-THz bands)) without focusing on multiple UE DCI transmissions, but rather focusing on the provision of one or more DCI to the same UE. In some examples, precoding and/or beamforming may also be the same for all the provided DCIs as different precoding/beamforming between the PDCCH and PDSCH may have minimal, or no, real value for consideration. Accordingly, examples herein provide for integration, e.g., multiplexing, of PDCCH and PDSCH transmissions. In other words, instead of defining separate PDCCH and PDSCH regions, the described examples provide for tightly integrating the PDCCH and PDSCH transmissions. Some examples provide for shared DMRS (e.g., where the PDSCH DMRS may be used for PDCCH), as well as shared resources (e.g., the PDSCH rate matches around the resources used by the PDCCH).

Particular aspects of the subject matter described in this disclosure can be implemented to realize one or more of the following potential advantages. In some examples, by sharing the DMRS between a multiplexed PDSCH and PDCCH, the described techniques can be used to perform channel estimations based on rank information for PDSCHs. In some examples, by utilizing multiple hypotheses, semi-static rank configurations, and/or dynamic rank switching with delayed actions, the described techniques can be used to identify the rank information.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUS)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140. Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190)

to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHZ (e.g., 5, 10, 15, 20, 100, 400, etc. MHz) bandwidth per carrier allocated in a carrier aggregation of up to a total of Yx MHZ (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHZ-7.125 GHZ) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHZ-71 GHZ), FR4 (71 GHZ-114.25 GHZ), and FR5 (114.25 GHZ-300 GHz). Each of these higher frequency bands falls within the EHF band.

With the above aspects in mind, unless specifically stated otherwise, the term "sub-6 GHz" or the like if used herein may broadly represent frequencies that may be less than 6 GHZ, may be within FR1, or may include mid-band frequencies. Further, unless specifically stated otherwise, the term "millimeter wave" or the like if used herein may broadly represent frequencies that may include mid-band frequencies, may be within FR2. FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Figures 2A, 2B, 2C, 2D:
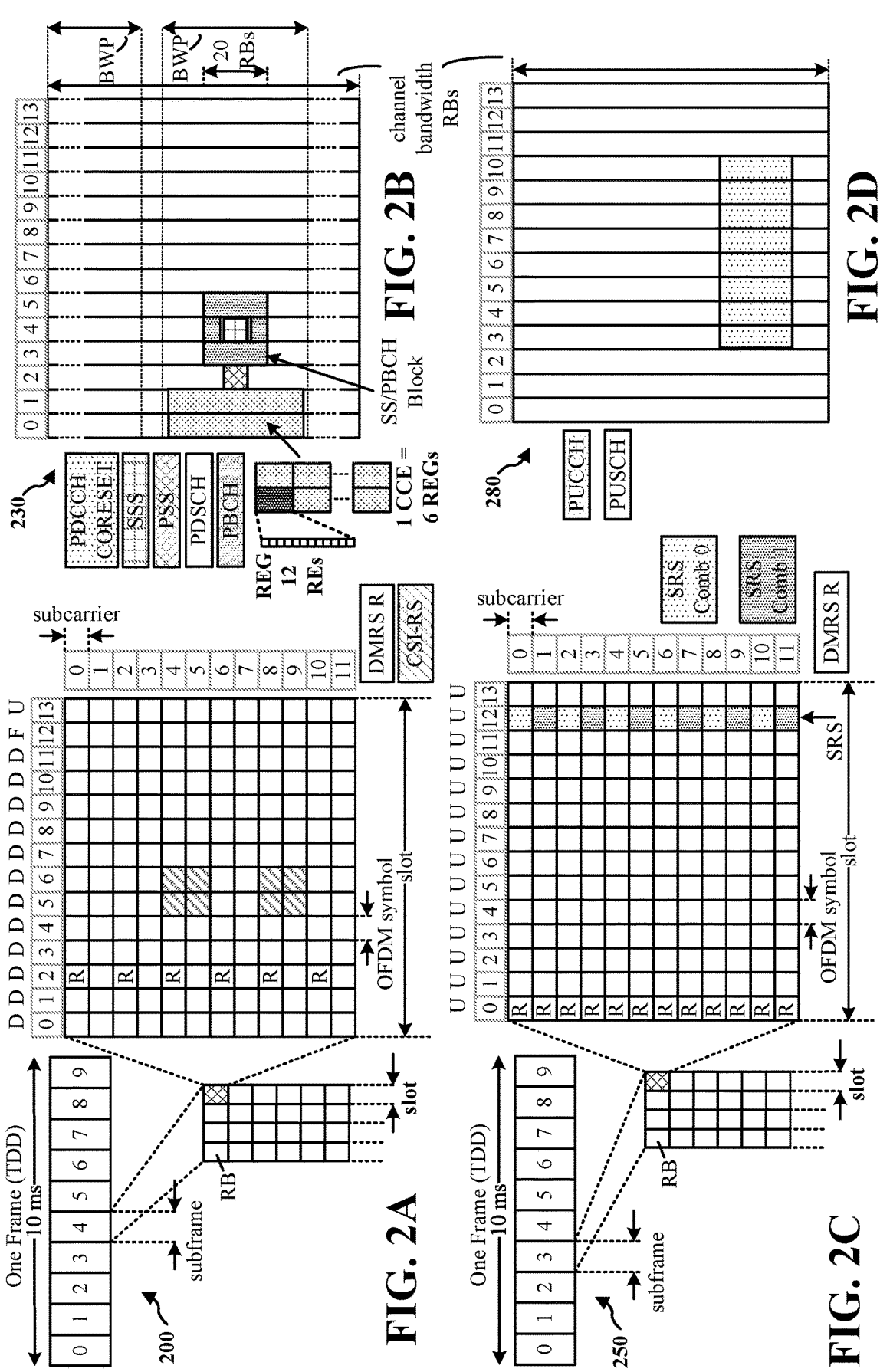
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

Referring again to FIG. 1, in certain aspects, the UE 104 may have a rank adaptation component 198 ("component 198") that may be configured to receive a PDSCH that is multiplexed with a PDCCH that schedules the PDSCH, where the PDCCH has a first rank and the PDSCH has a second rank, and the PDCCH and the PDSCH have at least one shared DMRS based on a shared DMRS indication. The component 198 may also be configured to decode the PDSCH using a channel estimation for the PDSCH and the second rank of the PDSCH that is based on the shared DMRS indication. The component 198 may be configured to identify the second rank for the PDSCH using multiple rank hypotheses associated with ports of the at least one shared DMRS. The component 198 may be configured to provide, for a network node, a capability indication for the UE, where the capability indication is indicative of a UE capability associated with a performance of the multiple rank hypotheses associated with the at least one shared DMRS. The component 198 may be configured to receive, from a network node prior to the PDSCH multiplexed with the PDCCH, a configuration of the second rank. The component 198, where the configuration is comprised in an RRC message, may be configured to receive, prior to the PDSCH multiplexed with the PDCCH, an activation or an update of the second rank in at least one of a MAC control element (MAC-CE) or DCI. The component 198 may be configured to receive, from a network node at a time length prior to the PDSCH multiplexed with the PDCCH, DCI indicative of, for a future time that corresponds to the PDSCH multiplexed with the PDCCH, at least one of the second rank or a DMRS port assignment associated with the at least one shared DMRS. The component 198 may be configured to provide, for the network node prior to the PDSCH multiplexed with the PDCCH, an acknowledgement (ACK) indication for the DCI. The component 198 may be configured to apply at least one of the second rank or the DMRS port assignment for the PDSCH multiplexed with the PDCCH based on a time delay triggered by the provision of the ACK indication. The component 198 may be configured to receive, from the network node, a default monitoring configuration that indicates a default monitoring occasion periodicity for a default PDCCH having a default rank and a default port assignment for the at least one shared DMRS. The component 198 may be configured to receive, from the network node, a default PDSCH that is multiplexed with the default PDCCH based on the default monitoring configuration and the default monitoring occasion periodicity. The component 198 may be configured to receive, from the network node, a fallback configuration that indicates (i) a fallback timer associated with a start of the PDSCH multiplexed with the PDCCH and (ii) a default port assignment for at least one shared default DMRS between a default PDSCH and a default PDCCH. The component 198 may be configured to receive, from the network node and subsequent to an expiration of the fallback timer, the default PDSCH that is multiplexed with the default PDCCH based on the fallback configuration. The component 198 may be configured to receive, from a network node and after decoding the PDSCH, a DL grant using the PDCCH, where the DL grant (i) indicates a change to a port assignment of the at least one shared DMRS at a future time and (ii) refrains from scheduling the PDSCH. In certain aspects, the base station 102 may have a rank adaptation component 199 ("component 199") that may be configured to encode a PDSCH that is multiplexed with a PDCCH that schedules the PDSCH, where the PDCCH has a first rank and the PDSCH has a second rank, and the PDCCH and the PDSCH have at least one shared DMRS. The component 199 may also be configured to provide, for a UE, the PDSCH that is multiplexed with the PDCCH that schedules the PDSCH and a shared DMRS indication indicative of the at least one shared DMRS. The component 199 may be configured to receive, from the UE, a capability indication for the UE, where the capability indication is indicative of a UE capability associated with a performance of multiple rank hypotheses associated with the at least one shared DMRS. The component 199 may be configured to configure the UE, prior to the PDSCH multiplexed with the PDCCH, with a configuration of the second rank. The component 199, where the configuration is comprised in an RRC message, may be configured to provide, prior to the PDSCH multiplexed with the PDCCH, an activation or an update of the second rank in at least one of a MAC-CE or downlink control information DCI. The component 199 may be configured to provide, for the UE at a time length prior to the PDSCH multiplexed with the PDCCH, DCI indicative of, for a future time that corresponds to the PDSCH multiplexed with the PDCCH, at least one of the second rank or a DMRS port assignment associated with the at least one shared DMRS. The component 199 may be configured to receive, from the UE prior to the PDSCH multiplexed with the PDCCH, an ACK indication for the DCI, where providing, for the UE, the PDSCH that is multiplexed with the PDCCH includes to provide the PDSCH that is multiplexed with the PDCCH based on a time delay triggered by the reception of the ACK indication. The component 199 may be configured to configure the UE with a default monitoring configuration that indicates a default monitoring occasion periodicity for a default PDCCH having a default rank and a default port assignment for the at least one shared DMRS. The component 199 may be configured to provide, for the UE, a default PDSCH that is multiplexed with the default PDCCH based on the default monitoring configuration and the default monitoring occasion periodicity. The component 199 may be configured to configure the UE with a fallback configuration that indicates (i) a fallback timer associated with a start of the PDSCH multiplexed with the PDCCH and (ii) a default port assignment for at least one shared default DMRS between a default PDSCH and a default PDCCH. The component 199 may be configured to provide, for the UE and subsequent to an expiration of the fallback timer, the default PDSCH that is multiplexed with the default PDCCH based on the fallback configuration. The component 199 may be configured to provide, for the UE and after the PDSCH that is multiplexed with the PDCCH, a DL grant using the PDCCH, where the DL grant (i) indicates a change to a port assignment of the at least one shared DMRS at a future time and (ii) refrains from scheduling the PDSCH. Accordingly, aspects herein provide for PDCCH/PDSCH multiplexing that is optimized for FR2 and above (e.g., mmW and sub-THz bands) without focusing on multiple UE DCI transmissions, but rather focusing on the provision of one or more DCI to the same UE. Aspects herein provide for tight integration, e.g., multiplexing, of PDCCH and PDSCH transmissions, instead of defining separate PDCCH and PDSCH regions, and provide for shared DMRS (e.g., the PDSCH DMRS may be used for PDCCH), as well as shared resources (e.g., the PDSCH rate matches around the resources used by the PDCCH). Aspects provide for performance of channel estimations based on rank information for PDSCHs by sharing the DMRS between a multiplexed PDSCH and PDCCH, as well as identifying the rank information by utilizing multiple hypotheses, semi-static rank configurations, and/or dynamic rank switching with delayed actions. FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

| Numerology, SCS, and CP | | |
|---|---|---|
| $\mu$ | SCS $\Delta f = 2^{\mu} \cdot 15$[kHz] | Cyclic prefix |
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2^{\mu}*15$ kHz, where $\mu$ is the numerology 0 to 4. As such, the numerology $\mu$=0 has a subcarrier spacing of 15 kHz and the numerology $\mu$=4 has a subcarrier spacing of 240 kHz. The symbol length/duration is inversely related to the subcarrier spacing. FIGS. 2A-2D provide an example of normal CP with 14 symbols per slot and numerology $\mu$=2 with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
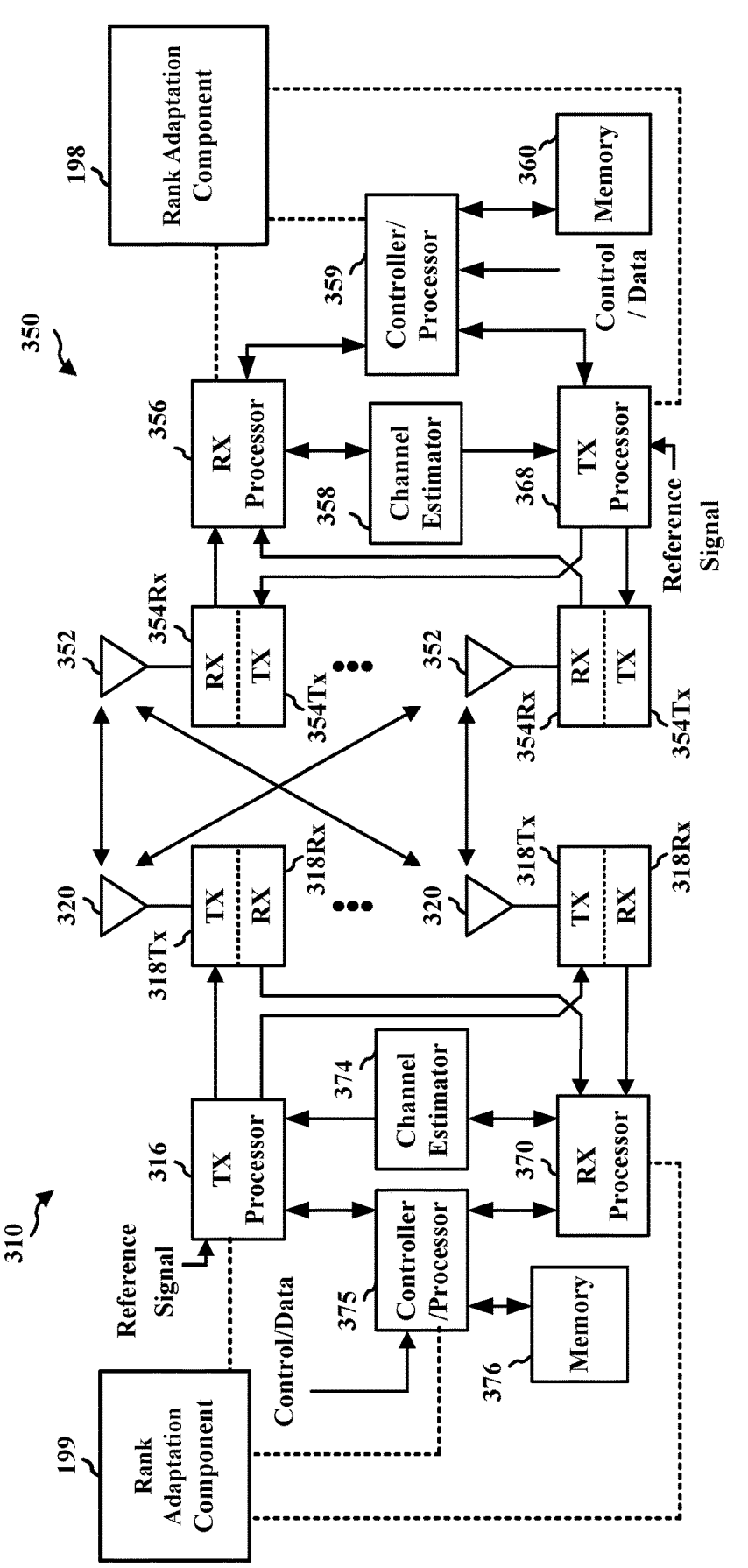
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the component 198 of FIG. 1.

At least one of the TX processor 316, the RX processor 370, and the controller/processor 375 may be configured to perform aspects in connection with the component 199 of FIG. 1.

Wireless communication networks may be designed to support communications between network nodes (e.g., base stations, gNBs, etc.) and UEs. In such communications, the PDCCH may be optimized for communication in a first frequency range, yet communication may also be supported in one or more additional frequency range. For instance, some aspects of PDCCH may be configured for FR1 and may not be as efficient for a different frequency range, such as FR2.

Figure 4B:
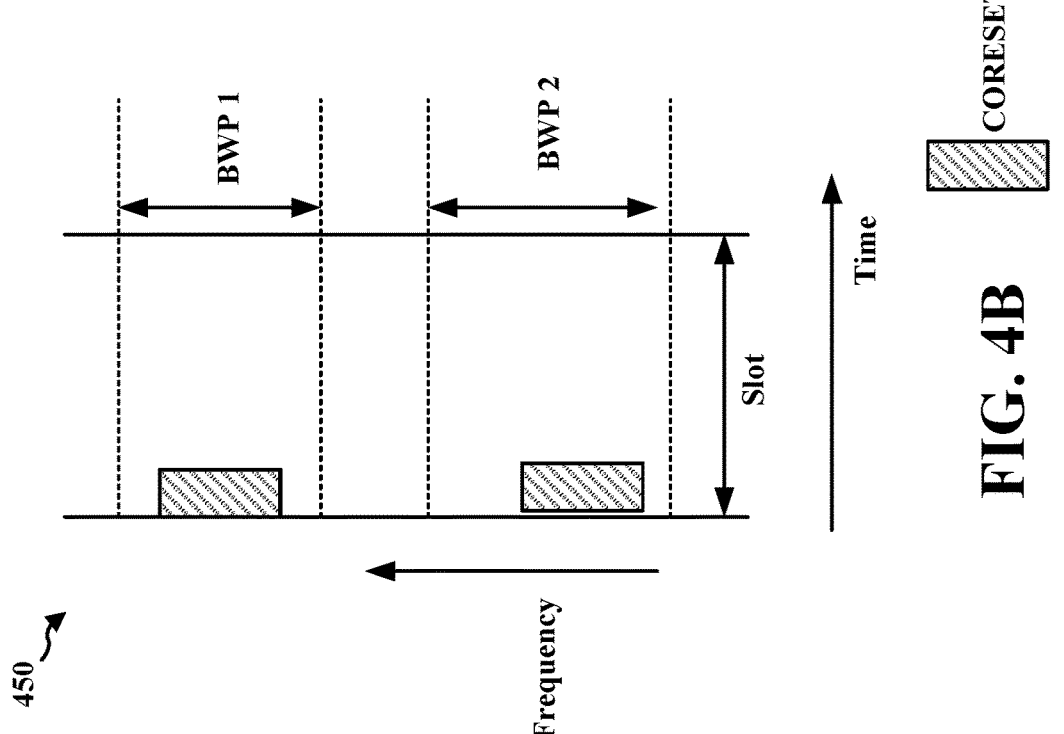
FIG. 4B is a diagram showing an example of resources for control resource sets (CORESETs).
Figure 4A:
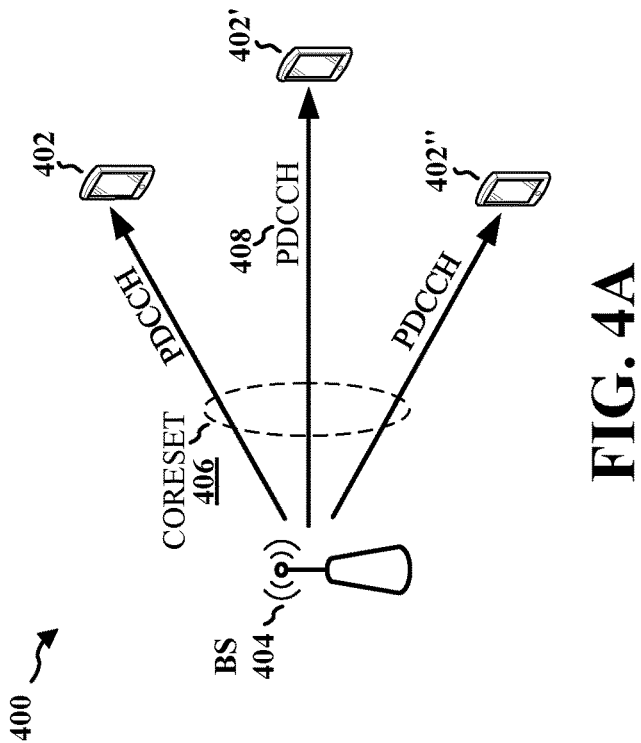
FIG. 4A is a diagram illustrating an example of PDCCH for FR1.

FIG. 4A is a diagram 400 illustrating an example of PDCCH for FR1. Diagram 400 shows a base station 404 (e.g., a gNB and/or the like) that communicates with multiple UEs: a UE 402, a UE 402', and a UE 402". A control resource set (CORESET) corresponds to a configurable set of physical resources in time and frequency that a UE uses to monitor for PDCCH/DCI. Each CORESET comprises one or more resource blocks in the frequency domain and one or more symbols in the time domain. The frequency resources of a CORESET may be contiguous or non-contiguous. As an example, a CORESET might comprise multiple RBs in the frequency domain and 1, 2, or 3 contiguous symbols in the time domain. FIG. 4B illustrates an example time and frequency diagram 450 showing multiple bandwidth parts (BWPs), and a CORESET for each BWP. A UE monitors a CORESET for PDCCH from a network. The CORESET 406 is a collection of resources that may be shared by multiple PDCCHs 408 from the base station 404 targeting multiple UEs, e.g., the UE 402, the UE 402', and/or the UE 402", and wireless communication network designs may be configured to maximize control capacity and flexibility for a first frequency range, such as FR1. As one example, to be able to send downlink DCI to multiple UEs with different geometries, e.g., the UE 402, the UE 402', and/or the UE 402", different aggregation levels may be warranted. Additionally, the UE 402, the UE 402', and/or the UE 402" may have different channel realizations, thus the DMRS may be self-contained within each PDCCH 408 to allow precoding to be separately selected for each DCI. However, a different frequency range, such as FR2, may involve analog beam restrictions. For the UE 402, the UE 402', and/or the UE 402" to be served (e.g., with traffic) for FR2, the chance may be low for the UE 402, the UE 402', and/or the UE 402" to be in the same analog beam, and thus service for these UEs in an FDM fashion (e.g., with a single array) may be less effective, and TDM may be used instead, or SDM if there are multiple panels for the UE 402, the UE 402', and/or the UE 402". Further, the SCS for FR2 (or higher) may be large, and the symbol/slot duration may be short. As a result, TDM service for the UE 402, the UE 402', and/or the UE 402" with smaller time units may still have an acceptable delay.

Aspects herein enable integrating the PDCCH and PDSCH transmissions (e.g. multiplexing) instead of defining separate PDCCH and PDSCH regions. In higher frequency bands (e.g., mmW and sub-THz bands) the UE may have analog beam restrictions. When a network node, such as a base station, serves different UEs (e.g., transmits communication to different UEs), there may be a low probability for the UEs to be in the same analog beam, and it may be less effective to serve each of the UEs in an FDM fashion on a same beam. Instead, the network node may transmit communication to the UEs in TDM manner (or SDM if there are multiple panels). Aspects presented herein provide rank adaptation schemes for integrated (e.g., multiplexed) PDCCH/PDSCH transmissions. As used herein, PDCCH/PDSCH multiplexing or PDSCH/PDCCH multiplexing may refer to transmission multiplexing in which a transmission for a PDCCH is multiplexed with a transmission for a PDSCH.

Aspects herein for PDCCH/PDSCH multiplexing with rank adaptation enable PDCCH/PDSCH multiplexing optimization for FR2 and above (e.g., mmW and sub-THz bands) without focusing on multiple UE DCI transmissions, but rather with focus on the provision of one or more DCI to the same UE. Precoding and/or beamforming may be the same for all the provided DCIs as different precoding/beamforming between the PDCCH and PDSCH may have minimal value for consideration. Accordingly, examples herein provide for integration, e.g., multiplexing, of PDCCH and PDSCH transmissions. In other words, instead of defining separate PDCCH and PDSCH regions, the described examples provide for integrating the PDCCH and PDSCH transmissions. Some examples provide for shared DMRS (e.g., where the PDSCH DMRS may be used for PDCCH), as well as shared resources (e.g., the PDSCH rate matches around the resources used by the PDCCH). Channel estimations may be performed based on rank information for PDSCHs by sharing the DMRS between a multiplexed PDSCH and PDCCH. Additionally, the rank information identified by utilizing multiple hypotheses, semi-static rank configurations, and/or dynamic rank switching with delayed actions.

The PDSCHs for a UE may have different ranks, and if the rank information is not known to perform the channel estimation using the DMRS shared between PDSCH and PDCCH, such performance may lead to inaccurate results, or may not even be possible. Thus, aspects herein provide for multiple rank hypotheses techniques, semi-static configuration of ranks, and dynamic switching of ranks with delayed action (and with a sticky characteristic for persistence).

Figure 5:
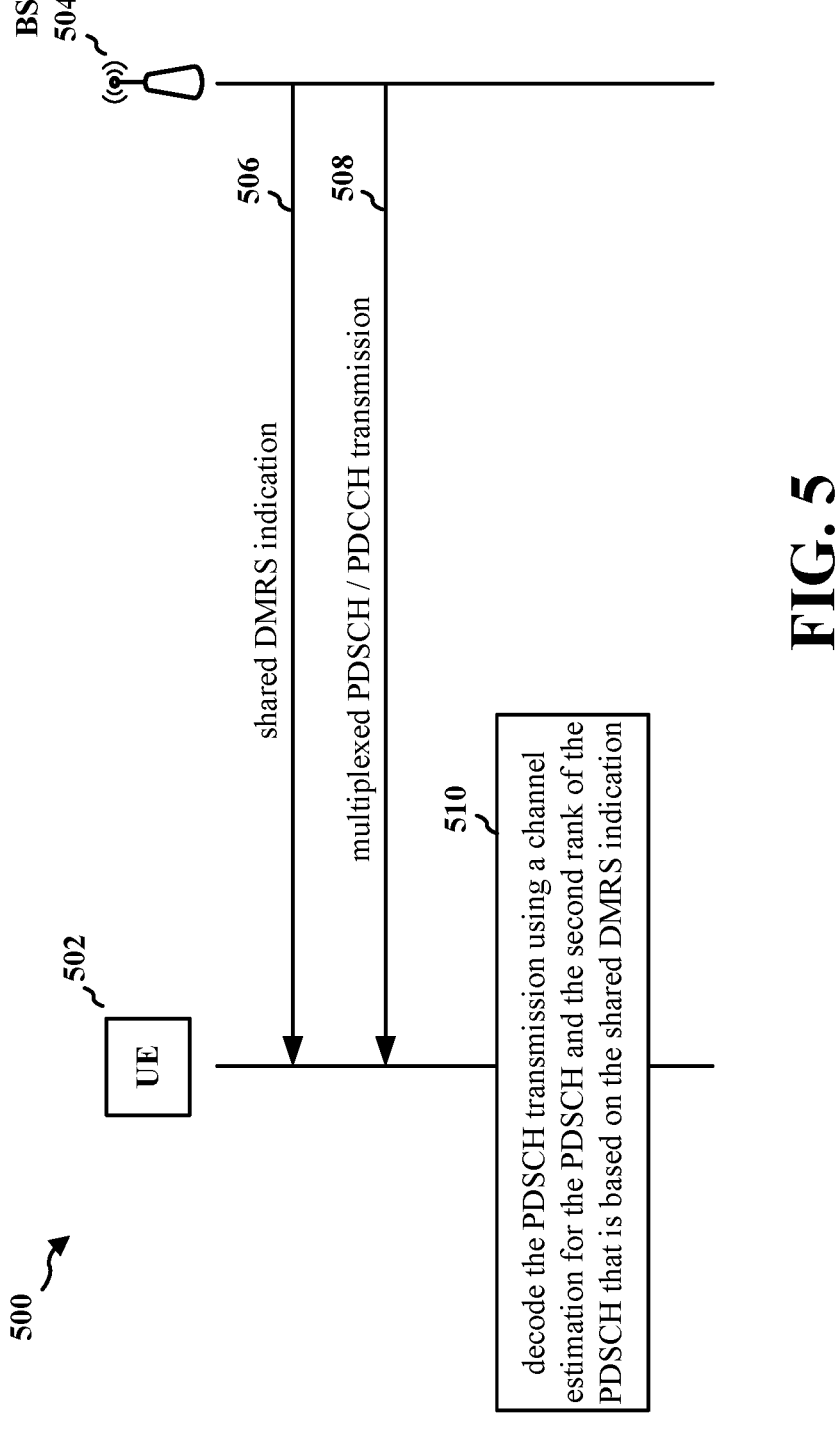
FIG. 5 is a call flow diagram for wireless communications, in accordance with various aspects of the present disclosure.

FIG. 5 is a call flow diagram 500 for wireless communications, in various aspects. Call flow diagram 500 illustrates PDCCH/PDSCH multiplexing with rank adaptation for a wireless device (a UE 502, by way of example) that communicates with the network node (a base station 504, such as a gNB or other type of base station, by way of example, as shown), in various aspects. Aspects described for the base station 504 may be performed by the base station in aggregated form and/or by one or more components of the base station in disaggregated form. Additionally, or alternatively, the aspects may be performed by the UE 502 autonomously, in addition to, and/or in lieu of, operations of the base station 504.

In the illustrated aspect, the UE 502 may be configured to receive, and the base station 504 may be configured to transmit/provide, a shared DMRS indication 506. In aspects, the shared DMRS indication 506 may be associated with a PDSCH transmission that is multiplexed with a PDCCH transmission that includes information (e.g., DCI) to schedule the PDSCH (e.g., a multiplexed PDSCH/PDCCH 508). The multiplexed PDSCH/PDCCH 508 may have at least one shared DMRS based on a shared DMRS indication 506. The shared DMRS indication 506 may be comprised in at least one of an RRC message, a MAC-CE, or DCI, in aspects. It should be noted that in the context of this description, a UE, network node, and/or other device herein, that may be configured to provide information, data, signaling, etc., may also be considered as being configured to transmit, signal, output, and/or the like, such information, data, signaling, etc.

That is, aspects may use the terms provide, transmit, signal, output, etc., synonymously and/or interchangeably.

The UE 502 may be configured to receive, and the base station 504 may be configured to transmit/provide, the multiplexed PDSCH/PDCCH 508. The PDCCH of the multiplexed PDSCH/PDCCH 508 may have a first rank, and the PDSCH of the multiplexed PDSCH/PDCCH 508 may have a second rank, where the of the multiplexed PDSCH/PDCCH 508 may have at least one shared DMRS based on the shared DMRS indication 506.

The UE 502 may be configured to decode (at 510) the PDSCH of the multiplexed PDSCH/PDCCH 508 using a channel estimation for the PDSCH of the multiplexed PDSCH/PDCCH 508 and the second rank of the PDSCH of the multiplexed PDSCH/PDCCH 508 that is based on the shared DMRS indication 506.

In aspects, e.g., for multiple rank hypotheses, to decode (at 510) the PDSCH of the multiplexed PDSCH/PDCCH 508 using the channel estimation for the PDSCH and the second rank of the PDSCH that is based on the shared DMRS indication 506, the UE 502 may be configured to identify (e.g., as part of 510) the second rank for the PDSCH using multiple rank hypotheses associated with ports of the at least one shared DMRS, e.g., as based on a shared DMRS indication 506. The UE 502 may also be configured to provide, for the base station 504, a capability indication for the UE 502. The capability indication may be indicative of a capability of the UE 502 that is associated with a performance of the multiple rank hypotheses associated with the at least one shared DMRS. In some aspects, the PDSCH of the multiplexed PDSCH/PDCCH 508 may be associated with a modulation and coding scheme (MCS) that is based on the capability indication for the UE 502. In some aspects, the performance of the multiple rank hypotheses may be associated with at least one of a rank 1 or a rank 2.

In aspects, e.g., for semi-static configurations, to decode (at 510) the PDSCH of the multiplexed PDSCH/PDCCH 508 using the channel estimation for the PDSCH and the second rank of the PDSCH that is based on the shared DMRS indication 506, the UE 502 may be configured to receive, from the base station 504 prior to the multiplexed PDSCH/PDCCH 508, a configuration of the second rank. The UE 502 may be configured to receive, and the base station 504 may be configured to transmit/provide, the configuration of the second rank via an RRC message. In such aspects, the UE 502 may be configured to receive, and the base station 504 may be configured to transmit/provide, an activation or an update of the second rank in at least one of a MAC-CE or DCI.

In aspects, e.g., for dynamic configurations, to decode (at 510) the PDSCH of the multiplexed PDSCH/PDCCH 508 using the channel estimation for the PDSCH and the second rank of the PDSCH that is based on the shared DMRS indication 506, the UE 502 may be configured to receive, and the base station 504 may be configured to transmit/provide, at a time length prior to the multiplexed PDSCH/PDCCH 508, DCI indicative of, for a future time that corresponds to the PDSCH of the multiplexed PDSCH/PDCCH 508, at least one of the second rank or a DMRS port assignment associated with the at least one shared DMRS. In some aspects, e.g., for dynamic configurations, utilization of the second rank or the DMRS port assignment by the UE 502 may be based on reliability measures, as described herein, such as provision by the UE 502 and reception by the base station 504 of an ACK indication, a configuration of the UE 502 for a semi-static rank, a configuration of the UE 502 for a default rank/DMRS port assignment, a configuration of the UE 502 for a fallback default associated with a rank/ DMRS port assignment, and/or reception by the UE 502 and provision by the base station 504 of an empty DL grant.

Figure 6:
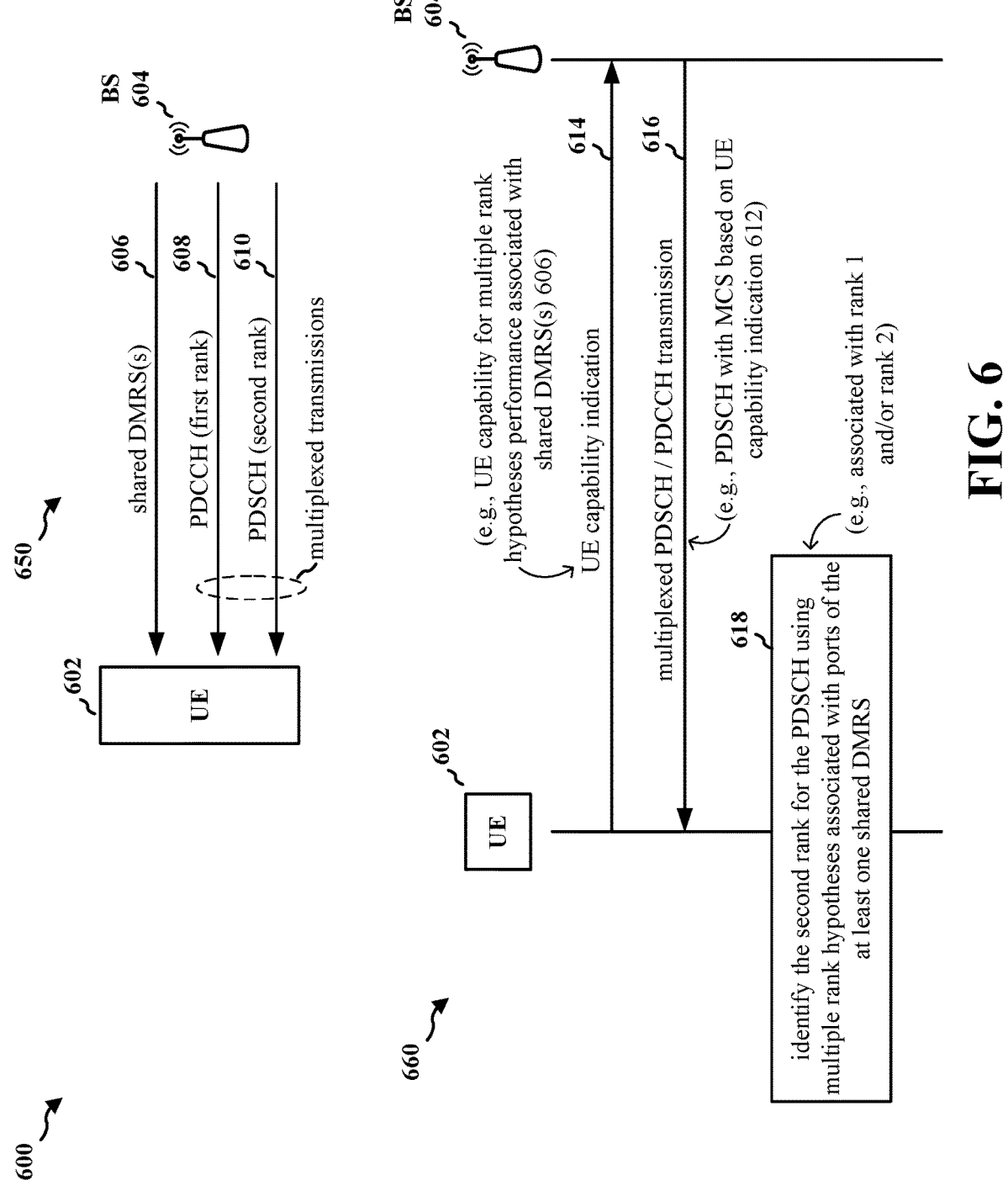
FIG. 6 is a diagram illustrating an example of PDCCH/ PDSCH multiplexing with rank adaptation, in accordance with various aspects of the present disclosure.

FIG. 6 is a diagram 600 illustrating an example of PDCCH/PDSCH multiplexing with rank adaptation, in various aspects. Diagram 600 may be a further aspect of diagram 500 in FIG. 5. Diagram 600 illustrates PDCCH/PDSCH multiplexing with rank adaptation for a wireless device (a UE 602, by way of example) that communicates with the network node (a base station 604, such as a gNB or other type of base station, by way of example, as shown), in various aspects. Diagram 600 shows examples of the UE 602 and the base station 604 in a configuration 650 illustrative of a shared DMRS 606 and a PDSCH 610 having a second rank being multiplexed with a PDCCH 608 having a first rank, and in a configuration 660 illustrative of capability for the UE 602 to perform multiple rank hypotheses and identifying the second rank for a PDSCH.

A UE such as the UE 602, to utilize multiple rank hypotheses, may rely on blind decoding to search for multiple DMRS ports, and based on the number of DMRS ports found by the UE 602, it may be capable of determining the rank. The utilization of multiple fixed DMRSs may be further extended to assuming different ranks for DMRS. The UE 602 may not know the rank of a PDSCH (and the DMRS) ahead of time, thus in aspects, the UE 602 may assume either rank 1 or rank 2 for channel estimation.

For example, in the configuration 650, the UE 602 may be configured to decode (e.g., as in FIG. 5 (at 510)) the PDSCH 610 that is multiplexed with the PDCCH 608, which schedules the PDSCH 610, using the channel estimation for the PDSCH 610 and the second rank of the PDSCH 610 that is based on the shared DMRS indication (e.g., as in FIG. 5 (506)). In aspects, to decode (at 510), the UE 602 may be configured to receive, and the base station 604 may be configured to transmit/provide, at least one shared DMRS 606 prior to the PDSCH 610 that is multiplexed with the PDCCH 608. The shared DMRS indication (e.g., as in FIG. 5 (506)) may indicate ports/port assignments of the at least one shared DMRS 606 for identification/utilization by the UE 602.

In the configuration 660, the UE 602 may be configured to provide/transmit, and the base station 604 may be configured to receive, a UE capability indication 614 ("capability indication 614") for the UE 602. The capability indication 614 may indicate UE 602 capability for multiple rank hypotheses performance associated with the at least one shared DMRS 606. In some aspects, the PDSCH 610 and/or the PDSCH of a multiplexed PDSCH/PDCCH 616, which the UE 602 may be configured to receive and the base station 604 may be configured to transmit/provide, as described herein, may be associated with a modulation and coding scheme (MCS) that is based on the capability indication 614 for the UE 602. In some aspects, accordingly, the performance of multiple rank hypotheses by the UE 602 may be associated with at least one of a rank 1 or a rank 2.

The UE 602 may be configured to decode (e.g., as in FIG. 5 (at 510)) the PDSCH 610 that is multiplexed with the PDCCH 608 using the channel estimation for the PDSCH 610 and the second rank of the PDSCH 610 that is based on the shared DMRS indication (e.g., as in FIG. 5 (506)). In some aspects, to decode (at 510), the UE 602 may be configured to identify the second rank for the PDSCH 610 using multiple rank hypotheses associated with ports of the at least one shared DMRS 606, which the UE may be configured to receive and the base station 604 may be configured to transmit/provide. As noted above, the performance of multiple rank hypotheses by the UE 602 may be associated with at least one of a rank 1 or a rank 2 for the second rank of the PDSCH in the multiplexed PDSCH/ PDCCH 616. The UE 602 may be configured to identify (at 610) the second rank for the PDSCH in the multiplexed PDSCH/PDCCH 616 using the multiple rank hypotheses associated with the ports of the at least one shared DMRS 606.

Figure 7:
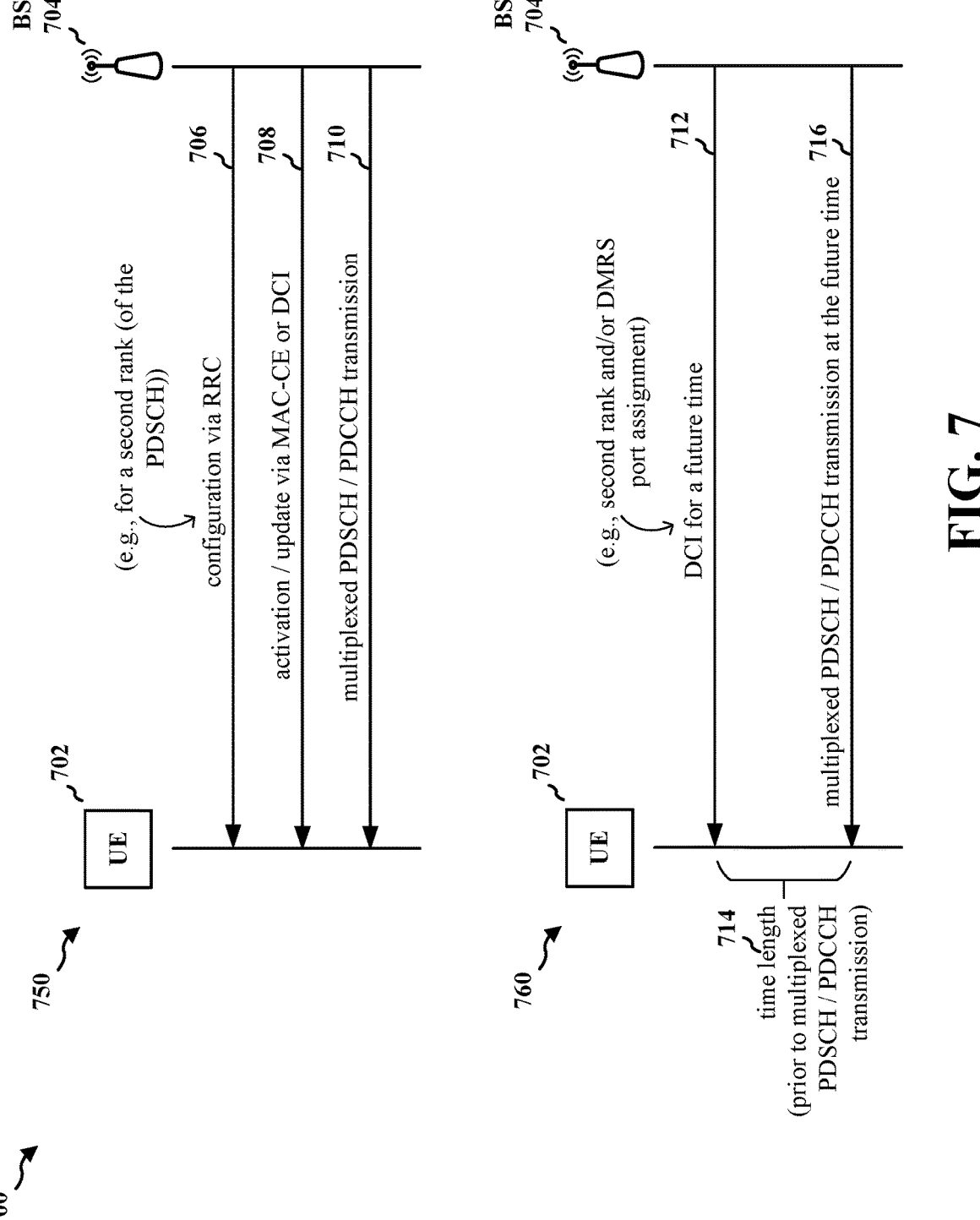
FIG. 7 is a diagram illustrating an example of PDCCH/ PDSCH multiplexing with rank adaptation, in accordance with various aspects of the present disclosure.

FIG. 7 is a diagram 700 illustrating an example of PDCCH/PDSCH multiplexing with rank adaptation, in various aspects. Diagram 700 may be a further aspect of diagram 500 in FIG. 5 and/or diagram 600 in FIG. 6. Diagram 700 illustrates PDCCH/PDSCH multiplexing with rank adaptation for a wireless device (a UE 702, by way of example) that communicates with the network node (a base station 704, such as a gNB or other type of base station, by way of example, as shown), in various aspects. Diagram 700 shows examples of the UE 702 and the base station 704 in a configuration 750 illustrative of a semi-static configuring of the UE 702 for the second rank of a PDSCH of a multiplexed PDSCH/PDCCH 710, and in a configuration 760 illustrative of a dynamic indication via DCI, for a future time, of the second rank of a PDSCH of a multiplexed PDSCH/PDCCH 716.

In DL grant DCI, a DMRS port assignment field may be included, according to aspects. However, such a DMRS port assignment field may not apply to a current grant, but may apply to PDSCHs starting from a certain time length later (e.g., at a future time). This time length associated with a future/later time may be considered for a delayed action, and the time length may be decided by the UE 702 processing time, or another time delay. The future time may be defined or configured, by way of example, as a number of slots based the DCI slot as the reference starting slot. The DMRS port assignment field may not be included for all DCI formats, e.g., if there are multiple DCI formats for DL grants being monitored.

Referring to the configuration 750, the UE 702 may be configured with the rank (e.g., the second rank) for PDSCH transmissions via RRC signaling. In aspects, the configured rank may be semi-static, and sticky, or fixed, accordingly, and it should be noted that ranks of the PDSCH and the PDCCH may be different. For instance, the UE 702 may be configured to receive, and the base station 704 may be configured to transmit/provide, a configuration 706 via RRC signaling to determine the rank of the PDSCH transmission associated with the multiplexed PDSCH/PDCCH 710. In some aspects, the DMRS ports assignments to be used, as associated therewith, may be semi-static, and sticky, or fixed. Accordingly, in some aspects the multiplexed PDSCH/PDCCH 710 may be provided/transmitted by the base station 704, and received by the UE 702, as including the configured rank indicated by the configuration 706 via RRC signaling.

A MAC-CE based and/or DCI based mechanism may be used to activate and/or update the rank assignment configured via the RRC signaling. As shown, the UE 702 may be configured to receive, and the base station 704 may be configured to transmit/provide, an activation/update 708 of the rank (e.g., the second rank) via MAC-CE based and/or DCI. Accordingly, in some aspects the multiplexed PDSCH/ PDCCH 710 may be provided/transmitted by the base station 704, and received by the UE 702, including the configured rank as indicated by the configuration 706 via RRC signaling and activated via MAC-CE and/or DCI, or as updated via MAC-CE and/or DCI, e.g., using the activation/ update 708. In such aspects, the UE 702 may be configured to receive the multiplexed PDSCH/PDCCH 710 based on the configuration 706 and/or the activation/update 708 and apply the configuration 706 and/or the activation/update 708 thereto.

Referring now to the configuration 760, DCI may be utilized for dynamic switching of DMRS port assignments/ ranks and may include an indication to be applied to the PDSCH after a certain time. For instance, the UE 702 may be configured to receive, and the base station 704 may be configured to transmit/provide, at a time length 714 prior to the multiplexed PDSCH/PDCCH 716 (e.g., the PDSCH multiplexed with the PDCCH) DCI 712. DCI 712 may be indicative of, for a future time, at least one of the second rank or a DMRS port assignment associated with the at least one shared DMRS (e.g., the at least one shared DMRS 606 in FIG. 6). In aspects, the time length 714 prior to the multiplexed PDSCH/PDCCH 716 may correspond to a time from reception of the DCI 712 to the time (e.g., the future time) of the reception for the multiplexed PDSCH/PDCCH 716.

Accordingly, in some aspects the multiplexed PDSCH/ PDCCH 716 may be provided/transmitted by the base station 704, and received by the UE 702, at the future time, based on the time length 714, based on the DCI 712 that indicates the second rank for the PDSCH and/or a DMRS port assignment associated with the at least one shared DMRS (e.g., the at least one shared DMRS 606 in FIG. 6). In such aspects, the UE 702 may be configured to receive the multiplexed PDSCH/PDCCH 716 having the second rank for the PDSCH and/or a DMRS port assignment and apply the second rank for the PDSCH and/or a DMRS port assignment thereto.

Figure 8:
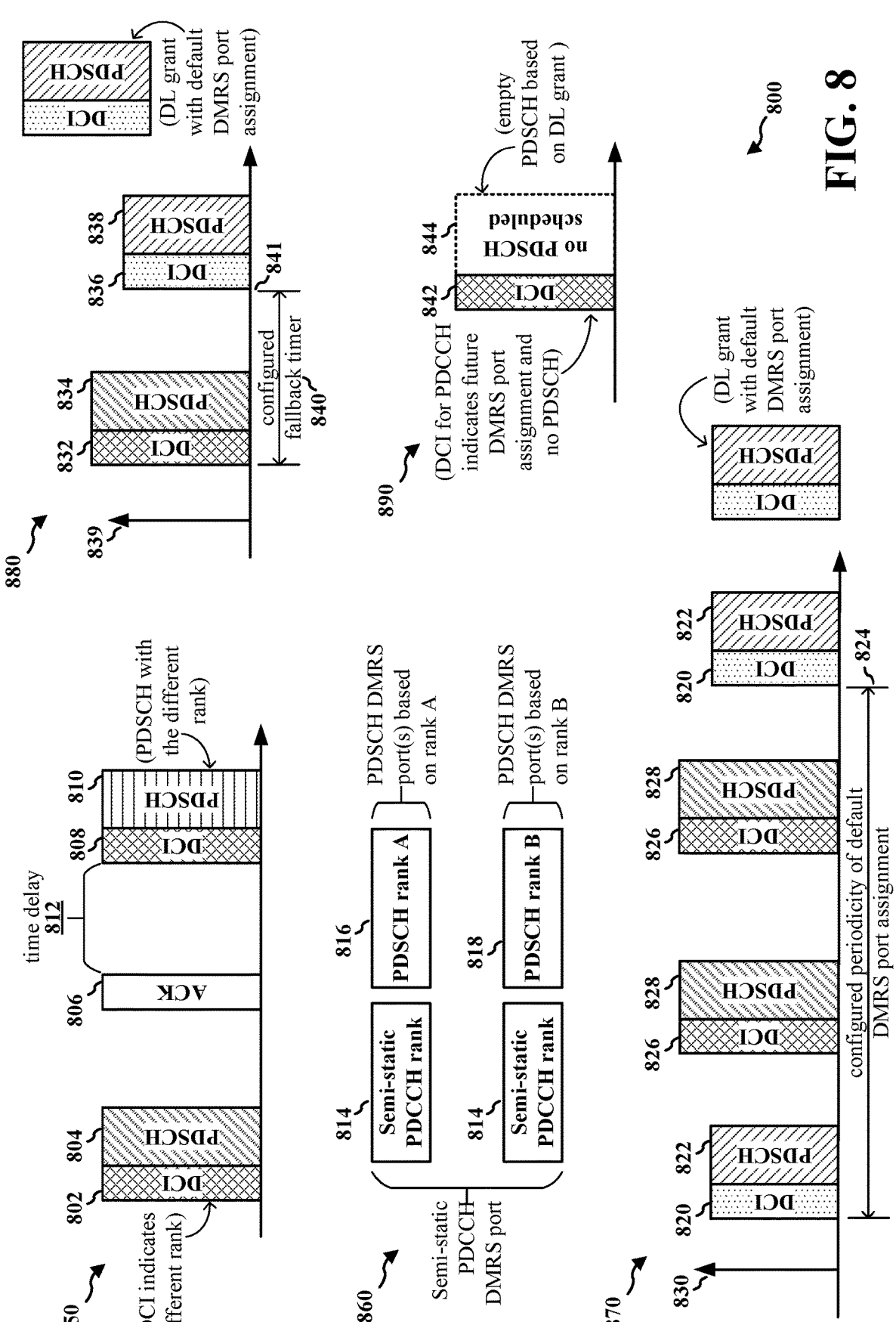
FIG. 8 is a diagram illustrating an example of PDCCH/ PDSCH multiplexing with rank adaptation, in accordance with various aspects of the present disclosure.

FIG. 8 is a diagram 800 illustrating an example of PDCCH/PDSCH multiplexing with rank adaptation, in vari- ous aspects. The illustrated aspects in diagram 800 include improvements to reliability for other PDCCH/PDSCH mul- tiplexing with rank adaptation aspects described herein. For instance, if the network node (such as a base station or gNB) and a UE have a different understanding on the DMRS port assignment, the communications therebetween may be bro- ken.

Some aspects herein provide for improvements to the consistency of network node/UE for DMRS port assignment understanding by utilizing an ACK-based approach. Some aspects herein provide for improvements to the reliability such that even if there is misunderstanding between the network node and the UE, the communication link may still go through (even if intermittently). Some aspects herein provide for improvements to for reliability through the introduction of fallback mechanisms, e.g., implemented periodically or as timer-based. Diagram 800 includes a configuration 850, a configuration 860, a configuration 870, a configuration 880, and a configuration 890, described as follows, providing details on reliability aspects for other PDCCH/PDSCH multiplexing with rank adaptation. In aspects, reliability for PDCCH/PDSCH multiplexing with rank adaptation may be applied to dynamic switching via DCI, as well as other techniques herein.

In the configuration 850, implementation of an ACK- based delay may improve reliability for PDCCH/PDSCH multiplexing with rank adaptation. In aspects, the rank application time may be a certain amount of time (e.g., in a unit of slot or absolute time (e.g., 3 ms and/or the like)) after the ACK/NACK corresponding to the DL grant associated with the PDSCH is received.

For instance, configuration 850 shows a PDSCH 804 multiplexed with a PDCCH 802 that schedules the PDSCH

804, and shows a PDSCH 810 multiplexed with a PDCCH 808 that schedules the PDSCH 810. In aspects, DCI in the PDCCH 802 may indicate a different/updated rank, but the different rank may be associated with the PDSCH 810 and not the PDSCH 804. A UE may be configured to provide an ACK indication 806 for a network node to indicate that the DCI in the PDCCH 802 was received correctly. Subsequent to a time delay 812 triggered by the ACK indication 806, a UE may apply the different/updated rank, indicated by the DCI in the PDCCH 802, to a later PDSCH (e.g., the PDSCH 810). In aspects, the network node providing the PDSCH 810 to the UE may perform such a provision with the different/updated rank under the assumption that after the time delay 812, and based on the ACK indication 806 being received, the UE will be ready and capable of handling/ decoding the PDSCH 810 with the different/updated rank.

That is, the UE may be configured to provide, for a network node prior to the PDSCH 810 multiplexed with the PDCCH 808, an ACK indication 806 for the DCI in the PDCCH 802. The UE may also be configured to apply at least one of the second rank or the DMRS port assignment for the PDSCH 810 multiplexed with the PDCCH 808 based on the time delay 812 triggered by provision of the ACK indication 806.

In the configuration 860, implementation of a semi-static rank (e.g., for a PDSCH; may be sticky and/or fixed) may improve reliability for PDCCH/PDSCH multiplexing with rank adaptation. When a rank or a DMRS port(s) changes, the PDCCH decoding may be incorrect, e.g., if the UE assumed a wrong DMRS port for the PDCCH. In aspects herein, for a semi-static/fixed PDCCH rank, with different ranks for PDSCHs, the DMRS port assignment to be used for PDCCH precoding may be sticky or fixed, based on a semi-static configuration from a network node. The configu- ration may be sticky in that it remains unchanged or fixed until reconfigured by the network. In some aspects, static or dynamic configurations from a network node may be uti- lized with, or without, the sticky/fixed characteristic noted above. As described herein, a semi-static rank for a PDCCH may be used interchangeably with a fixed/stick rank.

For instance, configuration 860 shows a PDSCH 816 multiplexed with a PDCCH 814 that schedules the PDSCH 816. The PDCCH 814 may have associated a semi-static rank therewith (e.g., a first rank that may be semi-static/ fixed). In aspects, the semi-static rank may be associated with a semi-static PDCCH DMRS port, and the rank 'A' of the PDSCH 816 may be based on the rank 'A'. As one example, where rank 'A' is rank 1, DMRS port 0 may be assumed/assigned/configured for both the PDCCH 814 and the PDSCH 816.

As another example, configuration 860 shows a PDSCH 818 multiplexed with the PDCCH 814 that schedules the PDSCH 818. The PDCCH 814 may have associated a semi-static rank therewith (e.g., a first rank that may be semi-static/fixed). In aspects, the semi-static rank may be associated with a semi-static PDCCH DMRS port, and the rank 'B' of the PDSCH 818 may be based on the rank 'B'. As one example, where rank 'B' is rank 2. DMRS port 0 may be assumed/assigned/configured for the PDCCH 814, and port 0 and 2 may be assumed/assigned/configured for the PDSCH 818.

That is, the first rank of the PDCCH 814 may be a semi-static rank that is associated with a first port assign- ment for the PDCCH 814, and a second port assignment for the PDSCH 816 may be based on the second rank of the PDSCH 816.

In the configuration 870, implementation of a default rank and/or DMRS port assignment may improve reliability for PDCCH/PDSCH multiplexing with rank adaptation. In aspects, a default rank may be used (e.g., rank 1 with its DMRS port assignment) at some PDCCH monitoring occasions to allow a network node to transmit to a UE even when the understanding of active DMRS port assignments is incorrect or out of synchronization between the network node and the UE. In some aspects, a network node may configure a UE with a periodic default rank and/or DMRS port assignment.

For example, the configuration 870 shows a periodic pattern for a default DMRS port assignment to be used irrespective of the active DMRS port assignment. A UE may be configured to receive, and a network node may be configured to transmit/provide, a default monitoring configuration 830 that indicates a default monitoring occasion periodicity 824 associated with a default PDSCH 822 multiplexed with a default PDCCH 820 that schedules the default PDSCH 822. The default monitoring occasion periodicity 824 may be defined or configured as a number of slots, or may be expressed as subframes, in aspects. The default monitoring occasion periodicity 824 may be hard-coded at a UE or configured for a UE using RRC signaling. Thus, even if an active DRMS port assignment for a PDSCH 828 multiplexed with a PDCCH 826 that schedules the PDSCH 828 is in use, and irrespective of whether the understanding of the active DMRS port assignment is synchronized, or is incorrect/out of synchronization, between the network node and the UE, the default PDSCH 822 multiplexed with a default PDCCH 820 that schedules the default PDSCH 822 may be configured (e.g., according to default monitoring configuration 830, at the default monitoring occasion periodicity 824 for the UE.

That is, a UE may be configured to receive, from network node, a default monitoring configuration 830 that indicates a default monitoring occasion periodicity 824 for a default PDCCH 820 having a default rank and a default port assignment for the at least one shared DMRS. The UE may also be configured to receive, from the network node, the default PDSCH 822 that is multiplexed with the default PDCCH 820 based on the default monitoring configuration 830 and the default monitoring occasion periodicity 824.

In the configuration 880, implementation of a timer-based fallback for rank and/or DMRS port assignment may improve reliability for PDCCH/PDSCH multiplexing with rank adaptation. In aspects, a default rank may be used (e.g., rank 1 with its DMRS port assignment) at some PDCCH monitoring occasions to allow a network node to transmit to a UE even when the understanding of active DMRS port assignments is incorrect or out of synchronization between the network node and the UE. In some aspects, a network node may configure a UE with a default DMRS port assignment and a fallback timer by which the UE may revert to the default DRMS port assignment.

For example, configuration 880 shows a fallback configuration 839, which may be received by a UE from a network node, for a fallback timer 840. The fallback timer 840 may be reset if a valid control using the current active DMRS port assignment is detected for a PDSCH 834 that is multiplexed with a PDCCH 832 having DCI that schedules the PDSCH 834. However, if there is an error and the network node and UE lose synchronization on the active DMRS port assignment, and the fallback timer 840 expires at an expiration 841, the base station and UE may be configured to establish a link again using a default DMRS port assignment, e.g., for a DL grant such as a default PDSCH 838, with a default DMRS port assignment, multiplexed with a default PDCCH 836 having DCI that schedules the default PDSCH 838.

That is, a UE may be configured to receive, from a network node, a fallback configuration 839 that indicates (i) the fallback timer 840 associated with a start of the PDSCH 834 multiplexed with the PDCCH 832 and (ii) a default port assignment for at least one shared default DMRS between the default PDSCH 838 and the default PDCCH 836. The UE may also be configured to receive, from the network node and subsequent to the expiration 841 of the fallback timer 840, the default PDSCH 838 that is multiplexed with the default PDCCH 836 based on the fallback configuration 839. The fallback timer 840 may be defined or configured as a number of slots, or may be expressed as subframes, in aspects. The fallback timer 840 may be hard-coded at a UE or configured for a UE using RRC signaling.

In the configuration 890, implementation of an empty DL grant may improve reliability for PDCCH/PDSCH multiplexing with rank adaptation. For example, configuration 890 shows a PDSCH 844, as empty, for which the DL grant 842 in DCI associated with the PDCCH does not schedule the PDSCH 844. Rather, the DL grant 842 in DCI associated with the PDCCH may be configured to indicate a future DMRS port assignment for a future PDSCH of a future DL grant for a UE. That is, a UE may be configured to receive, from a network node and after decoding a prior PDSCH that is multiplexed with a PDCCH that schedules the PDSCH, as described herein, a DL grant 842 in DCI associated with the PDCCH, where the DL grant 842 ($i$) indicates a change to a port assignment of the at least one shared DMRS at a future time and (ii) refrains from scheduling the PDSCH 844 (the empty DL grant).

FIG. 9 is a flowchart 900 of a method of wireless communication. The method may be performed by a UE (e.g., the UE 104, 502, 602, 702; the apparatus 1304). In some aspects, the method may include aspects described in connection with the communication flow in FIG. 5 and/or aspects described in FIGS. 6, 7, 8. The method may be for PDCCH and PDSCH multiplexing with rank adaptation that is optimized for FR2 and above (e.g., mmW and sub-THz bands) without focusing on multiple UE DCI transmissions, but rather focusing on the provision of one or more DCI to the same UE, with tight integration/multiplexing of PDCCH and PDSCH transmissions, instead of defining separate PDCCH and PDSCH regions, and may provide for shared DMRS (e.g., the PDSCH DMRS may be used for PDCCH), as well as shared resources (e.g., the PDSCH rate matches around the resources used by the PDCCH). The method may also provide for performance of channel estimations based on rank information for PDSCHs by sharing the DMRS between a multiplexed PDSCH and PDCCH, as well as identifying the rank information by utilizing multiple hypotheses, semi-static rank configurations, and/or dynamic rank switching with delayed actions.

In 902, the UE receives a PDSCH transmission that is multiplexed with a PDCCH transmission that schedules the PDSCH transmission, where the PDCCH transmission has a first rank and the PDSCH transmission has a second rank, and the PDCCH transmission and the PDSCH transmission have at least one shared DMRS based on a shared DMRS indication indicative of the at least one shared DMRS shared between the PDSCH transmission and the PDCCH transmission. As an example, the reception may be performed by one or more of the component 198, the transceiver 1322, and/or the antenna 1380 in FIG. 13. FIG. 5 illustrates an example of the UE 502 receiving such a PDSCH that is multiplexed with a PDCCH that schedules the PDSCH from a network node (e.g., the base station 504).

The UE 502 may be configured to receive, and the base station 504 may be configured to transmit/provide, a shared DMRS indication 506. In aspects, the shared DMRS indication 506 may be associated with a PDSCH transmission that is multiplexed with a PDCCH transmission that schedules the PDSCH transmission (e.g., a multiplexed PDSCH/PDCCH 508 (e.g., 608/610, 616 in FIG. 6; 710, 716 in FIG. 7; 802/804, 808/810, 814/816, 814/818, 820/822, 826/828, 832/834, 836/838 in FIG. 8)). The multiplexed PDSCH/PDCCH 508 (e.g., 608/610, 616 in FIG. 6; 710, 716 in FIG. 7; 802/804, 808/810, 814/816, 814/818, 820/822, 826/828, 832/834, 836/838 in FIG. 8) may have at least one shared DMRS (e.g., 606 in FIG. 6) based on a shared DMRS indication 506. The shared DMRS indication 506 may be comprised in at least one of an RRC message, a MAC-CE, or DCI, in aspects.

The UE 502 may be configured to receive, and the base station 504 may be configured to transmit/provide, the multiplexed PDSCH/PDCCH 508 (e.g., 608/610, 616 in FIG. 6; 710, 716 in FIG. 7; 802/804, 808/810, 814/816, 814/818, 820/822, 826/828, 832/834, 836/838 in FIG. 8). The PDCCH of the multiplexed PDSCH/PDCCH 508 (e.g., 608/610, 616 in FIG. 6; 710, 716 in FIG. 7; 802/804, 808/810, 814/816, 814/818, 820/822, 826/828, 832/834, 836/838 in FIG. 8) may have a first rank, and the PDSCH of the multiplexed PDSCH/PDCCH 508 (e.g., 608/610, 616 in FIG. 6; 710, 716 in FIG. 7; 802/804, 808/810, 814/816, 814/818, 820/822, 826/828, 832/834, 836/838 in FIG. 8) may have a second rank, where the of the multiplexed PDSCH/PDCCH 508 (e.g., 608/610, 616 in FIG. 6; 710, 716 in FIG. 7; 802/804, 808/810, 814/816, 814/818, 820/822, 826/828, 832/834, 836/838 in FIG. 8) may have at least one shared DMRS based on the shared DMRS indication 506.

In 904, the UE decodes the PDSCH transmission using a channel estimation for the PDSCH transmission and the second rank of the PDSCH transmission that is based on the shared DMRS indication. As an example, the decode may be performed by one or more of the component 198, the transceiver 1322, and/or the antenna 1380 in FIG. 13. FIG. 5 illustrates an example of the UE 502 decoding such a PDSCH using a channel estimation.

The UE 502 may be configured to decode (at 510) the PDSCH transmission of the multiplexed PDSCH/PDCCH 508 (e.g., 608/610, 616 in FIG. 6; 710, 716 in FIG. 7; 802/804, 808/810, 814/816, 814/818, 820/822, 826/828, 832/834, 836/838 in FIG. 8) using a channel estimation for the PDSCH of the multiplexed PDSCH/PDCCH 508 (e.g., 608/610, 616 in FIG. 6; 710, 716 in FIG. 7; 802/804, 808/810, 814/816, 814/818, 820/822, 826/828, 832/834, 836/838 in FIG. 8) and the second rank of the PDSCH of the multiplexed PDSCH/PDCCH 508 (e.g., 608/610, 616 in FIG. 6; 710, 716 in FIG. 7; 802/804, 808/810, 814/816, 814/818, 820/822, 826/828, 832/834, 836/838 in FIG. 8) that is based on the shared DMRS indication 506.

In aspects, e.g., for multiple rank hypotheses, to decode (at 510) the PDSCH transmission of the multiplexed PDSCH/PDCCH 508 (e.g., 608/610, 616 in FIG. 6; 710, 716 in FIG. 7; 802/804, 808/810, 814/816, 814/818, 820/822, 826/828, 832/834, 836/838 in FIG. 8) using the channel estimation for the PDSCH transmission and the second rank of the PDSCH transmission that is based on the shared DMRS indication 506, the UE 502 may be configured to identify (e.g., as part of 510 (e.g., at 618 in FIG. 6) the second rank for the PDSCH transmission using multiple rank hypotheses associated with ports of the at least one shared DMRS (e.g., 606 in FIG. 6), e.g., as based on a shared DMRS indication 506. The UE 502 may also be configured to provide, for the base station 504, a capability indication (e.g., 614 in FIG. 6) for the UE 502. The capability indication (e.g., 614 in FIG. 6) may be indicative of a capability of the UE 502 that is associated with a performance of the multiple rank hypotheses associated with the at least one shared DMRS (e.g., 606 in FIG. 6). In some aspects, the PDSCH transmission of the multiplexed PDSCH/PDCCH 508 (e.g., 608/610, 616 in FIG. 6; 710, 716 in FIG. 7; 802/804, 808/810, 814/816, 814/818, 820/822, 826/828, 832/834, 836/838 in FIG. 8) may be associated with a modulation and coding scheme (MCS) that is based on the capability indication (e.g., 614 in FIG. 6) for the UE 502. In some aspects, the performance of the multiple rank hypotheses may be associated with at least one of a rank 1 or a rank 2.

In aspects, e.g., for semi-static configurations, to decode (at 510) the PDSCH of the multiplexed PDSCH/PDCCH 508 (e.g., 608/610, 616 in FIG. 6; 710, 716 in FIG. 7; 802/804, 808/810, 814/816, 814/818, 820/822, 826/828, 832/834, 836/838 in FIG. 8) using the channel estimation for the PDSCH transmission and the second rank of the PDSCH transmission that is based on the shared DMRS indication 506, the UE 502 may be configured to receive, from the base station prior to the multiplexed PDSCH/PDCCH 508 (e.g., 608/610, 616 in FIG. 6; 710, 716 in FIG. 7; 802/804, 808/810, 814/816, 814/818, 820/822, 826/828, 832/834, 836/838 in FIG. 8), a configuration (e.g., 706 in FIG. 7) of the second rank. The UE 502 may be configured to receive, and the base station 504 may be configured to transmit/provide, the configuration (e.g., 706 in FIG. 7) of the second rank via an RRC message. In such aspects, the UE 502 may be configured to receive, and the base station 504 may be configured to transmit/provide, an activation or an update (e.g., 708 in FIG. 7) of the second rank in at least one of a MAC-CE or DCI.

In aspects, e.g., for dynamic configurations, to decode (at 510) the PDSCH transmission of the multiplexed PDSCH/PDCCH 508 (e.g., 608/610, 616 in FIG. 6; 710, 716 in FIG. 7; 802/804, 808/810, 814/816, 814/818, 820/822, 826/828, 832/834, 836/838 in FIG. 8) using the channel estimation for the PDSCH transmission and the second rank of the PDSCH transmission that is based on the shared DMRS indication 506, the UE 502 may be configured to receive, and the base station 504 may be configured to transmit/provide, at a time length (e.g., 714 in FIG. 7) prior to the multiplexed PDSCH/PDCCH 508 (e.g., 608/610, 616 in FIG. 6; 710, 716 in FIG. 7; 802/804, 808/810, 814/816, 814/818, 820/822, 826/828, 832/834, 836/838 in FIG. 8), DCI (e.g., 712 in FIG. 7) indicative of, for a future time that corresponds to the PDSCH of the multiplexed PDSCH/PDCCH 508 (e.g., 608/610, 616 in FIG. 6; 710, 716 in FIG. 7; 802/804, 808/810, 814/816, 814/818, 820/822, 826/828, 832/834, 836/838 in FIG. 8), at least one of the second rank or a DMRS port assignment associated with the at least one shared DMRS (e.g., 606 in FIG. 6). In some aspects, e.g., for dynamic configurations, utilization of the second rank or the DMRS port assignment by the UE 502 may be based on reliability measures, as described herein, such as provision by the UE 502 and reception by the base station 504 of an ACK indication (e.g., 806, 850 in FIG. 8) and an associated time delay (e.g., 812 in FIG. 8), a configuration of the UE 502 for a semi-static/fixed rank(s) (e.g., 860 in FIG. 8), a configuration (e.g., 830 in FIG. 8) of the UE 502 for periodicity (e.g., 824 in FIG. 8) a default rank/DMRS port assignment (e.g., 870 in FIG. 8), a configuration (e.g., 839 in FIG. 8) of the UE 502 for a fallback default (e.g., 880 in FIG. 8) associated with a rank/DMRS port assignment based on a fall back timer (e.g., 840 in FIG. 8), and/or reception by the UE 502 and provision by the base station 504 of an empty DL grant (e.g., 844, 890 in FIG. 8).

Figure 10:
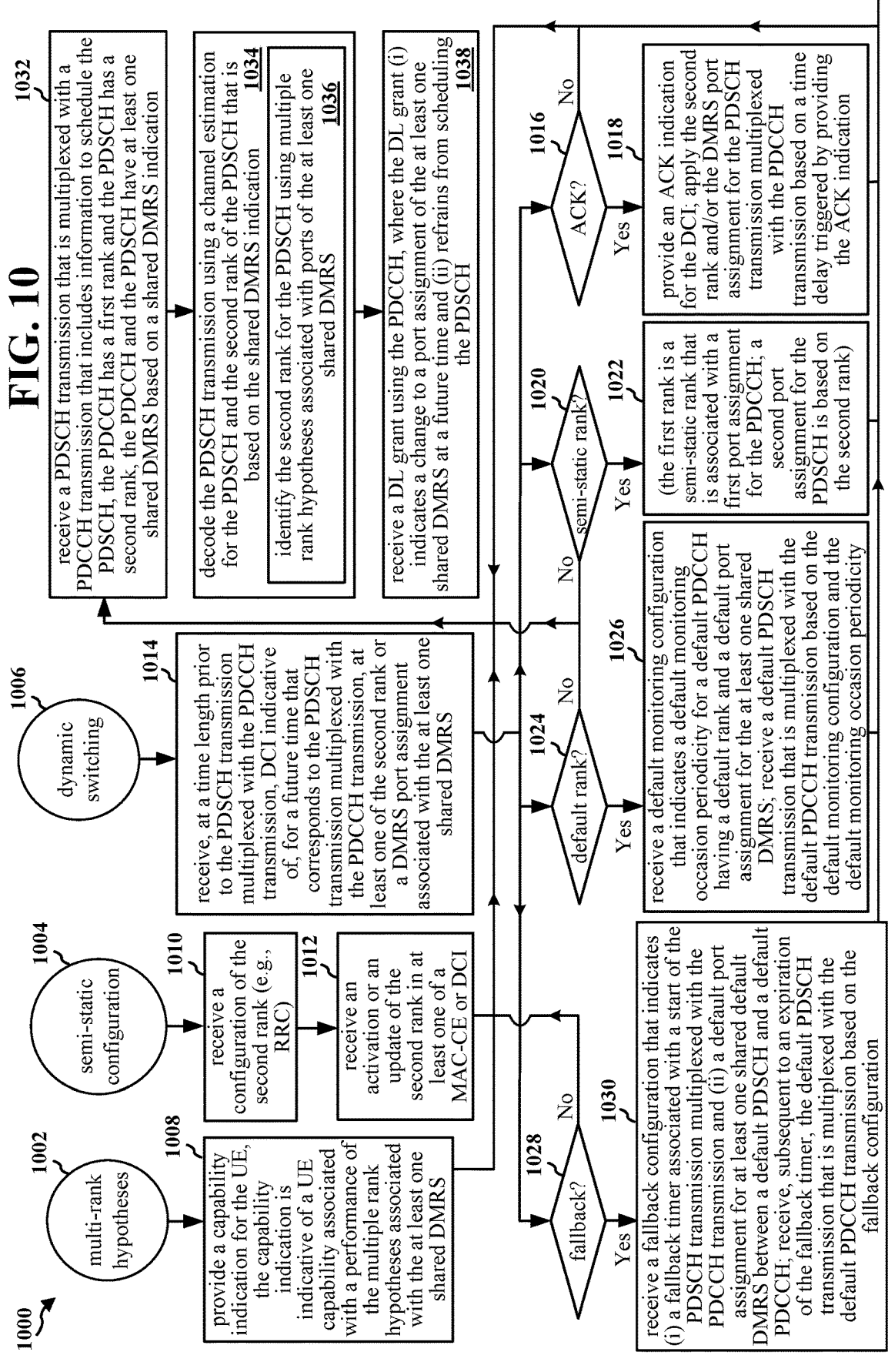
FIG. 10 is a flowchart of a method of wireless communication, in accordance with various aspects of the present disclosure.

FIG. 10 is a flowchart 1000 of a method of wireless communication. The method may be performed by a UE (e.g., the UE 104, 502, 602, 702; the apparatus 1304). In some aspects, the method may include aspects described in connection with the communication flow in FIG. 5 and/or aspects described in FIGS. 6, 7, 8. The method may be for PDCCH and PDSCH multiplexing with rank adaptation that is optimized for FR2 and above (e.g., mmW and sub-THz bands) without focusing on multiple UE DCI transmissions, but rather focusing on the provision of one or more DCI to the same UE, with tight integration/multiplexing of PDCCH and PDSCH transmissions, instead of defining separate PDCCH and PDSCH regions, and may provide for shared DMRS (e.g., the PDSCH DMRS may be used for PDCCH), as well as shared resources (e.g., the PDSCH rate matches around the resources used by the PDCCH). The method may also provide for performance of channel estimations based on rank information for PDSCHs by sharing the DMRS between a multiplexed PDSCH and PDCCH, as well as identifying the rank information by utilizing multiple hypotheses, semi-static rank configurations, and/or dynamic rank switching with delayed actions.

In aspects, as noted above, a UE may be configured for multiple rank hypotheses, semi-static configurations, and/or dynamic configurations for performance of PDCCH and PDSCH multiplexing with rank adaptation. As shown in flowchart 1000, based on the particular configuration, a UE may perform various operations/functions for PDCCH and PDSCH multiplexing with rank adaptation. For example, if multiple rank hypotheses at 1002 is performed, a UE may begin flowchart 1000 at 1008, if semi-static configurations at 1004 are utilized, a UE may begin flowchart 1000 at 1010, and if dynamic switching at 1006 is performed, a UE may begin flowchart 1000 at 1014.

In 1008, the UE provides a capability indication for the UE, the capability indication is indicative of a UE capability associated with a performance of the multiple rank hypotheses associated with the at least one shared DMRS. As an example, the provision may be performed by one or more of the component 198, the transceiver 1322, and/or the antenna 1380 in FIG. 13. FIG. 6 illustrates an example of the UE 602 (e.g., 502 in FIG. 5) providing such a capability indication for a network node (e.g., the base station 604 (e.g., 504 in FIG. 5)).

In the configuration 660, the UE 602 may be configured to provide/transmit, and the base station 604 may be configured to receive, a UE capability indication 614 ("capability indication 614") for the UE 602. The capability indication 614 may indicate UE 602 capability for multiple rank hypotheses performance associated with the at least one shared DMRS 606. In some aspects, the PDSCH 610 and/or the PDSCH of a multiplexed PDSCH/PDCCH 616, which the UE 602 may be configured to receive and the base station 604 may be configured to transmit/provide, as described herein, may be associated with a modulation and coding scheme (MCS) that is based on the capability indication 614 for the UE 602. In some aspects, accordingly, the performance of multiple rank hypotheses by the UE 602 may be associated with at least one of a rank 1 or a rank 2.

In 1010, the UE receives a configuration of the second rank. As an example, the reception may be performed by one or more of the component 198, the transceiver 1322, and/or the antenna 1380 in FIG. 13. FIG. 7 illustrates an example of the UE 702 (e.g., 502 in FIG. 5) receiving such a configuration of the second rank from a network node (e.g., the base station 704 (e.g., 504 in FIG. 5)).

In DL grant DCI, a DMRS port assignment field may be included, according to aspects. However, such a DMRS port assignment field may not apply to a current grant, but may apply to PDSCHs starting from a certain time length later (e.g., at a future time). This time length associated with a later time may be considered for a delayed action, and the time length may be decided by the UE 702 processing time, or another time delay. The DMRS port assignment field may not be included for all DCI formats, e.g., if there are multiple DCI formats for DL grants being monitored. Referring to the configuration 750, the UE 702 may be configured with the rank (e.g., the second rank) for PDSCH transmissions via RRC signaling. In aspects, the configured rank may be semi-static/fixed, accordingly, and it should be noted that ranks of the PDSCH and the PDCCH may be different. For instance, the UE 702 may be configured to receive, and the base station 704 may be configured to transmit/provide, a configuration 706 via RRC signaling to determine the rank of the PDSCH transmission associated with the multiplexed PDSCH/PDCCH 710. In some aspects, the DMRS ports assignments to be used, as associated therewith, may be semi-static/fixed. Accordingly, in some aspects the multiplexed PDSCH/PDCCH 710 may be provided/transmitted by the base station 704, and received by the UE 702, as including the configured rank indicated by the configuration 706 via RRC signaling.

In 1012, the UE receives an activation or an update of the second rank in at least one of a MAC-CE or DCI. As an example, the reception may be performed by one or more of the component 198, the transceiver 1322, and/or the antenna 1380 in FIG. 13. FIG. 7 illustrates an example of the UE 702 (e.g., 502 in FIG. 5) receiving such an activation or an update from a network node (e.g., the base station 704 (e.g., 504 in FIG. 5)).

A MAC-CE based and/or DCI based mechanism may be used to activate and/or update the rank assignment configured via the RRC signaling. As shown for the configuration 750, the UE 702 may be configured to receive, and the base station 704 may be configured to transmit/provide, an activation/update 708 of the rank (e.g., the second rank) via MAC-CE based and/or DCI. Accordingly, in some aspects the multiplexed PDSCH/PDCCH 710 may be provided/transmitted by the base station 704, and received by the UE 702, including the configured rank as indicated by the configuration 706 via RRC signaling and activated via MAC-CE and/or DCI, or as updated via MAC-CE and/or DCI, e.g., using the activation/update 708. In such aspects, the UE 702 may be configured to receive the multiplexed PDSCH/PDCCH 710 based on the configuration 706 and/or the activation/update 708 and apply the configuration 706 and/or the activation/update 708 thereto.

In 1014, the UE receives, at a time length prior to the PDSCH transmission multiplexed with the PDCCH transmission, DCI indicative of, for a future time that corresponds to the PDSCH transmission multiplexed with the PDCCH transmission, at least one of the second rank or a DMRS port assignment associated with the at least one shared DMRS. As an example, the reception may be performed by one or more of the component 198, the transceiver 1322, and/or the antenna 1380 in FIG. 13. FIG. 7 illustrates an example of the UE 702 (e.g., 504 in FIG. 5) receiving such DCI from a network node (e.g., the base station 704 (e.g., 504 in FIG. 5)).

Referring to the configuration 760, DCI may be utilized for dynamic switching of DMRS port assignments/ranks and may include an indication to be applied to the PDSCH transmission after a certain time. For instance, the UE 702 may be configured to receive, and the base station 704 may be configured to transmit/provide, at a time length 714 prior to the multiplexed PDSCH/PDCCH 716 (e.g., the PDSCH multiplexed with the PDCCH) DCI 712. DCI 712 may be indicative of, for a future time, at least one of the second rank or a DMRS port assignment associated with the at least one shared DMRS (e.g., the at least one shared DMRS 606 in FIG. 6). In aspects, the time length 714 prior to the multiplexed PDSCH/PDCCH 716 may correspond to a time from reception of the DCI 712 to the time (e.g., the future time) of the reception for the multiplexed PDSCH/PDCCH 716.

Accordingly, in some aspects the multiplexed PDSCH/PDCCH 716 may be provided/transmitted by the base station 704, and received by the UE 702, at the future time, based on the time length 714, based on the DCI 712 that indicates the second rank for the PDSCH and/or a DMRS port assignment associated with the at least one shared DMRS (e.g., the at least one shared DMRS 606 in FIG. 6). In such aspects, the UE 702 may be configured to receive the multiplexed PDSCH/PDCCH 716 having the second rank for the PDSCH and/or a DMRS port assignment and apply the second rank for the PDSCH and/or a DMRS port assignment thereto.

As described herein, reliability mechanism are provided for aspects of PDCCH and PDSCH multiplexing with rank adaptation. While described in terms of dynamic switching/configurations, the reliability mechanism provided for aspects herein are not so limited, and may be applied to other types of configurations described. As shown for the illustrated aspect, from 1014, flowchart 1000 may continue to one or more of 1016, 1020, 1024, and/or 1028.

In 1016, the UE determines if it is configured to provide an ACK indication for DCI associated with a PDCCH with which a PDSCH is multiplexed. As an example, the determination may be performed by the component 198. If so, flowchart 1000 continues to 1018; if not, flowchart 1000 continues to 1032.

In 1018, the UE provides an ACK indication for the DCI and applies the second rank and/or the DMRS port assignment for the PDSCH multiplexed with the PDCCH based on a time delay triggered by providing the ACK indication. As an example, the provision and/or application may be performed by one or more of the component 198, the transceiver 1322, and/or the antenna 1380 in FIG. 13. FIG. 8 illustrates an example of a UE (e.g., the UE 502 in FIG. 5) providing such an ACK indication for a network node (e.g., the base station 504 in FIG. 5) and applying the second rank and/or the DMRS port assignment.

Some aspects herein provide for improvements to the consistency of network node/UE for DMRS port assignment understanding by utilizing an ACK-based approach. In the configuration 850, implementation of an ACK-based delay may improve reliability for PDCCH/PDSCH multiplexing with rank adaptation. In aspects, the rank application time may be a certain amount of time (e.g., in a unit of slot or absolute time (e.g., 3 ms and/or the like)) after the ACK/NACK corresponding to the DL grant associated with the PDSCH is received.

For instance, configuration 850 shows a PDSCH 804 multiplexed with a PDCCH 802 that schedules the PDSCH 804, and shows a PDSCH 810 multiplexed with a PDCCH 808 that schedules the PDSCH 810. In aspects, DCI in the PDCCH 802 may indicate a different/updated rank, but the different rank may be associated with the PDSCH 810 and not the PDSCH 804. A UE may be configured to provide an ACK indication 806 for a network node to indicate that the DCI in the PDCCH 802 was received correctly. Subsequent to a time delay 812 triggered by the ACK indication 806, a UE may apply the different/updated rank, indicated by the DCI in the PDCCH 802, to a later PDSCH (e.g., the PDSCH 810). In aspects, the network node providing the PDSCH 810 to the UE may perform such a provision with the different/updated rank under the assumption that after the time delay 812, and based on the ACK indication 806 being received, the UE will be ready and capable of handling/decoding the PDSCH 810 with the different/updated rank. That is, the UE may be configured to provide, for a network node prior to the PDSCH 810 multiplexed with the PDCCH 808, an ACK indication 806 for the DCI in the PDCCH 802. The UE may also be configured to apply at least one of the second rank or the DMRS port assignment for the PDSCH 810 multiplexed with the PDCCH 808 based on the time delay 812 triggered by provision of the ACK indication 806.

In 1020, the UE determines if it is configured to use a semi-static rank associated with a PDSCH transmission and PDCCH transmission that are multiplexed for rank adaptation. As an example, the determination may be performed by the component 198. If so, flowchart 1000 continues to 1022; if not, flowchart 1000 continues to 1032.

In 1022, the first rank may be a semi-static rank that is associated with a first port assignment for the PDCCH transmission, and a second port assignment for the PDSCH transmission may be based on the second rank. As an example, the reception of such a configuration may be performed by one or more of the component 198, the transceiver 1322, and/or the antenna 1380 in FIG. 13. FIG. 8 illustrates an example of where such semi-static rank aspects are implemented for a UE (e.g., the UE 502 in FIG. 5).

Some aspects herein provide for improvements to the reliability such that even if there is misunderstanding between the network node and the UE, the communication link may still go through (even if intermittently). In the configuration 860, implementation of a semi-static rank (e.g., for a PDSCH) may improve reliability for PDCCH/PDSCH multiplexing with rank adaptation. When a rank or a DMRS port(s) changes, the PDCCH decoding may be incorrect, e.g., if the UE assumed a wrong DMRS port for the PDCCH. In aspects herein, for a semi-static PDCCH rank, with different ranks for PDSCHs, the DMRS port assignment to be used for PDCCH precoding may be semi-static/fixed.

For instance, configuration 860 shows a PDSCH 816 multiplexed with a PDCCH 814 that schedules the PDSCH 816. The PDCCH 814 may have associated a semi-static rank therewith (e.g., a first rank that may be semi-static/fixed). In aspects, the semi-static rank may be associated with a semi-static PDCCH DMRS port, and the rank 'A' of the PDSCH 816 may be based on the rank 'A'. As one example, where rank 'A' is rank 1, DMRS port 0 may be assumed/assigned/configured for both the PDCCH 814 and the PDSCH 816. As another example, configuration 860 shows a PDSCH 818 multiplexed with the PDCCH 814 that schedules the PDSCH 818. The PDCCH 814 may have associated a semi-static rank therewith (e.g., a first rank that may be semi-static/fixed). In aspects, the semi-static rank may be associated with a semi-static PDCCH DMRS port, and the rank 'B' of the PDSCH 818 may be based on the rank 'B'. As one example, where rank 'B' is rank 2, DMRS port 0 may be assumed/assigned/configured for the PDCCH 814, and port 0 and 2 may be assumed/assigned/configured for the PDSCH 818. That is, the first rank of the PDCCH 814 may be a semi-static rank that is associated with a first port assignment for the PDCCH 814, and a second port assignment for the PDSCH 816 may be based on the second rank of the PDSCH 816.

In 1024, the UE determines if it is configured to use a default rank associated with a monitoring periodicity for a PDSCH and a PDCCH that are multiplexed for rank adaptation. As an example, the determination may be performed by the component 198. If so, flowchart 1000 continues to 1026; if not, flowchart 1000 continues to 1032.

In 1026, the UE receives a default monitoring configuration that indicates a default monitoring occasion periodicity for a default PDCCH having a default rank and a default port assignment for the at least one shared DMRS, and receives a default PDSCH that is multiplexed with the default PDCCH based on the default monitoring configuration and the default monitoring occasion periodicity. As an example, the reception may be performed by one or more of the component 198, the transceiver 1322, and/or the antenna 1380 in FIG. 13. FIG. 8 illustrates an example of a UE (e.g., the UE 502 in FIG. 5) receiving such a default monitoring configuration and default multiplexed PDSCH/PDCCH from a network node (e.g., the base station 504 in FIG. 5).

Some aspects herein provide for improvements to for reliability through the introduction of fallback mechanisms, e.g., implemented periodically or as timer-based. In the configuration 870, implementation of a default rank and/or DMRS port assignment may improve reliability for PDCCH/PDSCH multiplexing with rank adaptation. In aspects, a default rank may be used (e.g., rank 1 with its DMRS port assignment) at some PDCCH monitoring occasions to allow a network node to transmit to a UE even when the understanding of active DMRS port assignments is incorrect or out of synchronization between the network node and the UE. In some aspects, a network node may configure a UE with a periodic default rank and/or DMRS port assignment. For example, the configuration 870 shows a periodic pattern for a default DMRS port assignment to be used irrespective of the active DMRS port assignment. A UE may be configured to receive, and a network node may be configured to transmit/provide, a default monitoring configuration 830 that indicates a default monitoring occasion periodicity 824 associated with a default PDSCH 822 multiplexed with a default PDCCH 820 that schedules the default PDSCH 822. Thus, even if an active DRMS port assignment for a PDSCH 828 multiplexed with a PDCCH 826 that schedules the PDSCH 828 is in use, and irrespective of whether the understanding of the active DMRS port assignment is synchronized, or is incorrect/out of synchronization, between the network node and the UE, the default PDSCH 822 multiplexed with a default PDCCH 820 that schedules the default PDSCH 822 may be configured (e.g., according to default monitoring configuration 830, at the default monitoring occasion periodicity 824 for the UE. That is, a UE may be configured to receive, from network node, a default monitoring configuration 830 that indicates a default monitoring occasion periodicity 824 for a default PDCCH 820 having a default rank and a default port assignment for the at least one shared DMRS. The UE may also be configured to receive, from the network node, the default PDSCH 822 that is multiplexed with the default PDCCH 820 based on the default monitoring configuration 830 and the default monitoring occasion periodicity 824.

In 1028, the UE determines if it is configured to use a fallback/default rank associated with a fallback timer for a PDSCH and a PDCCH that are multiplexed for rank adaptation. As an example, the determination may be performed by the component 198. If so, flowchart 1000 continues to 1030; if not, flowchart 1000 continues to 1032.

In 1030, the UE receives a fallback configuration that indicates (i) a fallback timer associated with a start of the PDSCH transmission multiplexed with the PDCCH transmission and (ii) a default port assignment for at least one shared default DMRS between a default PDSCH and a default PDCCH, and receives, subsequent to an expiration of the fallback timer, the default PDSCH that is multiplexed with the default PDCCH based on the fallback configuration. As an example, the reception may be performed by one or more of the component 198, the transceiver 1322, and/or the antenna 1380 in FIG. 13. FIG. 8 illustrates an example of a UE (e.g., the UE 502 in FIG. 5) receiving such a fallback indication and default multiplexed PDSCH/PDCCH from a network node (e.g., the base station 504 in FIG. 5).

Some aspects herein provide for improvements to for reliability through the introduction of fallback mechanisms, e.g., implemented periodically or as timer-based. In the configuration 880, implementation of a timer-based fallback for rank and/or DMRS port assignment may improve reliability for PDCCH/PDSCH multiplexing with rank adaptation. In aspects, a default rank may be used (e.g., rank 1 with its DMRS port assignment) at some PDCCH monitoring occasions to allow a network node to transmit to a UE even when the understanding of active DMRS port assignments is incorrect or out of synchronization between the network node and the UE. In some aspects, a network node may configure a UE with a default DMRS port assignment and a fallback timer by which the UE may revert to the default DRMS port assignment. For example, configuration 880 shows a fallback configuration 839, which may be received by a UE from a network node, for a fallback timer 840. The fallback timer 840 may be reset if a valid control using the current active DMRS port assignment is detected for a PDSCH 834 that is multiplexed with a PDCCH 832 having DCI that schedules the PDSCH 834. However, if there is an error and the network node and UE lose synchronization on the active DMRS port assignment, and the fallback timer 840 expires at an expiration 841, the base station and UE may be configured to establish a link again using a default DMRS port assignment, e.g., for a DL grant such as a default PDSCH 838, with a default DMRS port assignment, multiplexed with a default PDCCH 836 having DCI that schedules the default PDSCH 838. That is, a UE may be configured to receive, from a network node, a fallback configuration 839 that indicates (i) the fallback timer 840 associated with a start of the PDSCH 834 multiplexed with the PDCCH 832 and (ii) a default port assignment for at least one shared default DMRS between the default PDSCH 838 and the default PDCCH 836. The UE may also be configured to receive, from the network node and subsequent to the expiration 841 of the fallback timer 840, the default PDSCH 838 that is multiplexed with the default PDCCH 836 based on the fallback configuration 839.

It is also contemplated herein that aspects provide for a UE to continue from 1014 to 1032 without implementing a reliability mechanism.

In 1032, the UE receives a PDSCH that is multiplexed with a PDCCH that schedules the PDSCH, where the PDCCH has a first rank and the PDSCH has a second rank, and the PDCCH and the PDSCH have at least one shared DMRS based on a shared DMRS indication. As an example, the reception may be performed by one or more of the component 198, the transceiver 1322, and/or the antenna 1380 in FIG. 13. FIG. 5 illustrates an example of the UE 502 receiving such a PDSCH that is multiplexed with a PDCCH that schedules the PDSCH from a network node (e.g., the base station 504). The UE 502 may be configured to receive, and the base station 504 may be configured to transmit/provide, a shared DMRS indication 506. In aspects, the shared DMRS indication 506 may be associated with a PDSCH that is multiplexed with a PDCCH that schedules the PDSCH (e.g., a multiplexed PDSCH/PDCCH 508 (e.g., 608/610, 616 in FIG. 6; 710, 716 in FIG. 7; 802/804, 808/810, 814/816, 814/818, 820/822, 826/828, 832/834, 836/838 in FIG. 8)). The multiplexed PDSCH/PDCCH 508 (e.g., 608/610, 616 in FIG. 6; 710, 716 in FIG. 7; 802/804, 808/810, 814/816, 814/818, 820/822, 826/828, 832/834, 836/838 in FIG. 8) may have at least one shared DMRS (e.g., 606 in FIG. 6) based on a shared DMRS indication 506. The shared DMRS indication 506 may be comprised in at least one of an RRC message, a MAC-CE, or DCI, in aspects.

The UE 502 may be configured to receive, and the base station 504 may be configured to transmit/provide, the multiplexed PDSCH/PDCCH 508 (e.g., 608/610, 616 in FIG. 6; 710, 716 in FIG. 7; 802/804, 808/810, 814/816, 814/818, 820/822, 826/828, 832/834, 836/838 in FIG. 8). The PDCCH of the multiplexed PDSCH/PDCCH 508 (e.g., 608/610, 616 in FIG. 6; 710, 716 in FIG. 7; 802/804, 808/810, 814/816, 814/818, 820/822, 826/828, 832/834, 836/838 in FIG. 8) may have a first rank, and the PDSCH of the multiplexed PDSCH/PDCCH 508 (e.g., 608/610, 616 in FIG. 6; 710, 716 in FIG. 7; 802/804, 808/810, 814/816, 814/818, 820/822, 826/828, 832/834, 836/838 in FIG. 8) may have a second rank, where the of the multiplexed PDSCH/PDCCH 508 (e.g., 608/610, 616 in FIG. 6; 710, 716 in FIG. 7; 802/804, 808/810, 814/816, 814/818, 820/822, 826/828, 832/834, 836/838 in FIG. 8) may have at least one shared DMRS based on the shared DMRS indication 506.

In 1034, the UE decodes the PDSCH using a channel estimation for the PDSCH and the second rank of the PDSCH that is based on the shared DMRS indication. As an example, the decode may be performed by one or more of the component 198, the transceiver 1322, and/or the antenna 1380 in FIG. 13. FIG. 5 illustrates an example of the UE 502 decoding such a PDSCH using a channel estimation.

The UE 502 may be configured to decode (at 510) the PDSCH of the multiplexed PDSCH/PDCCH 508 (e.g., 608/610, 616 in FIG. 6; 710, 716 in FIG. 7; 802/804, 808/810, 814/816, 814/818, 820/822, 826/828, 832/834, 836/838 in FIG. 8) using a channel estimation for the PDSCH of the multiplexed PDSCH/PDCCH 508 (e.g., 608/610, 616 in FIG. 6; 710, 716 in FIG. 7; 802/804, 808/810, 814/816, 814/818, 820/822, 826/828, 832/834, 836/838 in FIG. 8) and the second rank of the PDSCH of the multiplexed PDSCH/PDCCH 508 (e.g., 608/610, 616 in FIG. 6; 710, 716 in FIG. 7; 802/804, 808/810, 814/816, 814/818, 820/822, 826/828, 832/834, 836/838 in FIG. 8) that is based on the shared DMRS indication 506.

In aspects, to decode in 1034, and as shown in 1036, the UE identifies the second rank for the PDSCH transmission using multiple rank hypotheses associated with ports of the at least one shared DMRS. As an example, the identification may be performed by one or more of the component 198, the transceiver 1322, and/or the antenna 1380 in FIG. 13. FIG. 5 illustrates an example of the UE 502 identifying the second rank for the PDSCH using multiple rank hypotheses.

In aspects, e.g., for multiple rank hypotheses, to decode (at 510) the PDSCH of the multiplexed PDSCH/PDCCH 508 (e.g., 608/610, 616 in FIG. 6; 710, 716 in FIG. 7; 802/804, 808/810, 814/816, 814/818, 820/822, 826/828, 832/834, 836/838 in FIG. 8) using the channel estimation for the PDSCH and the second rank of the PDSCH that is based on the shared DMRS indication 506, the UE 502 may be configured to identify (e.g., as part of 510 (e.g., at 618 in FIG. 6) the second rank for the PDSCH using multiple rank hypotheses associated with ports of the at least one shared DMRS (e.g., 606 in FIG. 6), e.g., as based on a shared DMRS indication 506. The UE 502 may also be configured to provide, for the base station 504, a capability indication (e.g., 614 in FIG. 6) for the UE 502. The capability indication (e.g., 614 in FIG. 6) may be indicative of a capability of the UE 502 that is associated with a performance of the multiple rank hypotheses associated with the at least one shared DMRS (e.g., 606 in FIG. 6). In some aspects, the PDSCH of the multiplexed PDSCH/PDCCH 508 (e.g., 608/610, 616 in FIG. 6; 710, 716 in FIG. 7; 802/804, 808/810, 814/816, 814/818, 820/822, 826/828, 832/834, 836/838 in FIG. 8) may be associated with a modulation and coding scheme (MCS) that is based on the capability indication (e.g., 614 in FIG. 6) for the UE 502. In some aspects, the performance of the multiple rank hypotheses may be associated with at least one of a rank 1 or a rank 2.

In aspects, e.g., for semi-static configurations, to decode (at 510) the PDSCH of the multiplexed PDSCH/PDCCH 508 (e.g., 608/610, 616 in FIG. 6; 710, 716 in FIG. 7; 802/804, 808/810, 814/816, 814/818, 820/822, 826/828, 832/834, 836/838 in FIG. 8) using the channel estimation for the PDSCH and the second rank of the PDSCH that is based on the shared DMRS indication 506, the UE 502 may be configured to receive, from the base station prior to the multiplexed PDSCH/PDCCH 508 (e.g., 608/610, 616 in FIG. 6; 710, 716 in FIG. 7; 802/804, 808/810, 814/816, 814/818, 820/822, 826/828, 832/834, 836/838 in FIG. 8), a configuration (e.g., 706 in FIG. 7) of the second rank. The UE 502 may be configured to receive, and the base station 504 may be configured to transmit/provide, the configuration (e.g., 706 in FIG. 7) of the second rank via an RRC message. In such aspects, the UE 502 may be configured to receive, and the base station 504 may be configured to transmit/provide, an activation or an update (e.g., 708 in FIG. 7) of the second rank in at least one of a MAC-CE or DCI.

In aspects, e.g., for dynamic configurations, to decode (at 510) the PDSCH of the multiplexed PDSCH/PDCCH 508 (e.g., 608/610, 616 in FIG. 6; 710, 716 in FIG. 7; 802/804, 808/810, 814/816, 814/818, 820/822, 826/828, 832/834, 836/838 in FIG. 8) using the channel estimation for the PDSCH and the second rank of the PDSCH that is based on the shared DMRS indication 506, the UE 502 may be configured to receive, and the base station 504 may be configured to transmit/provide, at a time length (e.g., 714 in FIG. 7) prior to the multiplexed PDSCH/PDCCH 508 (e.g., 608/610, 616 in FIG. 6; 710, 716 in FIG. 7; 802/804, 808/810, 814/816, 814/818, 820/822, 826/828, 832/834, 836/838 in FIG. 8), DCI (e.g., 712 in FIG. 7) indicative of, for a future time that corresponds to the PDSCH of the multiplexed PDSCH/PDCCH 508 (e.g., 608/610, 616 in FIG. 6; 710, 716 in FIG. 7; 802/804, 808/810, 814/816, 814/818, 820/822, 826/828, 832/834, 836/838 in FIG. 8), at least one of the second rank or a DMRS port assignment associated with the at least one shared DMRS (e.g., 606 in FIG. 6). In some aspects, e.g., for dynamic configurations, utilization of the second rank or the DMRS port assignment by the UE 502 may be based on reliability measures, as described herein, such as provision by the UE 502 and reception by the base station 504 of an ACK indication (e.g., 806, 850 in FIG. 8) and an associated time delay (e.g., 812 in FIG. 8), a configuration of the UE 502 for a semi-static/fixed rank(s) (e.g., 860 in FIG. 8), a configuration (e.g., 830 in FIG. 8) of the UE 502 for periodicity (e.g., 824 in FIG. 8) a default rank/DMRS port assignment (e.g., 870 in FIG. 8), a configuration (e.g., 839 in FIG. 8) of the UE 502 for a fallback default (e.g., 880 in FIG. 8) associated with a rank/DMRS port assignment based on a fall back timer (e.g., 840 in FIG. 8), and/or reception by the UE 502 and provision by the base station 504 of an empty DL grant (e.g., 844, 890 in FIG. 8).

In 1038, the UE receives a DL grant using a PDCCH, where the DL grant (i) indicates a change to a port assignment of the at least one shared DMRS at a future time and (ii) refrains from scheduling transmissions on a PDSCH. As an example, the reception may be performed by one or more of the component 198, the transceiver 1322, and/or the antenna 1380 in FIG. 13. FIGS. 5, 8 illustrate an example of the UE 502 receiving such a DL grant from a network node (e.g., the base station 504).

The UE 502 may be configured to receive, and the base station 504 may be configured to transmit/provide, a DL grant 842 in DCI associated with the PDCCH, where the DL grant (i) indicates a change to a port assignment of the at least one shared DMRS at a future time and (ii) refrains from scheduling the PDSCH 844. In the configuration 890, implementation of an empty DL grant may improve reliability for PDCCH/PDSCH multiplexing with rank adaptation. For example, configuration 890 shows a PDSCH 844, as empty, for which the DL grant 842 in DCI associated with the PDCCH does not schedule the PDSCH 844. Rather, the DL grant 842 in DCI associated with the PDCCH may be configured to indicate a future DMRS port assignment for a future PDSCH of a future DL grant for a UE. That is, a UE may be configured to receive, from a network node and after decoding a prior PDSCH that is multiplexed with a PDCCH that schedules the PDSCH, as described herein, a DL grant 842 in DCI associated with the PDCCH, where the DL grant 842 (i) indicates a change to a port assignment of the at least one shared DMRS at a future time and (ii) refrains from scheduling the PDSCH 844 (the empty DL grant).

FIG. 11 is a flowchart 1100 of a method of wireless communication. The method may be performed by a network node (e.g., the base station 102, 504, 604, 704; the network entity 1302, 1402). In some aspects, the method may include aspects described in connection with the communication flow in FIG. 5 and/or aspects described in FIGS. 6, 7, 8. The method may be for PDCCH and PDSCH multiplexing with rank adaptation that is optimized for FR2 and above (e.g., mmW and sub-THz bands) without focusing on multiple UE DCI transmissions, but rather focusing on the provision of one or more DCI to the same UE, with tight integration/multiplexing of PDCCH and PDSCH transmissions, instead of defining separate PDCCH and PDSCH regions, and may provide for shared DMRS (e.g., the PDSCH DMRS may be used for PDCCH), as well as shared resources (e.g., the PDSCH rate matches around the resources used by the PDCCH). The method may also provide for performance of channel estimations based on rank information for PDSCHs by sharing the DMRS between a multiplexed PDSCH and PDCCH, as well as identifying the rank information by utilizing multiple hypotheses, semi-static rank configurations, and/or dynamic rank switching with delayed actions.

In 1102, the network node encodes a PDSCH transmission that is multiplexed with a PDCCH transmission that schedules the PDSCH transmission, where the PDCCH transmission has a first rank and the PDSCH transmission has a second rank, and the PDCCH transmission and the PDSCH transmission have at least one shared DMRS. As an example, the encode may be performed by one or more of the component 199, the transceiver 1446, and/or the antenna 1480 in FIG. 14. FIG. 5 illustrates an example of the network node (e.g., the base station 504) encoding such a PDSCH that is multiplexed with a PDCCH that schedules the PDSCH.

The base station 504 may be configured to encode the PDSCH of the multiplexed PDSCH/PDCCH 508 (e.g., 608/610, 616 in FIG. 6; 710, 716 in FIG. 7; 802/804, 808/810, 814/816, 814/818, 820/822, 826/828, 832/834, 836/838 in FIG. 8) that may be associated with a channel estimation for the PDSCH of the multiplexed PDSCH/PDCCH 508 (e.g., 608/610, 616 in FIG. 6; 710, 716 in FIG. 7; 802/804, 808/810, 814/816, 814/818, 820/822, 826/828, 832/834, 836/838 in FIG. 8) and the second rank of the PDSCH of the multiplexed PDSCH/PDCCH 508 (e.g., 608/610, 616 in FIG. 6; 710, 716 in FIG. 7; 802/804, 808/810, 814/816, 814/818, 820/822, 826/828, 832/834, 836/838 in FIG. 8) that is based on the shared DMRS indication 506.

In aspects, e.g., for multiple rank hypotheses, to encode the PDSCH transmission of the multiplexed PDSCH/PDCCH 508 (e.g., 608/610, 616 in FIG. 6; 710, 716 in FIG. 7; 802/804, 808/810, 814/816, 814/818, 820/822, 826/828, 832/834, 836/838 in FIG. 8) associated with the channel estimation for the PDSCH and the second rank of the PDSCH that is based on the shared DMRS indication 506, the base station 504 may be configured to set/configure the second rank for the PDSCH using multiple rank hypotheses associated with ports of the at least one shared DMRS (e.g., 606 in FIG. 6), e.g., as based on a shared DMRS indication 506. The base station 504 may also be configured to receive, from the UE 502, a capability indication (e.g., 614 in FIG. 6) for the UE 502. The capability indication (e.g., 614 in FIG. 6) may be indicative of a capability of the UE 502 that is associated with a performance of the multiple rank hypotheses associated with the at least one shared DMRS (e.g., 606 in FIG. 6). In some aspects, the PDSCH of the multiplexed PDSCH/PDCCH 508 (e.g., 608/610, 616 in FIG. 6; 710, 716 in FIG. 7; 802/804, 808/810, 814/816, 814/818, 820/822, 826/828, 832/834, 836/838 in FIG. 8) may be associated with a modulation and coding scheme (MCS) that is based on the capability indication (e.g., 614 in FIG. 6) for the UE 502. In some aspects, the performance of the multiple rank hypotheses may be associated with at least one of a rank 1 or a rank 2.

In 1104, the network node provides, for a UE, the PDSCH transmission that is multiplexed with the PDCCH transmission that schedules the PDSCH transmission and a shared DMRS indication indicative of the at least one shared DMRS shared between the PDSCH transmission and the PDCCH transmission. As an example, the provision may be performed by one or more of the component 199, the transceiver 1446, and/or the antenna 1480 in FIG. 14. FIG. 5 illustrates an example of the network node (e.g., the base station 504) providing such a PDSCH that is multiplexed with a PDCCH that schedules the PDSCH for a UE (e.g., the UE 502).

The base station 504 may be configured to transmit/provide, and the UE 502 may be configured to receive, a shared DMRS indication 506. In aspects, the shared DMRS indication 506 may be associated with a PDSCH that is multiplexed with a PDCCH that schedules the PDSCH (e.g., a multiplexed PDSCH/PDCCH 508 (e.g., 608/610, 616 in FIG. 6; 710, 716 in FIG. 7; 802/804, 808/810, 814/816, 814/818, 820/822, 826/828, 832/834, 836/838 in FIG. 8)). The multiplexed PDSCH/PDCCH 508 (e.g., 608/610, 616 in FIG. 6; 710, 716 in FIG. 7; 802/804, 808/810, 814/816, 814/818, 820/822, 826/828, 832/834, 836/838 in FIG. 8) may have at least one shared DMRS (e.g., 606 in FIG. 6) based on a shared DMRS indication 506. The shared DMRS indication 506 may be comprised in at least one of an RRC message, a MAC-CE, or DCI, in aspects.

The base station 504 may be configured to transmit/provide, and the UE 502 may be configured to receive, the multiplexed PDSCH/PDCCH 508 (e.g., 608/610, 616 in FIG. 6; 710, 716 in FIG. 7; 802/804, 808/810, 814/816, 814/818, 820/822, 826/828, 832/834, 836/838 in FIG. 8). The PDCCH of the multiplexed PDSCH/PDCCH 508 (e.g., 608/610, 616 in FIG. 6; 710, 716 in FIG. 7; 802/804, 808/810, 814/816, 814/818, 820/822, 826/828, 832/834, 836/838 in FIG. 8) may have a first rank, and the PDSCH of the multiplexed PDSCH/PDCCH 508 (e.g., 608/610, 616 in FIG. 6; 710, 716 in FIG. 7; 802/804, 808/810, 814/816, 814/818, 820/822, 826/828, 832/834, 836/838 in FIG. 8) may have a second rank, where the of the multiplexed PDSCH/PDCCH 508 (e.g., 608/610, 616 in FIG. 6; 710, 716 in FIG. 7; 802/804, 808/810, 814/816, 814/818, 820/822, 826/828, 832/834, 836/838 in FIG. 8) may have at least one shared DMRS based on the shared DMRS indication 506.

In aspects, e.g., for semi-static configurations, to encode the PDSCH of the multiplexed PDSCH/PDCCH 508 (e.g., 608/610, 616 in FIG. 6; 710, 716 in FIG. 7; 802/804, 808/810, 814/816, 814/818, 820/822, 826/828, 832/834, 836/838 in FIG. 8) associated with the channel estimation for the PDSCH and the second rank of the PDSCH that is based on the shared DMRS indication 506, the base station 504 may be configured to provide, for the UE prior to the multiplexed PDSCH/PDCCH 508 (e.g., 608/610, 616 in FIG. 6; 710, 716 in FIG. 7; 802/804, 808/810, 814/816, 814/818, 820/822, 826/828, 832/834, 836/838 in FIG. 8), a configuration (e.g., 706 in FIG. 7) of the second rank. The base station 504 may be configured to transmit/provide, and the UE 502 may be configured to receive, the configuration (e.g., 706 in FIG. 7) of the second rank via an RRC message. In such aspects, the base station 504 may be configured to transmit/provide, and the UE 502 may be configured to receive, an activation or an update (e.g., 708 in FIG. 7) of the second rank in at least one of a MAC-CE or DCI.

In aspects, e.g., for dynamic configurations, to decode (at 510) the PDSCH of the multiplexed PDSCH/PDCCH 508 (e.g., 608/610, 616 in FIG. 6; 710, 716 in FIG. 7; 802/804, 808/810, 814/816, 814/818, 820/822, 826/828, 832/834, 836/838 in FIG. 8) using the channel estimation for the PDSCH and the second rank of the PDSCH that is based on the shared DMRS indication 506, the base station 504 may be configured to transmit/provide, and the UE 502 may be configured to receive, at a time length (e.g., 714 in FIG. 7) prior to the multiplexed PDSCH/PDCCH 508 (e.g., 608/610, 616 in FIG. 6; 710, 716 in FIG. 7; 802/804, 808/810, 814/816, 814/818, 820/822, 826/828, 832/834, 836/838 in FIG. 8), DCI (e.g., 712 in FIG. 7) indicative of, for a future time that corresponds to the PDSCH of the multiplexed PDSCH/PDCCH 508 (e.g., 608/610, 616 in FIG. 6; 710, 716 in FIG. 7; 802/804, 808/810, 814/816, 814/818, 820/822, 826/828, 832/834, 836/838 in FIG. 8), at least one of the second rank or a DMRS port assignment associated with the at least one shared DMRS (e.g., 606 in FIG. 6). In some aspects, e.g., for dynamic configurations, utilization of the second rank or the DMRS port assignment by the UE 502 may be based on reliability measures, as described herein, such as provision by the UE 502 and reception by the base station 504 of an ACK indication (e.g., 806, 850 in FIG. 8) and an associated time delay (e.g., 812 in FIG. 8), a configuration by the base station 504 of the UE 502 for a semi-static/fixed rank(s) (e.g., 860 in FIG. 8), a configuration (e.g., 830 in FIG. 8) by the base station 504 of the UE 502 for periodicity (e.g., 824 in FIG. 8) a default rank/DMRS port assignment (e.g., 870 in FIG. 8), a configuration (e.g., 839 in FIG. 8) by the base station 504 of the UE 502 for a fallback default (e.g., 880 in FIG. 8) associated with a rank/DMRS port assignment based on a fall back timer (e.g., 840 in FIG. 8), and/or provision by the base station 504 and reception by the UE 502 and of an empty DL grant (e.g., 844, 890 in FIG. 8).

Figure 12:
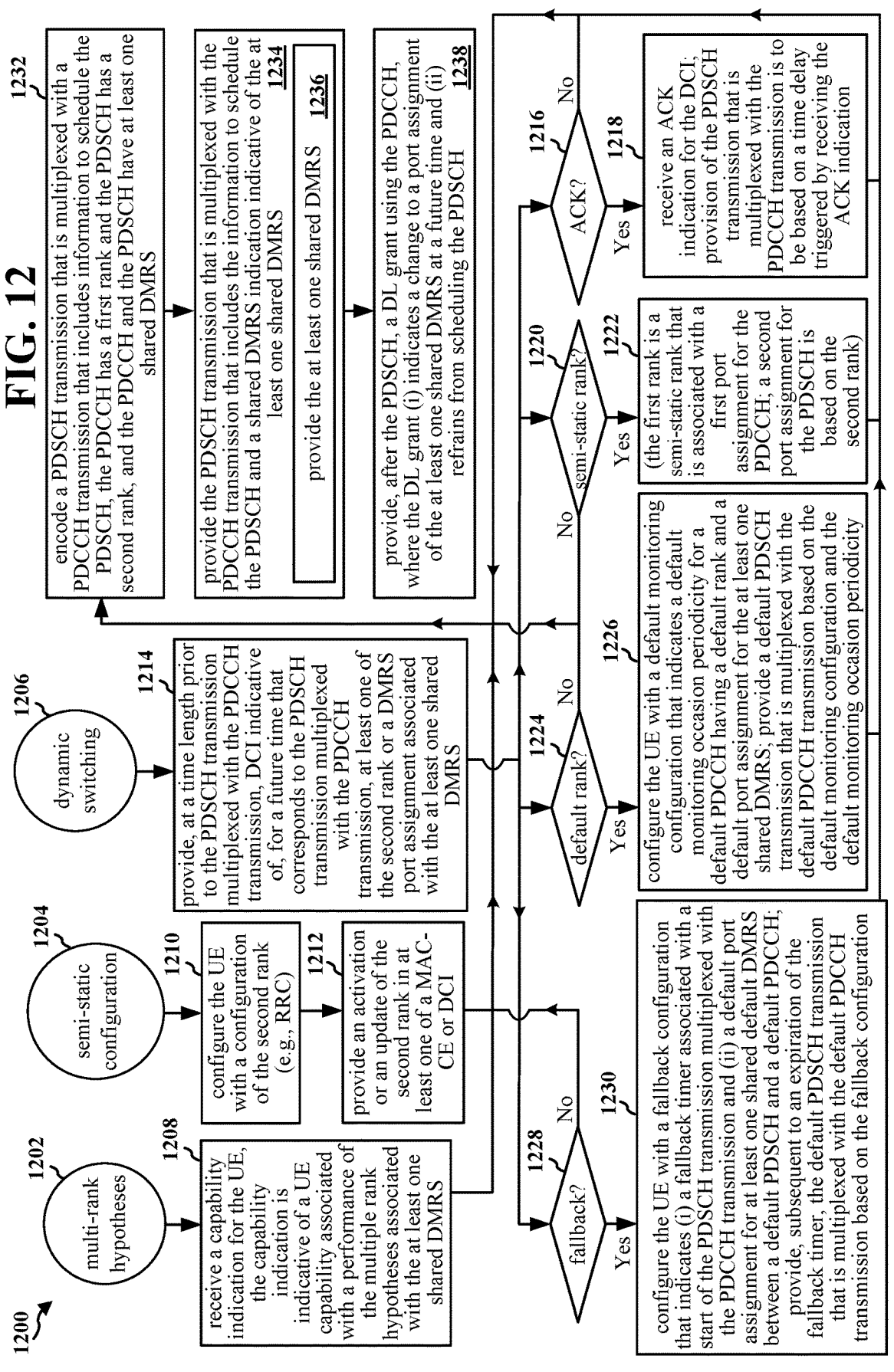
FIG. 12 is a flowchart of a method of wireless communication, in accordance with various aspects of the present disclosure.

FIG. 12 is a flowchart 1200 of a method of wireless communication. The method may be performed by a network node (e.g., the base station 102, 504, 604, 704; the network entity 1302, 1402). In some aspects, the method may include aspects described in connection with the communication flow in FIG. 5 and/or aspects described in FIGS. 6, 7, 8. The method may be for PDCCH and PDSCH multiplexing with rank adaptation that is optimized for FR2 and above (e.g., mmW and sub-THz bands) without focusing on multiple UE DCI transmissions, but rather focusing on the provision of one or more DCI to the same UE, with tight integration/multiplexing of PDCCH and PDSCH transmissions, instead of defining separate PDCCH and PDSCH regions, and may provide for shared DMRS (e.g., the PDSCH DMRS may be used for PDCCH), as well as shared resources (e.g., the PDSCH rate matches around the resources used by the PDCCH). The method may also provide for performance of channel estimations based on rank information for PDSCHs by sharing the DMRS between a multiplexed PDSCH and PDCCH, as well as identifying the rank information by utilizing multiple hypotheses, semi-static rank configurations, and/or dynamic rank switching with delayed actions.

In aspects, as noted above, a network node may configure a UE for multiple rank hypotheses, semi-static configurations, and/or dynamic configurations for performance of PDCCH and PDSCH multiplexing with rank adaptation. As shown in flowchart 1200, based on the particular configuration, a network node may perform various operations/functions for PDCCH and PDSCH multiplexing with rank adaptation. For example, if multiple rank hypotheses at 1202 is performed, a network node may begin flowchart 1200 at 1208, if semi-static configurations at 1204 are utilized, a network node may begin flowchart 1200 at 1210, and if dynamic switching at 1206 is performed, a network node may begin flowchart 1200 at 1214.

In 1208, the network node receives a capability indication for the UE, the capability indication is indicative of a UE capability associated with a performance of the multiple rank hypotheses associated with the at least one shared DMRS. As an example, the reception may be performed by one or more of the component 199, the transceiver 1446, and/or the antenna 1480 in FIG. 14. FIG. 6 illustrates an example of the network node (e.g., the base station 604 (e.g., 504 in FIG. 5)) receiving such a capability indication from a UE (e.g., the UE 602 (e.g., 502 in FIG. 5)).

In the configuration 660, the UE 602 may be configured to provide/transmit, and the base station 604 may be configured to receive, a UE capability indication 614 ("capability indication 614") for the UE 602. The capability indication 614 may indicate UE 602 capability for multiple rank hypotheses performance associated with the at least one shared DMRS 606. In some aspects, the PDSCH 610 and/or the PDSCH of a multiplexed PDSCH/PDCCH 616, which the UE 602 may be configured to receive and the base station 604 may be configured to transmit/provide, as described herein, may be associated with a modulation and coding scheme (MCS) that is based on the capability indication 614 for the UE 602. In some aspects, accordingly, the performance of multiple rank hypotheses by the UE 602 may be associated with at least one of a rank 1 or a rank 2.

In 1210, the network node configures the UE with a configuration of the second rank. As an example, the configuration may be performed by one or more of the component 199, the transceiver 1446, and/or the antenna 1480 in FIG. 14. FIG. 6 illustrates an example of the network node (e.g., the base station 604 (e.g., 504 in FIG. 5)) so configuring a UE (e.g., the UE 502).

In DL grant DCI, a DMRS port assignment field may be included, according to aspects. However, such a DMRS port assignment field may not apply to a current grant, but may apply to PDSCHs starting from a certain time length later (e.g., at a future time). This time length associated with a later time may be considered for a delayed action, and the time length may be decided by the UE 702 processing time, or another time delay. The DMRS port assignment field may not be included for all DCI formats, e.g., if there are multiple DCI formats for DL grants being monitored. Referring to the configuration 750, the UE 702 may be configured with the rank (e.g., the second rank) for PDSCH transmissions via RRC signaling. In aspects, the configured rank may be semi-static, accordingly, and it should be noted that ranks of the PDSCH and the PDCCH may be different. For instance, the UE 702 may be configured to receive, and the base station 704 may be configured to transmit/provide, a configuration 706 via RRC signaling to determine the rank of the PDSCH transmission associated with the multiplexed PDSCH/PDCCH 710. In some aspects, the DMRS ports assignments to be used, as associated therewith, may be semi-static. Accordingly, in some aspects the multiplexed PDSCH/PDCCH 710 may be provided/transmitted by the base station 704, and received by the UE 702, as including the configured rank indicated by the configuration 706 via RRC signaling.

In 1212, the network node provides an activation or an update of the second rank in at least one of a MAC-CE or DCI. As an example, the provision may be performed by one or more of the component 199, the transceiver 1446, and/or the antenna 1480 in FIG. 14. FIG. 7 illustrates an example of the network node (e.g., the base station 704 (e.g., 504 in FIG. 5)) providing such an activation or an update for a UE (e.g., the UE 702 (e.g., 502 in FIG. 5)).

A MAC-CE based and/or DCI based mechanism may be used to activate and/or update the rank assignment configured via the RRC signaling. As shown for the configuration 750, the UE 702 may be configured to receive, and the base station 704 may be configured to transmit/provide, an activation/update 708 of the rank (e.g., the second rank) via MAC-CE based and/or DCI. Accordingly, in some aspects the multiplexed PDSCH/PDCCH 710 may be provided/transmitted by the base station 704, and received by the UE 702, including the configured rank as indicated by the configuration 706 via RRC signaling and activated via MAC-CE and/or DCI, or as updated via MAC-CE and/or DCI, e.g., using the activation/update 708. In such aspects, the UE 702 may be configured to receive the multiplexed PDSCH/PDCCH 710 based on the configuration 706 and/or the activation/update 708 and apply the configuration 706 and/or the activation/update 708 thereto.

In 1214, the network node provides, at a time length prior to the PDSCH transmission multiplexed with the PDCCH transmission, DCI indicative of, for a future time that corresponds to the PDSCH transmission multiplexed with the PDCCH transmission, at least one of the second rank or a DMRS port assignment associated with the at least one shared DMRS. As an example, the provision may be performed by one or more of the component 199, the transceiver 1446, and/or the antenna 1480 in FIG. 14. FIG. 7 illustrates an example of the network node (e.g., the base station 704 (e.g., 504 in FIG. 5)) providing such DCI for a UE (e.g., the UE 702 (e.g., 502 in FIG. 5)).

Referring to the configuration 760, DCI may be utilized for dynamic switching of DMRS port assignments/ranks and may include an indication to be applied to the PDSCH after a certain time. For instance, the UE 702 may be configured to receive, and the base station 704 may be configured to transmit/provide, at a time length 714 prior to the multiplexed PDSCH/PDCCH 716 (e.g., the PDSCH multiplexed with the PDCCH) DCI 712. DCI 712 may be indicative of, for a future time, at least one of the second rank or a DMRS port assignment associated with the at least one shared DMRS (e.g., the at least one shared DMRS 606 in FIG. 6). In aspects, the time length 714 prior to the multiplexed PDSCH/PDCCH 716 may correspond to a time from reception of the DCI 712 to the time (e.g., the future time) of the reception for the multiplexed PDSCH/PDCCH 716.

Accordingly, in some aspects the multiplexed PDSCH/PDCCH 716 may be provided/transmitted by the base station 704, and received by the UE 702, at the future time, based on the time length 714, based on the DCI 712 that indicates the second rank for the PDSCH and/or a DMRS port assignment associated with the at least one shared DMRS (e.g., the at least one shared DMRS 606 in FIG. 6). In such aspects, the UE 702 may be configured to receive the multiplexed PDSCH/PDCCH 716 having the second rank for the PDSCH and/or a DMRS port assignment and apply the second rank for the PDSCH and/or a DMRS port assignment thereto.

As described herein, reliability mechanism are provided for aspects of PDCCH and PDSCH multiplexing with rank adaptation. While described in terms of dynamic switching/configurations, the reliability mechanism provided for aspects herein are not so limited, and may be applied to other types of configurations described. As shown for the illustrated aspect, from 1214, flowchart 1200 may continue to one or more of 1216, 1220, 1224, and/or 1228.

In 1216, the network node determines if it has configured the UE to provide an ACK indication for DCI associated with a PDCCH transmission with which a PDSCH transmission is multiplexed. As an example, the determination may be performed by the component 199. If so, flowchart 1200 continues to 1218; if not, flowchart 1200 continues to 1232.

In 1218, the network node receives an ACK indication for the DCI, where provision of the PDSCH transmission that is multiplexed with the PDCCH transmission is to be based on a time delay triggered by receiving the ACK indication. As an example, the reception may be performed by one or more of the component 199, the transceiver 1446, and/or the antenna 1480 in FIG. 14. FIG. 8 illustrates an example of the network node (e.g., the base station 504 in FIG. 5) receiving such an ACK indication from a UE (e.g., the UE 502 in FIG. 5).

Some aspects herein provide for improvements to the consistency of network node/UE for DMRS port assignment understanding by utilizing an ACK-based approach. In the configuration 850, implementation of an ACK-based delay may improve reliability for PDCCH/PDSCH multiplexing with rank adaptation. In aspects, the rank application time may be a certain amount of time (e.g., in a unit of slot or absolute time (e.g., 3 ms and/or the like)) after the ACK/NACK corresponding to the DL grant associated with the PDSCH is received.

For instance, configuration 850 shows a PDSCH 804 multiplexed with a PDCCH 802 that schedules the PDSCH 804, and shows a PDSCH 810 multiplexed with a PDCCH 808 that schedules the PDSCH 810. In aspects, DCI in the PDCCH 802 may indicate a different/updated rank, but the different rank may be associated with the PDSCH 810 and not the PDSCH 804. A UE may be configured to provide an ACK indication 806 for a network node to indicate that the DCI in the PDCCH 802 was received correctly. Subsequent to a time delay 812 triggered by the ACK indication 806, a UE may apply the different/updated rank, indicated by the DCI in the PDCCH 802, to a later PDSCH (e.g., the PDSCH 810). In aspects, the network node providing the PDSCH 810 to the UE may perform such a provision with the different/updated rank under the assumption that after the time delay 812, and based on the ACK indication 806 being received, the UE will be ready and capable of handling/decoding the PDSCH 810 with the different/updated rank. That is, the UE may be configured to provide, for a network node prior to the PDSCH 810 multiplexed with the PDCCH 808, an ACK indication 806 for the DCI in the PDCCH 802. The UE may also be configured to apply at least one of the second rank or the DMRS port assignment for the PDSCH 810 multiplexed with the PDCCH 808 based on the time delay 812 triggered by provision of the ACK indication 806.

In 1220, the network node determines if it has configured the UE to use a semi-static rank associated with a PDSCH transmission and PDCCH transmission that are multiplexed for rank adaptation. As an example, the determination may be performed by the component 199. If so, flowchart 1200 continues to 1222; if not, flowchart 1200 continues to 1232.

In 1222, the first rank may be a semi-static rank that is associated with a first port assignment for the PDCCH transmission, and a second port assignment for the PDSCH transmission may be based on the second rank. As an example, the provision of such a configuration may be performed by one or more of the component 199, the transceiver 1446, and/or the antenna 1480 in FIG. 14. FIG. 8 illustrates an example of the network node (e.g., the base station 504 in FIG. 5) where such semi-static rate aspects are implemented for a UE (e.g., the UE 502 in FIG. 5).

Some aspects herein provide for improvements to the reliability such that even if there is misunderstanding between the network node and the UE, the communication link may still go through (even if intermittently). In the configuration 860, implementation of a semi-static rank (e.g., for a PDSCH) may improve reliability for PDCCH/PDSCH multiplexing with rank adaptation. When a rank or a DMRS port(s) changes, the PDCCH decoding may be incorrect, e.g., if the UE assumed a wrong DMRS port for the PDCCH. In aspects herein, for a semi-static PDCCH rank, with different ranks for PDSCHs, the DMRS port assignment to be used for PDCCH precoding may be semi-static/fixed.

For instance, configuration 860 shows a PDSCH 816 multiplexed with a PDCCH 814 that schedules the PDSCH 816. The PDCCH 814 may have associated a semi-static rank therewith (e.g., a first rank that may be semi-static/fixed). In aspects, the semi-static rank may be associated with a semi-static PDCCH DMRS port, and the rank 'A' of the PDSCH 816 may be based on the rank 'A'. As one example, where rank 'A' is rank 1, DMRS port 0 may be assumed/assigned/configured for both the PDCCH 814 and the PDSCH 816. As another example, configuration 860 shows a PDSCH 818 multiplexed with the PDCCH 814 that schedules the PDSCH 818. The PDCCH 814 may have associated a semi-static rank therewith (e.g., a first rank that may be semi-static/fixed). In aspects, the fixed rank may be associated with a semi-static/fixed PDCCH DMRS port, and the rank 'B' of the PDSCH 818 may be based on the rank 'B'. As one example, where rank 'B' is rank 2, DMRS port 0 may be assumed/assigned/configured for the PDCCH 814, and port 0 and 2 may be assumed/assigned/configured for the PDSCH 818. That is, the first rank of the PDCCH 814 may be a semi-static rank that is associated with a first port assignment for the PDCCH 814, and a second port assignment for the PDSCH 816 may be based on the second rank of the PDSCH 816.

In 1224, the network node determines if it has configured the UE to use a default rank associated with a monitoring periodicity for a PDSCH and a PDCCH that are multiplexed for rank adaptation. As an example, the determination may be performed by the component 199. If so, flowchart 1200 continues to 1226; if not, flowchart 1200 continues to 1232.

In 1226, the network node configures the UE with a default monitoring configuration that indicates a default monitoring occasion periodicity for a default PDCCH having a default rank and a default port assignment for the at least one shared DMRS, and provides a default PDSCH that is multiplexed with the default PDCCH based on the default monitoring configuration and the default monitoring occasion periodicity. As an example, the configuration/provision may be performed by one or more of the component 199, the transceiver 1446, and/or the antenna 1480 in FIG. 14. FIG. 8 illustrates an example of the network node (e.g., the base station 504 in FIG. 5) configuring default monitoring and providing such a default PDSCH for a UE (e.g., the UE 502 in FIG. 5).

Some aspects herein provide for improvements to for reliability through the introduction of fallback mechanisms, e.g., implemented periodically or as timer-based. In the configuration 870, implementation of a default rank and/or DMRS port assignment may improve reliability for PDCCH/PDSCH multiplexing with rank adaptation. In aspects, a default rank may be used (e.g., rank 1 with its DMRS port assignment) at some PDCCH monitoring occasions to allow a network node to transmit to a UE even when the understanding of active DMRS port assignments is incorrect or out of synchronization between the network node and the UE. In some aspects, a network node may configure a UE with a periodic default rank and/or DMRS port assignment. For example, the configuration 870 shows a periodic pattern for a default DMRS port assignment to be used irrespective of the active DMRS port assignment. A UE may be configured to receive, and a network node may be configured to transmit/provide, a default monitoring configuration 830 that indicates a default monitoring occasion periodicity 824 associated with a default PDSCH 822 multiplexed with a default PDCCH 820 that schedules the default PDSCH 822. Thus, even if an active DRMS port assignment for a PDSCH 828 multiplexed with a PDCCH 826 that schedules the PDSCH 828 is in use, and irrespective of whether the understanding of the active DMRS port assignment is synchronized, or is incorrect/out of synchronization, between the network node and the UE, the default PDSCH 822 multiplexed with a default PDCCH 820 that schedules the default PDSCH 822 may be configured (e.g., according to default monitoring configuration 830, at the default monitoring occasion periodicity 824 for the UE. That is, a UE may be configured to receive, from network node, a default monitoring configuration 830 that indicates a default monitoring occasion periodicity 824 for a default PDCCH 820 having a default rank and a default port assignment for the at least one shared DMRS. The UE may also be configured to receive, from the network node, the default PDSCH 822 that is multiplexed with the default PDCCH 820 based on the default monitoring configuration 830 and the default monitoring occasion periodicity 824.

In 1228, the network node determines if it has configured the UE to use a fallback/default rank associated with a fallback timer for a PDSCH and a PDCCH that are multiplexed for rank adaptation. As an example, the determination may be performed by the component 199. If so, flowchart 1200 continues to 1230; if not, flowchart 1200 continues to 1232.

In 1230, the network node configures the UE with a fallback configuration that indicates (i) a fallback timer associated with a start of the PDSCH multiplexed with the PDCCH and (ii) a default port assignment for at least one shared default DMRS between a default PDSCH and a default PDCCH, and provides, subsequent to an expiration of the fallback timer, the default PDSCH that is multiplexed with the default PDCCH based on the fallback configuration. As an example, the configuration/provision may be performed by one or more of the component 199, the transceiver 1446, and/or the antenna 1480 in FIG. 14. FIG. 8 illustrates an example of the network node (e.g., the base station 504 in FIG. 5) configuring a fallback and providing such a default PDSCH for a UE (e.g., the UE 502 in FIG. 5).

Some aspects herein provide for improvements to reliability through the introduction of fallback mechanisms, e.g., implemented periodically or as timer-based. In the configuration 880, implementation of a timer-based fallback for rank and/or DMRS port assignment may improve reliability for PDCCH/PDSCH multiplexing with rank adaptation. In aspects, a default rank may be used (e.g., rank 1 with its DMRS port assignment) at some PDCCH monitoring occasions to allow a network node to transmit to a UE even when the understanding of active DMRS port assignments is incorrect or out of synchronization between the network node and the UE. In some aspects, a network node may configure a UE with a default DMRS port assignment and a fallback timer by which the UE may revert to the default DRMS port assignment. For example, configuration 880 shows a fallback configuration 839, which may be received by a UE from a network node, for a fallback timer 840. The fallback timer 840 may be reset if a valid control using the current active DMRS port assignment is detected for a PDSCH 834 that is multiplexed with a PDCCH 832 having DCI that schedules the PDSCH 834. However, if there is an error and the network node and UE lose synchronization on the active DMRS port assignment, and the fallback timer 840 expires at an expiration 841, the base station and UE may be configured to establish a link again using a default DMRS port assignment, e.g., for a DL grant such as a default PDSCH 838, with a default DMRS port assignment, multiplexed with a default PDCCH 836 having DCI that schedules the default PDSCH 838. That is, a UE may be configured to receive, from a network node, a fallback configuration 839 that indicates (i) the fallback timer 840 associated with a start of the PDSCH 834 multiplexed with the PDCCH 832 and (ii) a default port assignment for at least one shared default DMRS between the default PDSCH 838 and the default PDCCH 836. The UE may also be configured to receive, from the network node and subsequent to the expiration 841 of the fallback timer 840, the default PDSCH 838 that is multiplexed with the default PDCCH 836 based on the fallback configuration 839.

It is also contemplated herein that aspects provide for a network node to continue from 1214 to 1232 without implementing a reliability mechanism.

In 1232, the network node encodes a PDSCH transmission that is multiplexed with a PDCCH transmission that schedules the PDSCH transmission, where the PDCCH transmission has a first rank and the PDSCH transmission has a second rank, and the PDCCH transmission and the PDSCH transmission have at least one shared DMRS. As an example, the encode may be performed by one or more of the component 199, the transceiver 1446, and/or the antenna 1480 in FIG. 14. FIG. 5 illustrates an example of the network node (e.g., the base station 504) encoding such a PDSCH that is multiplexed with a PDCCH that schedules the PDSCH.

The base station 504 may be configured to encode the PDSCH of the multiplexed PDSCH/PDCCH 508 (e.g., 608/610, 616 in FIG. 6; 710, 716 in FIG. 7; 802/804, 808/810, 814/816, 814/818, 820/822, 826/828, 832/834, 836/838 in FIG. 8) that may be associated with a channel estimation for the PDSCH of the multiplexed PDSCH/PDCCH 508 (e.g., 608/610, 616 in FIG. 6; 710, 716 in FIG. 7; 802/804, 808/810, 814/816, 814/818, 820/822, 826/828, 832/834, 836/838 in FIG. 8) and the second rank of the PDSCH of the multiplexed PDSCH/PDCCH 508 (e.g., 608/610, 616 in FIG. 6; 710, 716 in FIG. 7; 802/804, 808/810, 814/816, 814/818, 820/822, 826/828, 832/834, 836/838 in FIG. 8) that is based on the shared DMRS indication 506.

In aspects, e.g., for multiple rank hypotheses, to encode the PDSCH of the multiplexed PDSCH/PDCCH 508 (e.g., 608/610, 616 in FIG. 6; 710, 716 in FIG. 7; 802/804, 808/810, 814/816, 814/818, 820/822, 826/828, 832/834, 836/838 in FIG. 8) associated with the channel estimation for the PDSCH and the second rank of the PDSCH that is based on the shared DMRS indication 506, the base station 504 may be configured to set/configure the second rank for the PDSCH using multiple rank hypotheses associated with ports of the at least one shared DMRS (e.g., 606 in FIG. 6), e.g., as based on a shared DMRS indication 506. The base station 504 may also be configured to receive, from the UE 502, a capability indication (e.g., 614 in FIG. 6) for the UE 502. The capability indication (e.g., 614 in FIG. 6) may be indicative of a capability of the UE 502 that is associated with a performance of the multiple rank hypotheses associated with the at least one shared DMRS (e.g., 606 in FIG. 6). In some aspects, the PDSCH of the multiplexed PDSCH/PDCCH 508 (e.g., 608/610, 616 in FIG. 6; 710, 716 in FIG. 7; 802/804, 808/810, 814/816, 814/818, 820/822, 826/828, 832/834, 836/838 in FIG. 8) may be associated with a modulation and coding scheme (MCS) that is based on the capability indication (e.g., 614 in FIG. 6) for the UE 502. In some aspects, the performance of the multiple rank hypotheses may be associated with at least one of a rank 1 or a rank 2.

In 1234, the network node the network node provides, for a UE, the PDSCH transmission that is multiplexed with the PDCCH transmission that schedules the PDSCH transmission and a shared DMRS indication indicative of the at least one shared DMRS. As an example, the provision may be performed by one or more of the component 199, the transceiver 1446, and/or the antenna 1480 in FIG. 14. FIG. 5 illustrates an example of the network node (e.g., the base station 504) providing such a PDSCH that is multiplexed with a PDCCH that schedules the PDSCH for a UE (e.g., the UE 502).

The base station 504 may be configured to transmit/provide, and the UE 502 may be configured to receive, a shared DMRS indication 506. In aspects, the shared DMRS indication 506 may be associated with a PDSCH that is multiplexed with a PDCCH that schedules the PDSCH (e.g., a multiplexed PDSCH/PDCCH 508 (e.g., 608/610, 616 in FIG. 6; 710, 716 in FIG. 7; 802/804, 808/810, 814/816, 814/818, 820/822, 826/828, 832/834, 836/838 in FIG. 8)). The multiplexed PDSCH/PDCCH 508 (e.g., 608/610, 616 in FIG. 6; 710, 716 in FIG. 7; 802/804, 808/810, 814/816, 814/818, 820/822, 826/828, 832/834, 836/838 in FIG. 8) may have at least one shared DMRS (e.g., 606 in FIG. 6) based on a shared DMRS indication 506. The shared DMRS indication 506 may be comprised in at least one of an RRC message, a MAC-CE, or DCI, in aspects.

The base station 504 may be configured to transmit/provide, and the UE 502 may be configured to receive, the multiplexed PDSCH/PDCCH 508 (e.g., 608/610, 616 in FIG. 6; 710, 716 in FIG. 7; 802/804, 808/810, 814/816, 814/818, 820/822, 826/828, 832/834, 836/838 in FIG. 8). The PDCCH of the multiplexed PDSCH/PDCCH 508 (e.g., 608/610, 616 in FIG. 6; 710, 716 in FIG. 7; 802/804, 808/810, 814/816, 814/818, 820/822, 826/828, 832/834, 836/838 in FIG. 8) may have a first rank, and the PDSCH of the multiplexed PDSCH/PDCCH 508 (e.g., 608/610, 616 in FIG. 6; 710, 716 in FIG. 7; 802/804, 808/810, 814/816, 814/818, 820/822, 826/828, 832/834, 836/838 in FIG. 8) may have a second rank, where the of the multiplexed PDSCH/PDCCH 508 (e.g., 608/610, 616 in FIG. 6; 710, 716 in FIG. 7; 802/804, 808/810, 814/816, 814/818, 820/822, 826/828, 832/834, 836/838 in FIG. 8) may have at least one shared DMRS based on the shared DMRS indication 506.

In aspects, e.g., for semi-static configurations, to encode the PDSCH of the multiplexed PDSCH/PDCCH 508 (e.g., 608/610, 616 in FIG. 6; 710, 716 in FIG. 7; 802/804, 808/810, 814/816, 814/818, 820/822, 826/828, 832/834, 836/838 in FIG. 8) associated with the channel estimation for the PDSCH and the second rank of the PDSCH that is based on the shared DMRS indication 506, the base station 504 may be configured to provide, for the UE prior to the multiplexed PDSCH/PDCCH 508 (e.g., 608/610, 616 in FIG. 6; 710, 716 in FIG. 7; 802/804, 808/810, 814/816, 814/818, 820/822, 826/828, 832/834, 836/838 in FIG. 8), a configuration (e.g., 706 in FIG. 7) of the second rank. The base station 504 may be configured to transmit/provide, and the UE 502 may be configured to receive, the configuration (e.g., 706 in FIG. 7) of the second rank via an RRC message. In such aspects, the base station 504 may be configured to transmit/provide, and the UE 502 may be configured to receive, an activation or an update (e.g., 708 in FIG. 7) of the second rank in at least one of a MAC-CE or DCI.

In aspects, e.g., for dynamic configurations, to decode (at 510) the PDSCH of the multiplexed PDSCH/PDCCH 508 (e.g., 608/610, 616 in FIG. 6; 710, 716 in FIG. 7; 802/804, 808/810, 814/816, 814/818, 820/822, 826/828, 832/834, 836/838 in FIG. 8) using the channel estimation for the PDSCH and the second rank of the PDSCH that is based on the shared DMRS indication 506, the base station 504 may be configured to transmit/provide, and the UE 502 may be configured to receive, at a time length (e.g., 714 in FIG. 7) prior to the multiplexed PDSCH/PDCCH 508 (e.g., 608/

610, 616 in FIG. 6; 710, 716 in FIG. 7; 802/804, 808/810, 814/816, 814/818, 820/822, 826/828, 832/834, 836/838 in FIG. 8), DCI (e.g., 712 in FIG. 7) indicative of, for a future time that corresponds to the PDSCH of the multiplexed PDSCH/PDCCH 508 (e.g., 608/610, 616 in FIG. 6; 710, 716 in FIG. 7; 802/804, 808/810, 814/816, 814/818, 820/822, 826/828, 832/834, 836/838 in FIG. 8), at least one of the second rank or a DMRS port assignment associated with the at least one shared DMRS (e.g., 606 in FIG. 6). In some aspects, e.g., for dynamic configurations, utilization of the second rank or the DMRS port assignment by the UE 502 may be based on reliability measures, as described herein, such as provision by the UE 502 and reception by the base station 504 of an ACK indication (e.g., 806, 850 in FIG. 8) and an associated time delay (e.g., 812 in FIG. 8), a configuration by the base station 504 of the UE 502 for a semi-static/fixed rank(s) (e.g., 860 in FIG. 8), a configuration (e.g., 830 in FIG. 8) by the base station 504 of the UE 502 for periodicity (e.g., 824 in FIG. 8) a default rank/DMRS port assignment (e.g., 870 in FIG. 8), a configuration (e.g., 839 in FIG. 8) by the base station 504 of the UE 502 for a fallback default (e.g., 880 in FIG. 8) associated with a rank/DMRS port assignment based on a fall back timer (e.g., 840 in FIG. 8), and/or provision by the base station 504 and reception by the UE 502 and of an empty DL grant (e.g., 844, 890 in FIG. 8).

In aspects, to provide in 1234, and as shown in 1236, the network node may be configured to provide, for a UE, the at least one shared DMRS. As an example, the provision may be performed by one or more of the component 199, the transceiver 1446, and/or the antenna 1480 in FIG. 14. FIG. 5 illustrates an example of the network node (e.g., the base station 504) providing such a DMRS(s) for a UE (e.g., the UE 502).

In 1238, the network node provides, after the PDSCH transmission, a DL grant using a PDCCH, where the DL grant (i) indicates a change to a port assignment of the at least one shared DMRS at a future time and (ii) refrains from scheduling transmissions on a PDSCH. As an example, the provision may be performed by one or more of the component 199, the transceiver 1446, and/or the antenna 1480 in FIG. 14. FIGS. 5, 8 illustrates an example of the network node (e.g., the base station 504 in FIG. 5) providing such a DL grant for a UE (e.g., the UE 502 in FIG. 5).

The base station 504 may be configured to transmit/provide, and the UE 502 may be configured to receive, a DL grant 842 in DCI using the PDCCH, where the DL grant (i) indicates a change to a port assignment of the at least one shared DMRS at a future time and (ii) refrains from scheduling the PDSCH 844. In the configuration 890, implementation of an empty DL grant may improve reliability for PDCCH/PDSCH multiplexing with rank adaptation. For example, configuration 890 shows a PDSCH 844, as empty, for which the DL grant 842 in DCI associated with the PDCCH does not schedule the PDSCH 844. Rather, the DL grant 842 in DCI associated with the PDCCH may be configured to indicate a future DMRS port assignment for a future PDSCH of a future DL grant for a UE. That is, a UE may be configured to receive, from a network node and after decoding a prior PDSCH that is multiplexed with a PDCCH that schedules the PDSCH, as described herein, a DL grant 842 in DCI associated with the PDCCH, where the DL grant 842 (*i*) indicates a change to a port assignment of the at least one shared DMRS at a future time and (ii) refrains from scheduling the PDSCH 844 (the empty DL grant).

Figure 13:
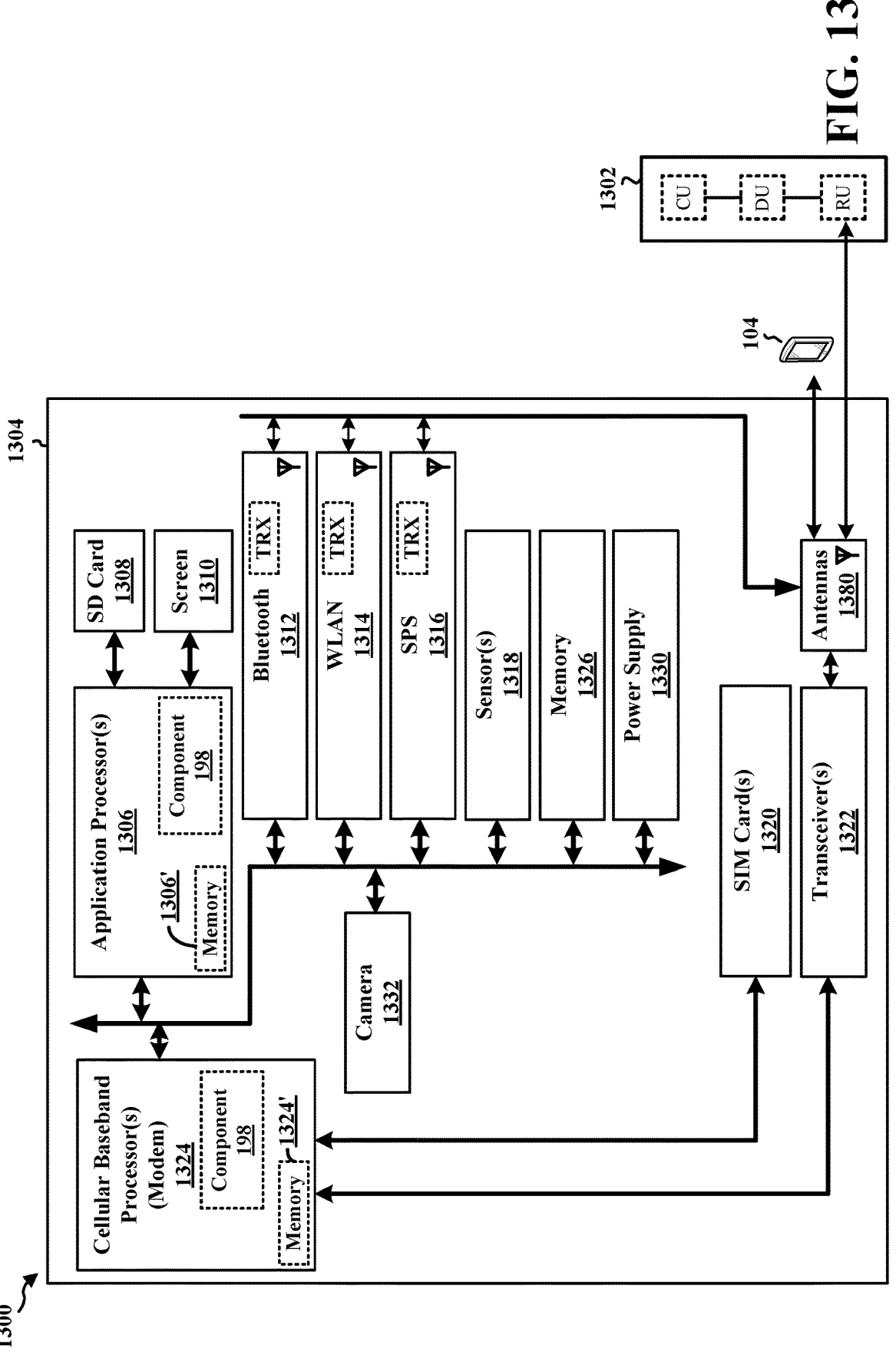
FIG. 13 is a diagram illustrating an example of a hardware implementation for an example apparatus and/or network entity.

FIG. 13 is a diagram 1300 illustrating an example of a hardware implementation for an apparatus 1304. The apparatus 1304 may be a UE, a component of a UE, or may implement UE functionality. In some aspects, the apparatus 1304 may include at least one cellular baseband processor 1324 (also referred to as a modem) coupled to one or more transceivers 1322 (e.g., cellular RF transceiver). The cellular baseband processor(s) 1324 (or processor circuitry) may include at least one on-chip memory 1324' (or memory circuitry). In some aspects, the apparatus 1304 may further include one or more subscriber identity modules (SIM) cards 1320 and at least one application processor 1306 coupled to a secure digital (SD) card 1308 and a screen 1310. The application processor(s) 1306 (or processor circuitry) may include on-chip memory 1306' (or memory circuitry). In some aspects, the apparatus 1304 may further include a Bluetooth module 1312, a WLAN module 1314, an SPS module 1316 (e.g., GNSS module), one or more sensor modules 1318 (e.g., barometric pressure sensor/altimeter; motion sensor such as inertial measurement unit (IMU), gyroscope, and/or accelerometer(s); light detection and ranging (LIDAR), radio assisted detection and ranging (RA-DAR), sound navigation and ranging (SONAR), magnetometer, audio and/or other technologies used for positioning), additional memory modules 1326, a power supply 1330, and/or a camera 1332. The Bluetooth module 1312, the WLAN module 1314, and the SPS module 1316 may include an on-chip transceiver (TRX) (or in some cases, just a receiver (RX)). The Bluetooth module 1312, the WLAN module 1314, and the SPS module 1316 may include their own dedicated antennas and/or utilize the antennas 1380 for communication. The cellular baseband processor(s) 1324 communicates through the transceiver(s) 1322 via one or more antennas 1380 with the UE 104 and/or with an RU associated with a network entity 1302. The cellular baseband processor(s) 1324 and the application processor(s) 1306 may each include a computer-readable medium/memory 1324', 1306', respectively. The additional memory modules 1326 may also be considered a computer-readable medium/memory. Each computer-readable medium/memory 1324', 1306', 1326 may be non-transitory. The cellular baseband processor(s) 1324 and the application processor(s) 1306 are each responsible for general processing, including the execution of software stored on the computer-readable medium/memory. The software, when executed by the cellular baseband processor(s) 1324/application processor(s) 1306, causes the cellular baseband processor(s) 1324/application processor(s) 1306 to perform the various functions described supra. The cellular baseband processor(s) 1324 and the application processor(s) 1306 are configured to perform the various functions described supra based at least in part of the information stored in the memory. That is, the cellular baseband processor(s) 1324 and the application processor(s) 1306 may be configured to perform a first subset of the various functions described supra without information stored in the memory and may be configured to perform a second subset of the various functions described supra based on the information stored in the memory. The computer-readable medium/memory may also be used for storing data that is manipulated by the cellular baseband processor(s) 1324/application processor(s) 1306 when executing software. The cellular baseband processor(s) 1324/application processor(s) 1306 may be a component of the UE 350 and may include the at least one memory 360 and/or at least one of the TX processor 368, the RX processor 356, and the controller/processor 359. In one configuration, the apparatus 1304 may be at least one processor chip (modem and/or application) and include just the cellular baseband processor(s) 1324 and/or the application processor(s) 1306, and in another configuration, the apparatus 1304 may be the entire UE (e.g., see UE 350 of FIG. 3) and include the additional modules of the apparatus 1304.

As discussed supra, the component 198 may be configured to receive a PDSCH transmission that is multiplexed with a PDCCH transmission that schedules the PDSCH transmission, where the PDCCH transmission has a first rank and the PDSCH transmission has a second rank, and the PDCCH transmission and the PDSCH transmission have at least one shared DMRS based on a shared DMRS indication. The component 198 may also be configured to decode the PDSCH transmission using a channel estimation for the PDSCH transmission and the second rank of the PDSCH transmission that is based on the shared DMRS indication. The component 198 may be configured to identify the second rank for the PDSCH transmission using multiple rank hypotheses associated with ports of the at least one shared DMRS. The component 198 may be configured to provide, for a network node, a capability indication for the UE, where the capability indication is indicative of a UE capability associated with a performance of the multiple rank hypotheses associated with the at least one shared DMRS. The component 198 may be configured to receive, from a network node prior to the PDSCH transmission multiplexed with the PDCCH transmission, a configuration of the second rank. The component 198, where the configuration is comprised in an RRC message, may be configured to receive, prior to the PDSCH transmission multiplexed with the PDCCH transmission, an activation or an update of the second rank in at least one of a MAC-CE or DCI. The component 198 may be configured to receive, from a network node at a time length prior to the PDSCH transmission multiplexed with the PDCCH transmission, DCI indicative of, for a future time that corresponds to the PDSCH transmission multiplexed with the PDCCH transmission, at least one of the second rank or a DMRS port assignment associated with the at least one shared DMRS. The component 198 may be configured to provide, for the network node prior to the PDSCH transmission multiplexed with the PDCCH transmission, an ACK indication for the DCI. The component 198 may be configured to apply at least one of the second rank or the DMRS port assignment for the PDSCH transmission multiplexed with the PDCCH transmission based on a time delay triggered by the provision of the ACK indication. The component 198 may be configured to receive, from the network node, a default monitoring configuration that indicates a default monitoring occasion periodicity for a default PDCCH having a default rank and a default port assignment for the at least one shared DMRS. The component 198 may be configured to receive, from the network node, a default PDSCH that is multiplexed with the default PDCCH based on the default monitoring configuration and the default monitoring occasion periodicity. The component 198 may be configured to receive, from the network node, a fallback configuration that indicates (i) a fallback timer associated with a start of the PDSCH multiplexed with the PDCCH and (ii) a default port assignment for at least one shared default DMRS between a default PDSCH and a default PDCCH. The component 198 may be configured to receive, from the network node and subsequent to an expiration of the fallback timer, the default PDSCH that is multiplexed with the default PDCCH based on the fallback configuration. The component 198 may be configured to receive, from a network node and after decoding the PDSCH, a DL grant using a PDCCH, where the DL grant (i) indicates a change to a port assignment of the at least one shared DMRS at a future time and (ii) refrains from scheduling transmissions on a PDSCH. The component 198 may be further configured to perform any of the aspects described in connection with the flowcharts in any of FIGS. 9, 10, 11, 12 and/or any of the aspects performed by a UE for any of FIGS. 5-8. The component 198 may be within the cellular baseband processor(s) 1324, the application processor(s) 1306, or both the cellular baseband processor(s) 1324 and the application processor(s) 1306. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 1304 may include a variety of components configured for various functions. In one configuration, the apparatus 1304, and in particular the cellular baseband processor(s) 1324 and/or the application processor(s) 1306, may include means for receiving a PDSCH transmission that is multiplexed with a PDCCH transmission that schedules the PDSCH transmission, where the PDCCH transmission has a first rank and the PDSCH transmission has a second rank, and the PDCCH transmission and the PDSCH transmission have at least one shared DMRS based on a shared DMRS indication. In one configuration, the apparatus 1304, and in particular the cellular baseband processor(s) 1324 and/or the application processor(s) 1306, may include means for decoding the PDSCH using a channel estimation for the PDSCH transmission and the second rank of the PDSCH transmission that is based on the shared DMRS indication. In one configuration, the apparatus 1304, and in particular the cellular baseband processor(s) 1324 and/or the application processor(s) 1306, may include means for identifying the second rank for the PDSCH transmission using multiple rank hypotheses associated with ports of the at least one shared DMRS. In the configuration, the apparatus 1304, and in particular the cellular baseband processor(s) 1324 and/or the application processor(s) 1306, may include means for providing, for a network node, a capability indication for the UE, where the capability indication is indicative of a UE capability associated with a performance of the multiple rank hypotheses associated with the at least one shared DMRS. In one configuration, the apparatus 1304, and in particular the cellular baseband processor(s) 1324 and/or the application processor(s) 1306, may include means for receiving, from a network node prior to the PDSCH multiplexed with the PDCCH, a configuration of the second rank. In one configuration, the apparatus 1304, and in particular the cellular baseband processor(s) 1324 and/or the application processor(s) 1306, may include means for receiving, prior to the PDSCH transmission multiplexed with the PDCCH, an activation or an update of the second rank in at least one of a MAC control element (MAC-CE) or DCI. In one configuration, the apparatus 1304, and in particular the cellular baseband processor(s) 1324 and/or the application processor(s) 1306, may include means for receiving, from a network node at a time length prior to the PDSCH transmission multiplexed with the PDCCH transmission, DCI indicative of, for a future time that corresponds to the PDSCH transmission multiplexed with the PDCCH transmission, at least one of the second rank or a DMRS port assignment associated with the at least one shared DMRS. In one configuration, the apparatus 1304, and in particular the cellular baseband processor(s) 1324 and/or the application processor(s) 1306, may include means for providing, for the network node prior to the PDSCH transmission multiplexed with the PDCCH transmission, an acknowledgement (ACK) indication for the DCI. In one configuration, the apparatus 1304, and in particular the cellular baseband processor(s) 1324 and/or the application processor(s) 1306, may include means for applying at least one of the second rank or the DMRS port assignment for the PDSCH transmission multiplexed with the PDCCH transmission based on a time delay triggered by the provision of the ACK indication. In one configuration, the apparatus 1304, and in particular the cellular baseband processor(s) 1324 and/or the application processor(s) 1306, may include means for receiving, from the network node, a default monitoring configuration that indicates a default monitoring occasion periodicity for a default PDCCH having a default rank and a default port assignment for the at least one shared DMRS. In one configuration, the apparatus 1304, and in particular the cellular baseband processor(s) 1324 and/or the application processor(s) 1306, may include means for receiving, from the network node, a default PDSCH that is multiplexed with the default PDCCH based on the default monitoring configuration and the default monitoring occasion periodicity. In one configuration, the apparatus 1304, and in particular the cellular baseband processor(s) 1324 and/or the application processor(s) 1306, may include means for receiving, from the network node, a fallback configuration that indicates (i) a fallback timer associated with a start of the PDSCH transmission multiplexed with the PDCCH transmission and (ii) a default port assignment for at least one shared default DMRS between a default PDSCH and a default PDCCH. In one configuration, the apparatus 1304, and in particular the cellular baseband processor(s) 1324 and/or the application processor(s) 1306, may include means for receiving, from the network node and subsequent to an expiration of the fallback timer, the default PDSCH that is multiplexed with the default PDCCH based on the fallback configuration. In one configuration, the apparatus 1304, and in particular the cellular baseband processor(s) 1324 and/or the application processor(s) 1306, may include means for receiving, from a network node and after decoding the PDSCH transmission, a DL grant using a PDCCH, where the DL grant (i) indicates a change to a port assignment of the at least one shared DMRS at a future time and (ii) refrains from scheduling transmissions on a PDSCH. The means may be the component 198 of the apparatus 1304 configured to perform the functions recited by the means. As described supra, the apparatus 1304 may include the TX processor 368, the RX processor 356, and the controller/processor 359. As such, in one configuration, the means may be the TX processor 368, the RX processor 356, and/or the controller/processor 359 configured to perform the functions recited by the means.

Figure 14:
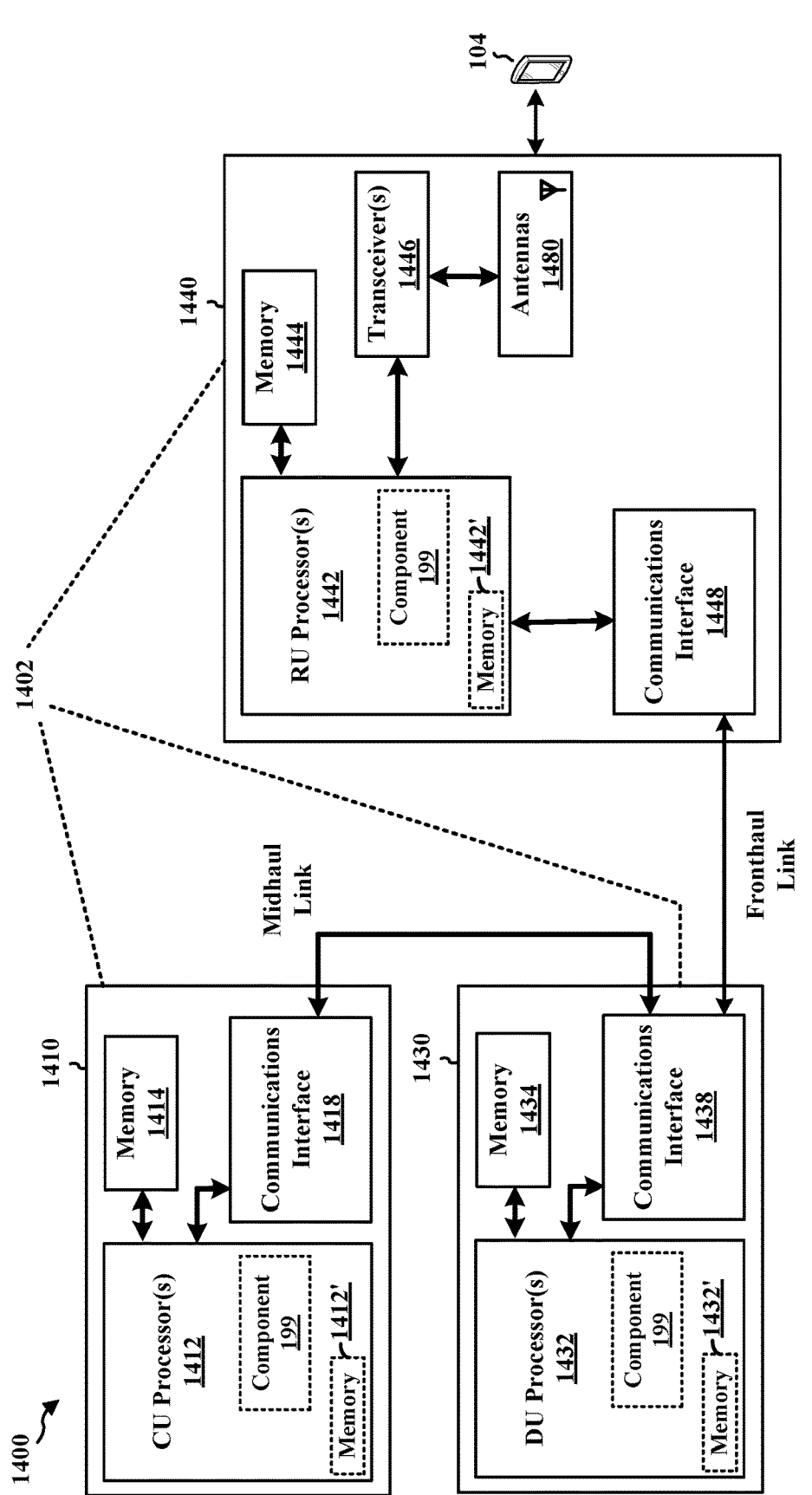
FIG. 14 is a diagram illustrating an example of a hardware implementation for an example network entity.

FIG. 14 is a diagram 1400 illustrating an example of a hardware implementation for a network entity 1402. The network entity 1402 may be a BS, a component of a BS, or may implement BS functionality. The network entity 1402 may include at least one of a CU 1410, a DU 1430, or an RU 1440. For example, depending on the layer functionality handled by the component 199, the network entity 1402 may include the CU 1410; both the CU 1410 and the DU 1430; each of the CU 1410, the DU 1430, and the RU 1440; the DU 1430; both the DU 1430 and the RU 1440; or the RU 1440. The CU 1410 may include at least one CU processor 1412. The CU processor(s) 1412 may include on-chip memory 1412'. In some aspects, the CU 1410 may further include additional memory modules 1414 and a communications interface 1418. The CU 1410 communicates with the DU 1430 through a midhaul link, such as an F1 interface. The DU 1430 may include at least one DU processor 1432. The DU processor(s) 1432 may include on-chip memory 1432'. In some aspects, the DU 1430 may further include additional memory modules 1434 and a communications interface 1438. The DU 1430 communicates with the RU 1440 through a fronthaul link. The RU 1440 may include at least one RU processor 1442. The RU processor(s) 1442 may include on-chip memory 1442'. In some aspects, the RU 1440 may further include additional memory modules 1444, one or more transceivers 1446, antennas 1480, and a communications interface 1448. The RU 1440 communicates with the UE 104. The on-chip memory 1412', 1432', 1442' and the additional memory modules 1414, 1434, 1444 may each be considered a computer-readable medium/memory. Each computer-readable medium/memory may be non-transitory. Each of the processors 1412, 1432, 1442 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 may be configured to encode a PDSCH transmission that is multiplexed with a PDCCH transmission that schedules the PDSCH transmission, where the PDCCH transmission has a first rank and the PDSCH transmission has a second rank, and the PDCCH transmission and the PDSCH transmission have at least one shared DMRS that is shared between the PDCCH transmission and the PDSCH transmission. The component 199 may also be configured to provide, for a UE, the PDSCH transmission that is multiplexed with the PDCCH transmission that schedules the PDSCH transmission and a shared DMRS indication indicative of the at least one shared DMRS. The component 199 may be configured to receive, from the UE, a capability indication for the UE, where the capability indication is indicative of a UE capability associated with a performance of multiple rank hypotheses associated with the at least one shared DMRS. The component 199 may be configured to configure the UE, prior to the PDSCH transmission multiplexed with the PDCCH transmission, with a configuration of the second rank. The component 199, where the configuration is comprised in an RRC message, may be configured to provide, prior to the PDSCH transmission multiplexed with the PDCCH transmission, an activation or an update of the second rank in at least one of a MAC-CE or downlink control information DCI. The component 199 may be configured to provide, for the UE at a time length prior to the PDSCH transmission multiplexed with the PDCCH transmission, DCI indicative of, for a future time that corresponds to the PDSCH multiplexed with the PDCCH transmission, at least one of the second rank or a DMRS port assignment associated with the at least one shared DMRS. The component 199 may be configured to receive, from the UE prior to the PDSCH transmission multiplexed with the PDCCH transmission, an ACK indication for the DCI, where providing, for the UE, the PDSCH transmission that is multiplexed with the PDCCH transmission includes to provide the PDSCH transmission that is multiplexed with the PDCCH transmission based on a time delay triggered by the reception of the ACK indication. The component 199 may be configured to configure the UE with a default monitoring configuration that indicates a default monitoring occasion periodicity for a default PDCCH having a default rank and a default port assignment for the at least one shared DMRS. The component 199 may be configured to provide, for the UE, a default PDSCH that is multiplexed with the default PDCCH based on the default monitoring configuration and the default monitoring occasion periodicity. The component 199 may be configured to configure the UE with a fallback configuration that indicates (i) a fallback timer associated with a start of the PDSCH transmission multiplexed with the PDCCH transmission and (ii) a default port assignment for at least one shared default DMRS between a default PDSCH and a default PDCCH. The component 199 may be configured to provide, for the UE and subsequent to an expiration of the fallback timer, the default PDSCH that is multiplexed with the default PDCCH based on the fallback configuration. The component 199 may be configured to provide, for the UE and after the PDSCH transmission that is multiplexed with the PDCCH transmission, a DL grant using the PDCCH transmission, where the DL grant (i) indicates a change to a port assignment of the at least one shared DMRS at a future time and (ii) refrains from scheduling the PDSCH transmission. The component 199 may be further configured to perform any of the aspects described in connection with the flowcharts in any of FIGS. 9, 10, 11, 12 and/or any of the aspects performed by a network node, base station, gNB, etc., for any of FIGS. 5-8. The component 199 may be within one or more processors of one or more of the CU 1410, DU 1430, and the RU 1440. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 1402 may include a variety of components configured for various functions. In one configuration, the network entity 1402 may include means for encoding a PDSCH transmission that is multiplexed with a PDCCH transmission that schedules the PDSCH transmission, where the PDCCH transmission has a first rank and the PDSCH transmission has a second rank, and the PDCCH transmission and the PDSCH transmission have at least one shared DMRS. In the configuration, the network entity 1402 may include means for providing, for a UE, the PDSCH transmission that is multiplexed with the PDCCH transmission that schedules the PDSCH transmission and a shared DMRS indication indicative of the at least one shared DMRS. In one configuration, the network entity 1402 may include means for receiving, from the UE, a capability indication for the UE, where the capability indication is indicative of a UE capability associated with a performance of multiple rank hypotheses associated with the at least one shared DMRS. In one configuration, the network entity 1402 may include means for configuring the UE, prior to the PDSCH transmission multiplexed with the transmission PDCCH, with a configuration of the second rank. In one configuration, where the configuration is comprised in an RRC message, the network entity 1402 may include means for, providing, prior to the PDSCH transmission multiplexed with the PDCCH transmission, an activation or an update of the second rank in at least one of a MAC-CE or downlink control information DCI. In one configuration, the network entity 1402 may include means for providing, for the UE at a time length prior to the PDSCH transmission multiplexed with the PDCCH transmission, DCI indicative of, for a future time that corresponds to the PDSCH multiplexed with the PDCCH transmission, at least one of the second rank or a DMRS port assignment associated with the at least one shared DMRS. In one configuration, the network entity 1402 may include means for receiving, from the UE prior to the PDSCH transmission multiplexed with the PDCCH transmission, an ACK indication for the DCI, where providing, for the UE, the PDSCH transmission that is multiplexed with the PDCCH transmission includes to provide the PDSCH that is multiplexed with the PDCCH transmission based on a time delay triggered by the reception of the ACK indication. In one configuration, the network entity 1402 may include means for configuring the UE with a default monitoring configuration that indicates a default monitoring occasion periodicity for a default PDCCH having a default rank and a default port assignment for the at least one shared DMRS. In one configuration, the network entity 1402 may include means for providing, for the UE, a default PDSCH that is multiplexed with the default PDCCH based on the default monitoring configuration and the default monitoring occasion periodicity. In one configuration, the network entity 1402 may include means for configuring the UE with a fallback configuration that indicates (i) a fallback timer associated with a start of the PDSCH transmission multiplexed with the PDCCH transmission and (ii) a default port assignment for at least one shared default DMRS between a default PDSCH transmission and a default PDCCH. In one configuration, the network entity 1402 may include means for providing, for the UE and subsequent to an expiration of the fallback timer, the default PDSCH that is multiplexed with the default PDCCH based on the fallback configuration. In one configuration, the network entity 1402 may include means for providing, for the UE and after the PDSCH transmission that is multiplexed with the PDCCH transmission, a DL grant using a PDCCH, where the DL grant (i) indicates a change to a port assignment of the at least one shared DMRS at a future time and (ii) refrains from scheduling transmissions on a PDSCH. The means may be the component 199 of the network entity 1402 configured to perform the functions recited by the means. As described supra, the network entity 1402 may include the TX processor 316, the RX processor 370, and the controller/processor 375. As such, in one configuration, the means may be the TX processor 316, the RX processor 370, and/or the controller/processor 375 configured to perform the functions recited by the means.

Wireless communication networks may be designed to support communications between network nodes (e.g., base stations, gNBs, etc.) and UEs. In such communications, the PDCCH may be optimized. For instance, 5G NR networks may optimize PDCCH for FR1, and these optimizations may be directly applied to FR2 as an afterthought. The CORE-SET is a collection of resources that may be shared by multiple PDCCHs targeting multiple UEs, and wireless communication network designs may be optimized to maximize control capacity and flexibility. As one example, to be able to send downlink DCI to multiple UEs with different geometry, different aggregation levels may be warranted. Additionally, different UEs may have different channel realization, thus the DMRS may be self-contained within each PDCCH to allow precoding to be separately selected for each DCI. However, FR2 may involve analog beam restrictions. For different UEs to be served (e.g., with traffic), the chance may be low for these UEs to be in the same analog beam, and thus service for the UEs in an FDM fashion (e.g., with a single array) may not be possible, and TDM may be used instead, or SDM if there are multiple panels. Further, the SCS for FR2 (or higher) may be large, and the symbol/slot duration may be short. As a result, TDM serving different UEs with smaller time units may still have an acceptable delay.

Aspects herein for PDCCH/PDSCH multiplexing with rank adaptation enable PDCCH/PDSCH multiplexing optimization for FR2 and above (e.g., mmW and sub-THz bands) without focusing on multiple UE DCI transmissions, but rather with focus on the provision of one or more DCI to the same UE. Precoding and/or beamforming may be the same for all the provided DCIs as different precoding/beamforming between the PDCCH and PDSCH may have minimal, or no, real value for consideration. Accordingly, examples herein provide for integration, e.g., multiplexing, of PDCCH and PDSCH transmissions. In other words, instead of defining separate PDCCH and PDSCH regions, the described examples provide for tightly integrating the PDCCH and PDSCH transmissions. Some examples provide for shared DMRS (e.g., where the PDSCH DMRS may be used for PDCCH), as well as shared resources (e.g., the PDSCH rate matches around the resources used by the PDCCH). Channel estimations may be performed based on rank information for PDSCHs by sharing the DMRS between a multiplexed PDSCH and PDCCH. Additionally, the rank information identified by utilizing multiple hypotheses, semi-static rank configurations, and/or dynamic rank switching with delayed actions.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X. X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit or provide the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a user equipment (UE), comprising: receiving a physical downlink shared channel (PDSCH) transmission that is multiplexed with a physical downlink control channel (PDCCH) transmission that includes information to schedule the PDSCH transmission, wherein the PDCCH transmission has a first rank and the PDSCH transmission has a second rank, and the PDCCH transmission and the PDSCH transmission have at least one shared demodulation reference signal (DMRS) based on a shared DMRS indication; and decoding the PDSCH transmission using a channel estimation for the PDSCH transmission and the second rank of the PDSCH transmission that is based on the shared DMRS indication indicative of the at least one shared DMRS shared between the PDSCH transmission and the PUCCH transmission.

Aspect 2 is the method of aspect 1, wherein decoding the PDSCH transmission using the channel estimation for the PDSCH and the second rank of the PDSCH transmission that is based on the shared DMRS indication includes: identifying the second rank for the PDSCH using multiple rank hypotheses associated with ports of the at least one shared DMRS.

Aspect 3 is the method of aspect 2, further comprising: providing, for a network node, a capability indication for the UE, wherein the capability indication is indicative of a UE capability associated with a performance of the multiple rank hypotheses associated with the at least one shared DMRS; wherein the PDSCH transmission is associated with a modulation and coding scheme (MCS) that is based on the capability indication for the UE, or wherein the performance of the multiple rank hypotheses is associated with at least one of a rank 1 or a rank 2.

Aspect 4 is the method of aspect 1, further comprising: receiving, from a network node prior to the PDSCH transmission multiplexed with the PDCCH transmission, a configuration of the second rank.

Aspect 5 is the method of aspect 4, wherein the configuration is comprised in a radio resource control (RRC) message, the method further comprising: receiving, prior to the PDSCH transmission multiplexed with the PDCCH transmission, an activation or an update of the second rank in at least one of a medium access control (MAC) control element (MAC-CE) or downlink control information (DCI).

Aspect 6 is the method of aspect 1, further comprising: receiving, from a network node at a time length prior to the PDSCH transmission multiplexed with the PDCCH transmission, downlink control information (DCI) indicative of, for a future time that corresponds to the PDSCH transmission multiplexed with the PDCCH transmission, at least one of the second rank or a DMRS port assignment associated with the at least one shared DMRS.

Aspect 7 is the method of aspect 6, further comprising: transmitting, for the network node prior to the PDSCH transmission multiplexed with the PDCCH transmission, an acknowledgement (ACK) indication for the DCI; and applying at least one of the second rank or the DMRS port assignment for the PDSCH transmission multiplexed with the PDCCH transmission based on a time delay triggered by the transmission of the ACK indication.

Aspect 8 is the method of aspect 6, wherein the first rank is a semi-static rank that is associated with a first port assignment for the PDCCH, wherein a second port assignment for the PDSCH is based on the second rank.

Aspect 9 is the method of aspect 6, further comprising: receiving, from the network node, a default monitoring configuration that indicates a default monitoring occasion periodicity for a default PDCCH having a default rank and a default port assignment for the at least one shared DMRS; and receiving, from the network node, a default PDSCH transmission that is multiplexed with a default PDCCH transmission based on the default monitoring configuration and the default monitoring occasion periodicity.

Aspect 10 is the method of aspect 6, further comprising: receiving, from the network node, a fallback configuration that indicates (i) a fallback timer associated with a start of the PDSCH transmission multiplexed with the PDCCH transmission and (ii) a default port assignment for at least one shared default DMRS between a default PDSCH and a default PDCCH; and receiving, from the network node and subsequent to an expiration of the fallback timer, a default PDSCH transmission that is multiplexed with a default PDCCH transmission based on the fallback configuration.

Aspect 11 is the method of any of aspects 1 to 10, wherein the shared DMRS indication is comprised in at least one of a radio resource control (RRC) message, a medium access control (MAC) control element (MAC-CE), or downlink control information (DCI).

Aspect 12 is the method of any of aspects 1 to 11, further comprising: receiving, from a network node and after decoding the PDSCH transmission, a downlink (DL) grant using the PDCCH, wherein the DL grant (i) indicates a change to a port assignment of the at least one shared DMRS at a future time and (ii) refrains from scheduling the PDSCH.

Aspect 13 is a method of wireless communication at a network node, comprising: encoding a physical downlink shared channel (PDSCH) transmission that is multiplexed with a physical downlink control channel (PDCCH) transmission that includes information to schedule the PDSCH transmission, wherein the PDCCH transmission has a first rank and the PDSCH transmission has a second rank, and the PDCCH transmission and the PDSCH transmission have at least one shared demodulation reference signal (DMRS); and providing, for a user equipment (UE), the PDSCH transmission that is multiplexed with the PDCCH transmission that includes the information to schedule the PDSCH transmission and a shared DMRS indication indicative of the at least one shared DMRS shared between the PDSCH and the PUCCH.

Aspect 14 is the method of aspect 13, wherein providing, for the UE, the PDSCH transmission that is multiplexed with the PDCCH transmission includes providing the at least one shared DMRS.

Aspect 15 is the method of aspect 14, further comprising: receiving, from the UE, a capability indication for the UE, wherein the capability indication is indicative of a UE capability associated with a performance of multiple rank hypotheses associated with the at least one shared DMRS; wherein encoding the PDSCH transmission that is multiplexed with the PDCCH transmission includes encoding the PDSCH transmission with a modulation and coding scheme (MCS) that is based on the capability indication for the UE.

Aspect 16 is the method of aspect 13, further comprising: configuring the UE, prior to the PDSCH transmission multiplexed with the PDCCH transmission, with a configuration of the second rank.

Aspect 17 is the method of aspect 16, wherein the configuration is comprised in a radio resource control (RRC) message, the method further comprising: providing, prior to the PDSCH transmission multiplexed with the PDCCH transmission, an activation or an update of the second rank in at least one of a medium access control (MAC) control element (MAC-CE) or downlink control information (DCI).

Aspect 18 is the method of aspect 13, further comprising: providing, for the UE at a time length prior to the PDSCH transmission multiplexed with the PDCCH transmission, downlink control information (DCI) indicative of, for a future time that corresponds to the PDSCH transmission multiplexed with the PDCCH transmission, at least one of the second rank or a DMRS port assignment associated with the at least one shared DMRS.

Aspect 19 is the method of aspect 18, further comprising: receiving, from the UE prior to the PDSCH transmission multiplexed with the PDCCH transmission, an acknowledgement (ACK) indication for the DCI; wherein providing, for the UE, the PDSCH transmission that is multiplexed with the PDCCH transmission includes providing the PDSCH transmission that is multiplexed with the PDCCH transmission based on a time delay triggered by the reception of the ACK indication.

Aspect 20 is the method of aspect 18, wherein the first rank is a semi-static rank that is associated with a first port assignment for the PDCCH transmission, wherein a second port assignment for the PDSCH transmission is based on the second rank.

Aspect 21 is the method of aspect 18, further comprising: configuring the UE with a default monitoring configuration that indicates a default monitoring occasion periodicity for a default PDCCH having a default rank and a default port assignment for the at least one shared DMRS; and providing, for the UE, a default PDSCH transmission that is multiplexed with a default PDCCH transmission based on the default monitoring configuration and the default monitoring occasion periodicity.

Aspect 22 is the method of aspect 18, further comprising: configuring the UE with a fallback configuration that indicates (i) a fallback timer associated with a start of the PDSCH transmission multiplexed with the PDCCH transmission and (ii) a default port assignment for at least one shared default DMRS between a default PDSCH and a default PDCCH; and providing, for the UE and subsequent to an expiration of the fallback timer, a default PDSCH transmission that is multiplexed with a default PDCCH transmission based on the fallback configuration.

Aspect 23 is the method of any of aspects 13 to 22, wherein the shared DMRS indication is comprised in at least one of a radio resource control (RRC) message, a medium access control (MAC) control element (MAC-CE), or downlink control information (DCI).

Aspect 24 is the method of any of aspects 13 to 23, further comprising: providing, for the UE and after the PDSCH transmission that is multiplexed with the PDCCH transmission, a downlink (DL) grant using a PDCCH, wherein the DL grant (i) indicates a change to a port assignment of the at least one shared DMRS at a future time and (ii) refrains from scheduling transmissions on a PDSCH.

Aspect 25 is an apparatus for wireless communication at a UE including means for implementing any of aspects 1 to 12.

Aspect 26 is a computer-readable medium (e.g., a non-transitory computer-readable medium) storing computer executable code for wireless communication at a UE, the code when executed by at least one processor causes the UE to implement any of aspects 1 to 12.

Aspect 27 is an apparatus for wireless communication at a UE. The apparatus includes a memory; and at least one processor coupled to the memory and, based at least in part on stored information that is stored in the memory, the at least one processor is configured to cause the UE to implement any of aspects 1 to 12.

Aspect 28 is the apparatus of aspect 27, further including at least one of a transceiver or an antenna coupled to the at least one processor.

Aspect 29 is an apparatus for wireless communication at a network node including means for implementing any of aspects 13 to 24.

Aspect 30 is a computer-readable medium (e.g., a non-transitory computer-readable medium) storing computer executable code, the code when executed by at least one processor causes the network node to implement any of aspects 13 to 24.

Aspect 31 is an apparatus for wireless communication at a network node. The apparatus includes a memory; and at least one processor coupled to the memory and, based at least in part on stored information that is stored in the memory, the at least one processor is configured to cause the network node to implement any of aspects 13 to 24.

Aspect 32 is the apparatus of aspect 31, further including at least one of a transceiver or an antenna coupled to the at least one processor.

What is claimed is:

1. An apparatus for wireless communication at a user equipment (UE), comprising:

at least one memory; and at least one processor coupled to the at least one memory and, based at least in part on stored information that is stored in the at least one memory, the at least one processor, individually or in any combination, is configured to:

receive a physical downlink shared channel (PDSCH) transmission that is multiplexed with a physical downlink control channel (PDCCH) transmission that includes information to schedule the PDSCH transmission, wherein the PDCCH transmission has a first rank and the PDSCH transmission has a second rank, and the PDCCH transmission and the PDSCH transmission have at least one shared demodulation reference signal (DMRS) based on a shared DMRS indication indicative of the at least one shared DMRS shared between the PDSCH transmission and the PDCCH transmission; and decode the PDSCH transmission using a channel estimation for the PDSCH transmission and the second rank of the PDSCH transmission that is based on the shared DMRS indication.

2. The apparatus of claim 1, wherein to decode the PDSCH transmission using the channel estimation for the PDSCH transmission and the second rank of the PDSCH transmission that is based on the shared DMRS indication, the at least one processor, individually or in any combination, is configured to:

identify the second rank for the PDSCH transmission using multiple rank hypotheses associated with ports of the at least one shared DMRS.

3. The apparatus of claim 2, wherein the at least one processor, individually or in any combination, is further configured to:

provide, for a network node, a capability indication for the UE, wherein the capability indication is indicative of a UE capability associated with a performance of the multiple rank hypotheses associated with the at least one shared DMRS;

wherein the PDSCH transmission is associated with a modulation and coding scheme (MCS) that is based on the capability indication for the UE, or wherein the performance of the multiple rank hypotheses is associated with at least one of a rank 1 or a rank 2.

4. The apparatus of claim 1, wherein the at least one processor, individually or in any combination, is further configured to:

receive, from a network node prior to the PDSCH transmission multiplexed with the PDCCH transmission, a configuration of the second rank.

5. The apparatus of claim 4, wherein the configuration is comprised in a radio resource control (RRC) message, wherein the at least one processor, individually or in any combination, is further configured to:

receive, prior to the PDSCH transmission multiplexed with the PDCCH transmission, an activation or an update of the second rank in at least one of a medium access control (MAC) control element (MAC-CE) or downlink control information (DCI).

6. The apparatus of claim 1, wherein the at least one processor, individually or in any combination, is further configured to:

receive, from a network node at a time length prior to the PDSCH transmission multiplexed with the PDCCH transmission, downlink control information (DCI) indicative of, for a future time that corresponds to the PDSCH transmission multiplexed with the PDCCH transmission, at least one of the second rank or a DMRS port assignment associated with the at least one shared DMRS.

7. The apparatus of claim 6, wherein the at least one processor, individually or in any combination, is further configured to:

transmit, for the network node prior to the PDSCH transmission multiplexed with the PDCCH transmission, an acknowledgement (ACK) indication for the DCI; and apply at least one of the second rank or the DMRS port assignment for the PDSCH transmission multiplexed with the PDCCH transmission based on a time delay triggered by a transmission of the ACK indication.

8. The apparatus of claim 6, wherein the first rank is a semi-static rank that is associated with a first port assignment for the PDCCH transmission, wherein a second port assignment for the PDSCH transmission is based on the second rank.

9. The apparatus of claim 6, wherein the at least one processor, individually or in any combination, is further configured to:

receive, from the network node, a default monitoring configuration that indicates a default monitoring occasion periodicity for a default PDCCH having a default rank and a default port assignment for the at least one shared DMRS; and receive, from the network node, a default PDSCH transmission that is multiplexed with a default PDCCH transmission based on the default monitoring configuration and the default monitoring occasion periodicity.

10. The apparatus of claim 6, wherein the at least one processor, individually or in any combination, is further configured to:

receive, from the network node, a fallback configuration that indicates (i) a fallback timer associated with a start of the PDSCH transmission multiplexed with the PDCCH transmission and (ii) a default port assignment for at least one shared default DMRS between a default PDSCH and a default PDCCH; and receive, from the network node and subsequent to an expiration of the fallback timer, a default PDSCH transmission that is multiplexed with a default PDCCH transmission based on the fallback configuration.

11. The apparatus of claim 1, wherein the shared DMRS indication is comprised in at least one of a radio resource control (RRC) message, a medium access control (MAC) control element (MAC-CE), or downlink control information (DCI).

12. The apparatus of claim 1, further comprising at least one transceiver coupled to the at least one processor, the at least one processor, individually or in any combination, being configured to:

receive, from a network node via the at least one transceiver and after decoding the PDSCH transmission, a downlink (DL) grant using a PDCCH, wherein the DL grant (i) indicates a change to a port assignment of the at least one shared DMRS at a future time and (ii) refrains from scheduling transmissions on a PDSCH.

13. An apparatus for wireless communication at a network node, comprising:

at least one memory; and at least one processor coupled to the at least one memory and, based at least in part on stored information that is stored in the at least one memory, the at least one processor, individually or in any combination, is configured to:

encode a physical downlink shared channel (PDSCH) transmission that is multiplexed with a physical downlink control channel (PDCCH) transmission that includes information to schedule the PDSCH transmission, wherein the PDCCH transmission has a first rank and the PDSCH transmission has a second rank, and the PDCCH transmission and the PDSCH transmission have at least one shared demodulation reference signal (DMRS); and provide, for a user equipment (UE), the PDSCH transmission that is multiplexed with the PDCCH transmission that schedules the PDSCH transmission and a shared DMRS indication indicative of the at least one shared DMRS shared between the PDSCH transmission and the PDCCH transmission.

14. The apparatus of claim 13, wherein to provide the PDSCH transmission that is multiplexed with the PDCCH transmission, the at least one processor, individually or in any combination, is configured to provide the at least one shared DMRS.

15. The apparatus of claim 14, wherein the at least one processor, individually or in any combination, is further configured to:

receive, from the UE, a capability indication for the UE, wherein the capability indication is indicative of a UE capability associated with a performance of multiple rank hypotheses associated with the at least one shared DMRS;

wherein to encode the PDSCH transmission that is multiplexed with the PDCCH transmission, the at least one processor, individually or in any combination, is configured to encode the PDSCH transmission with a modulation and coding scheme (MCS) that is based on the capability indication for the UE.

16. The apparatus of claim 13, wherein the at least one processor, individually or in any combination, is further configured to:

configure the UE, prior to the PDSCH transmission multiplexed with the PDCCH transmission, with a configuration of the second rank.

17. The apparatus of claim 16, wherein the configuration is comprised in a radio resource control (RRC) message, wherein the at least one processor, individually or in any combination, is configured to:

provide, prior to the PDSCH transmission multiplexed with the PDCCH transmission, an activation or an update of the second rank in at least one of a medium access control (MAC) control element (MAC-CE) or downlink control information (DCI).

18. The apparatus of claim 13, wherein the at least one processor, individually or in any combination, is configured to:

provide, for the UE at a time length prior to the PDSCH transmission multiplexed with the PDCCH transmission, downlink control information (DCI) indicative of, for a future time that corresponds to the PDSCH transmission multiplexed with the PDCCH transmission, at least one of the second rank or a DMRS port assignment associated with the at least one shared DMRS.

19. The apparatus of claim 18, wherein the at least one processor, individually or in any combination, is configured to:

receive, from the UE prior to the PDSCH transmission multiplexed with the PDCCH transmission, an acknowledgement (ACK) indication for the DCI;

wherein to provide the PDSCH transmission that is multiplexed with the PDCCH transmission, the at least one processor, individually or in any combination, is configured to provide the PDSCH transmission that is multiplexed with the PDCCH transmission based on a time delay triggered by reception of the ACK indication.

20. The apparatus of claim 18, wherein the first rank is a semi-static rank that is associated with a first port assignment for the PDCCH transmission, wherein a second port assignment for the PDSCH transmission is based on the second rank.

21. The apparatus of claim 18, wherein the at least one processor, individually or in any combination, is configured to:

configure the UE with a default monitoring configuration that indicates a default monitoring occasion periodicity for a default PDCCH having a default rank and a default port assignment for the at least one shared DMRS; and provide, for the UE, a default PDSCH transmission that is multiplexed with a default PDCCH transmission based on the default monitoring configuration and the default monitoring occasion periodicity.

22. The apparatus of claim 18, wherein the at least one processor, individually or in any combination, is configured to:

configure the UE with a fallback configuration that indicates (i) a fallback timer associated with a start of the PDSCH transmission multiplexed with the PDCCH transmission and (ii) a default port assignment for at least one shared default DMRS between a default PDSCH and a default PDCCH; and provide, for the UE and subsequent to an expiration of the fallback timer, a default PDSCH transmission that is multiplexed with a default PDCCH transmission based on the fallback configuration.

23. The apparatus of claim 13, wherein the shared DMRS indication is comprised in at least one of a radio resource control (RRC) message, a medium access control (MAC) control element (MAC-CE), or downlink control information (DCI).

24. The apparatus of claim 13, further comprising at least one transceiver coupled to the at least one processor, the at least one processor, individually or in any combination, being configured to:

provide, for the UE via the at least one transceiver and after the PDSCH transmission that is multiplexed with the PDCCH transmission, a downlink (DL) grant using the PDCCH, wherein the DL grant (i) indicates a change to a port assignment of the at least one shared DMRS at a future time and (ii) refrains from scheduling the PDSCH transmission.

25. A method of wireless communication at a user equipment (UE), comprising:

receiving a physical downlink shared channel (PDSCH) transmission that is multiplexed with a physical downlink control channel (PDCCH) transmission that includes information to schedule the PDSCH transmission, wherein the PDCCH transmission has a first rank and the PDSCH transmission has a second rank, and the PDCCH transmission and the PDSCH transmission have at least one shared demodulation reference signal (DMRS) based on a shared DMRS indication indicative of the at least one shared DMRS shared between the PDSCH and the PDCCH; and decoding the PDSCH transmission using a channel estimation for the PDSCH transmission and the second rank of the PDSCH transmission that is based on the shared DMRS indication.

26. The method of claim 25, wherein decoding the PDSCH transmission using the channel estimation for the PDSCH transmission and the second rank of the PDSCH transmission that is based on the shared DMRS indication includes:

identifying the second rank for the PDSCH transmission using multiple rank hypotheses associated with ports of the at least one shared DMRS; and providing, for a network node prior to identifying the second rank, a capability indication for the UE, wherein the capability indication is indicative of a UE capability associated with a performance of the multiple rank hypotheses associated with the at least one shared DMRS;

wherein the PDSCH transmission is associated with a modulation and coding scheme (MCS) that is based on the capability indication for the UE, or wherein the performance of the multiple rank hypotheses is associated with at least one of a rank 1 or a rank 2.

27. The method of claim 25, further comprising:

receiving, from a network node prior to the PDSCH transmission multiplexed with the PDCCH transmission, a configuration of the second rank, wherein the configuration is comprised in a radio resource control (RRC) message; and receiving, prior to the PDSCH transmission multiplexed with the PDCCH transmission, an activation or an update of the second rank in at least one of a medium access control (MAC) control element (MAC-CE) or downlink control information (DCI).

28. The method of claim 25, further comprising:

receiving, from a network node at a time length prior to the PDSCH transmission multiplexed with the PDCCH transmission, downlink control information (DCI) indicative of, for a future time that corresponds to the PDSCH transmission multiplexed with the PDCCH transmission, at least one of the second rank or a DMRS port assignment associated with the at least one shared DMRS.

29. A method of wireless communication at a network node, comprising:

encoding a physical downlink shared channel (PDSCH) transmission that is multiplexed with a physical downlink control channel (PDCCH) transmission that includes information to schedule the PDSCH transmission, wherein the PDCCH transmission has a first rank and the PDSCH transmission has a second rank, and the PDCCH transmission and the PDSCH transmission have at least one shared demodulation reference signal (DMRS); and providing, for a user equipment (UE), the PDSCH transmission that is multiplexed with the PDCCH transmission that includes the information to schedule the PDSCH transmission and a shared DMRS indication indicative of the at least one shared DMRS shared between the PDSCH and the PDCCH.

30. The method of claim 29, wherein providing, for the UE, the PDSCH transmission that is multiplexed with the PDCCH transmission includes providing the at least one shared DMRS.

* * * * *